(12) United States Patent
Stewart et al.

(10) Patent No.: US 11,739,173 B2
(45) Date of Patent: Aug. 29, 2023

(54) CROSSLINKED POLYMERS AND RELATED COMPOSITIONS, ELECTROCHEMICAL CELLS, BATTERIES, METHODS AND SYSTEMS

(71) Applicant: ALIONYX ENERGY SYSTEMS, Monrovia, CA (US)

(72) Inventors: Andrew Stewart, Pasadena, CA (US); Zeiad Muntasser, Glendale, CA (US); Thay A. Ung, Monrovia, CA (US); Simon C. Jones, Whittier, CA (US); Mohamed El-Kumbari, West Covina, CA (US); Demetrio Batac, Valley Center, CA (US)

(73) Assignee: ALIONYX ENERGY SYSTEMS, Monrovia, CA (US)

(*) Notice: Subject to any disclaimer, the term of this patent is extended or adjusted under 35 U.S.C. 154(b) by 737 days.

(21) Appl. No.: 16/593,935

(22) Filed: Oct. 4, 2019

(65) Prior Publication Data
US 2020/0109228 A1  Apr. 9, 2020

Related U.S. Application Data

(60) Provisional application No. 62/741,519, filed on Oct. 4, 2018.

(51) Int. Cl.
*H01B 1/00* (2006.01)
*C08G 61/00* (2006.01)
(Continued)

(52) U.S. Cl.
CPC ........... *C08F 226/06* (2013.01); *C08G 61/10* (2013.01); *C08G 61/125* (2013.01);
(Continued)

(58) Field of Classification Search
CPC . H01B 1/00; H01B 1/12; H01B 1/121; H01B 1/124; H01M 4/60; H01M 4/602; C08G 61/02; C08G 61/12; C08G 75/14
See application file for complete search history.

(56) References Cited

U.S. PATENT DOCUMENTS 6,248,474 B1   6/2001 Nishiyama et al.
9,466,839 B2 * 10/2016 Otsuka ............... H01M 10/052
(Continued)

FOREIGN PATENT DOCUMENTS

CA   3115290 A1   4/2020
EP   0911893 A1   4/1999
(Continued)

OTHER PUBLICATIONS

Bhosale et al. "Organic small molecules and polymers as an electrode material for rechargeable lithium ion batteries", J. Mater. Chem. A, 2018, 6, 19885 (2018).*
(Continued)

*Primary Examiner* — Mark Kopec
(74) *Attorney, Agent, or Firm* — Steinfl + Bruno LLP

(57) ABSTRACT

Crosslinked polymers and related compositions and related compositions, electrochemical cells, batteries, methods and systems are described. The crosslinked polymers have at least one redox active monomeric moiety having a redox potential of 0.5 V to 3.0 V with reference to $Li/Li^+$ electrode potential under standard conditions or −2.54 V to −0.04 V vs. SHE and has a carbocyclic structure and at least one carbonyl group or a carboxyl group on the carbocyclic structure. The crosslinked polymers also include at least one comonomeric moiety with at least one of the at least one redox active monomeric moiety and/or the at least one comonomeric moiety has a denticity of three to six corre- (Continued)

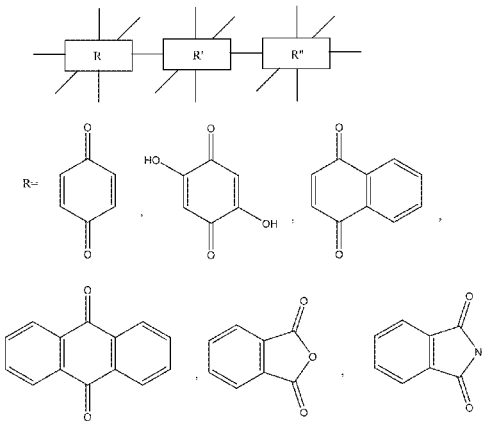

H, $CH_2$, $C_2H_4$, $C_3H_6$, N, S, O, benzene, pyridine, thiophene, NH, $SO_2$.

sponding to a three to six connected network polymer, and provide stable, high capacity organic electrode materials.

38 Claims, 38 Drawing Sheets

(51) Int. Cl.
- H01M 4/60 (2006.01)
- C08F 226/06 (2006.01)
- H01M 4/62 (2006.01)
- C08G 61/12 (2006.01)
- C08G 61/10 (2006.01)
- H01M 6/04 (2006.01)
- H01B 1/12 (2006.01)

(52) U.S. Cl.
CPC ........... *C08G 61/126* (2013.01); *H01B 1/121* (2013.01); *H01M 4/608* (2013.01); *H01M 4/623* (2013.01); *H01M 4/625* (2013.01); *H01M 6/045* (2013.01)

(56) References Cited

U.S. PATENT DOCUMENTS

| | | |
|---|---|---|
| 9,780,412 B2 | 10/2017 | Adams et al. |
| 10,033,039 B2 | 7/2018 | Yao et al. |
| 2006/0021938 A1 | 2/2006 | Diallo |
| 2008/0185341 A1 | 8/2008 | Diallo |
| 2009/0001802 A1 | 1/2009 | Diallo et al. |
| 2010/0181257 A1 | 7/2010 | Frechet et al. |
| 2011/0143197 A1* | 6/2011 | Ohtsuka ............ H01M 10/0567 429/207 |
| 2011/0315636 A1 | 12/2011 | Diallo et al. |
| 2012/0035332 A1 | 2/2012 | Diallo et al. |
| 2013/0004836 A1 | 1/2013 | Otsuka et al. |
| 2013/0122367 A1 | 5/2013 | Otsuka et al. |
| 2013/0230771 A1 | 9/2013 | Deronzier et al. |
| 2014/0308581 A1* | 10/2014 | Yao ...................... H01M 4/606 429/213 |
| 2016/0049659 A1 | 2/2016 | Yao et al. |
| 2016/0248114 A1 | 8/2016 | Huskinson et al. |

FOREIGN PATENT DOCUMENTS

| | | |
|---|---|---|
| JP | 3039484 B2 | 5/2000 |
| JP | 3045750 B2 | 5/2000 |
| JP | 2012046741 A | 3/2012 |
| KR | 20160067882 A | 6/2016 |
| KR | 20200070925 A | 6/2020 |
| WO | 2020/073020 A1 | 4/2020 |
| WO | 2022/109329 A1 | 5/2022 |

OTHER PUBLICATIONS

Matsubara et al "Synthesis and conformation of poly(I-2-anthraquinonylalanine)", Macromolecules 1997, 30, 2651-2656.*
Xu et al. "Electrochemical properties of poly(anthraquinonyl imide)s as high-capacity organic cathode materials for Li-ion batteries", Materials Chemistry and Physics 214 (2018) 120-125.*
Tang et al. "Carbonyl polymeric electrode materials for metal-ion batteries", Chinese Chemical Letters 29 (2018) 232-244.*
Newkome et al. "Synthesis and chemistry of novel dendritic macromolecules possessing internal electroactive anthraquinonoid moieties", Macromolecules 1997, 30, 5187-5191.*
Sun et al. "A hyperbranched conjugated Schiff base polymer network: a potential negative electrode for flexible thin film batteries", Chem. Commun., 2016, 52, 3000.*
Cannatelli et al "Laccase-mediated synthesis of lignin-core hyperbranched copolymers", Appl Microbiol Biotechnol (2017) 101:6343-6353.*

Ahmad, A. et al., "A Hierarchically Porous Hypercrosslinked and Novel Quinone based Stable Organic Polymer Electrode for Lithium-Ion Batteries," *Electrochimica Acta* 255, 145-152. Available online Sep. 6, 2017. 8 Pages.
Bhosale, M.E., et al., "Organic small molecules and polymers as an electrode material for rechargeable lithium ion batteries," *J Mater. Chem. A*, vol. 6, No. 41, pp. 19885-19911. 2018. 27 Pages.
Clausen, C., et al. "Anthraquinone Oligomers as Anode-Active Material in Rechargeable Nickel/Oligomer Batteries with Aqueous Electrolyte," Jan. 2018, 18 pages, accessible on Sep. 30, 2019 from https://www.researchgate.net/profile/Emil_Drazevic/publication/322407108_Anthraquinone_Oligomers_as_ . . . . 19 Pages.
Godet-Bar, T. et al., "Electrochemical and ab initio investigations to design a new phenothiazine based organic redox polymeric material for metal-ion battery cathodes", *Physical chemistry chemical physics*, 2015, vol. 17, No. 38, pp. 25283-25296. 14 Pages.
Gomez, I., et al., "Poly(anthraquinonyl sulfides): High Capacity Redox Polymers for Energy Storage," *ACS Macro Lett.*, 7, 419-424. 2018. 6 Pages.
Haupler, B., et al., "Carbonyls: Powerful Organic Materials for Secondary Batteries," *Adv. Energy Mater*, 5, 1402034 (34 pages). 2015. 34 Pages.
International Preliminary Report on Patentability for International PCT Application No. PCT/US2019/054889filed dated Oct. 4, 2019, on behalf of Alionyx Energy Systems, dated Feb. 25, 2021. 27 Pages.
International Search Report and Written Opinion for International Application No. PCT/US19/054889 filed Oct. 4, 2019, on behalf of Alionyx Energy Systems, dated Jan. 23, 2020. 10 pages.
International search Report and Written Opinion for International PCT Application No. PCT/US2021/060184 filed on Nov. 19, 2021, on behalf of Alionyx Energy Systems, dated Mar. 14, 2022. 18 Pages.
IUPACPeriodic Table of the Elements dated Nov. 28, 2016, which is accessible at https://iupac.org/cms/wp-content/uploads/2015/07/IUPAC_Periodic_Table-28Nov16.pdf. 1 Page.
Kolek, M. et al., "Ultra-high cycling stability of poly (vinylphenothiazine) as a battery cathode material resulting from $\pi$-$\pi$ interactions", *Energy & environmental science*, Nov. 2017, vol. 10, No. 11, pp. 2334-2341. 9 Pages.
Lee, S., et al., "Effect of Curing Poly (p-Phenylene Sulfide) on Thermal Properties and Crystalline Morphologies," *Advances in Chemical Engineering and Science*, 3, 145-149. 2013. 5 Pages.
Liang, Y., et al., "Universal quinone electrodes for long cycle life aqueous rechargeable batteries," *Nature Materials*, vol. 16, pp. 841-848. 2017. Published Online: Jun. 19, 2017. 10 Pages.
Micrometrics Results conducted by the Particle Testing Authority for Sample submitted by Alionyx Energy Systems. Finalized on Sep. 25, 2019. 10 Pages.
Morita., Y. et al., "Organic tailored batteries materials using stable open-shell molecules with degenerate frontier orbitals," *Nature Materials*, vol. 10, pp. 947-951. Oct. 16, 2011. 5 Pages.
Song, Z., et al., "Polyanthraquinone as a Reliable Organic Electrode for Stable and Fast Lithium Storage" *Angew. Chem. Int. Ed.*, 54, 13947-1395. Published online: Sep. 28, 2015. 5 Pages.
Second Written Opinion for International Application No. PCT/US19/054889 filed Oct. 4, 2019, on behalf of Alionyx Energy Systems, dated Dec. 9, 2020. 5 Pages.
Sun, M., et al., "Rational synthesis of novel $\pi$-conjugated poly(I,5 diaminoanthraquinone) for high-performance supercapacitors," *RSC Advances*, vol. 4, No. 15, 7774-7779. 2014. 8 Pages.
Tomai, T., et al., "Analysis of Degradation Mechanisms inQuinone-Based Electrodes for Aqueous Electrolyte System via In Situ XRDMeasurements," *J Phys. Chem. C*, 122, 2461-2466. Jan. 9, 2018. 6 Pages.
Xu, H., et al., "A new fluorine-containing star-branched polymer as electrolyte for all-solid-state lithium-ion batteries," *Polymer*, vol. 146, pp. 249-255. Jun. 20, 2018. 7 Pages.
Ahmed, M. S., et al., "Multiscale Understanding of Covalently Fixed Sulfur-Polyacrylonitrile Composite as Advanced Cathode for Metal-Sulfur Batteries" *Adv. Sci.*, 8, 2101123. Aug. 8, 2021. 34 Pages.

(56) References Cited

OTHER PUBLICATIONS

Cao, L., et al.. "Fluorinated interphase enables reversible aqueous zinc battery chemistries," Nat. Nanotechnol. 16, pp. 902-910. 2021. 11 Pages. https://doi.org/10.1038/s41565-021-00905-4.

Groner, M. D., et al. "Low-temperature Al2O3 atomic layer deposition." *Chemistry of materials* 16.4. pp. 639-645. 2004. 7 Pages.

Häupler-Dissertation, Organic batteries, Decision date: May 6, 2015, pp. 1-121.

Kotani, Y., et al., "Living Radical Polymerization of Styrene by Half-Metallocene Iron Carbonyl Complexes", *Macromolecules* 2000, 33, 10. Apr. 27, 2000. pp. 3543-3549. 7 Pages.

Monomer, Wikipedia Definition. Available online https://en.wikipedia.org/wiki/Monomer. Last edited: Nov. 24, 2022. Downloaded Jan. 23, 2023. 3 Pages.

Nishide, H et al., "Organic Radical Battery," The Electrochemical Society Interface • Winter 2005, pp. 32-36.

Obrezkov, F. A., et al., "High-energy and high-power density potassium ion batteries using dihydrophenazine-based polymer as active cathode material," *The Journal of Physical Chemistry Letters*, vol. 10, pp. 5440-5445. 2019. 6 Pages.

Pan, z., et al., "Progress and Perspectives of Organosulfur for Lithium-Sulfur Batteries," *Adv. Energy Mater.*, 2103483. Jan. 5, 2022. 18 Pages.

Polycyclic compound, Wikipedia article. Available online https://en.wikipedia.org/w/index.php?title_Polycyclic_compound&oldid_1131681585 Last edited: Jan. 5, 2023. 2 Pages.

Quinone, Wikipedia article. Available online https://en.wikipedia.org/wiki/Quinone Last edited: Dec. 6, 2022. Accessed on May 7, 2022. 7 pages.

"Quinones", IUPAC, Compendium of Chemical Terminology, 2nd ed. (the "Gold Book") PAC, 1995, 67, 1307 (Glossary of class names of organic compounds and reactivity intermediates based on structure (IUPAC Recommendations 1995) on p. 1362. Online corrected version: (2006) doi:10.1351/goldbook.Q05015.

Shadike, Z., et al., "Reviewon Organosulfur Materials for Rechargeable Lithium Batteries," Mater. Horiz., 8, pp. 471-500. 2021. 39 Pages.

Tie, Zhiwei et al., "Design strategies for high-performance aqueous Zn/organic batteries," Angewandte Chemie International Edition, 2020, vol. 59, pp. 21293-21303.

Wang, F., et al. "Highly reversible zinc metal anode for aqueous batteries," *Nature Mater* 17, pp. 543-549. 2018. 8 Pages. https://doi.org/10.1038/s41563-018-Q063-z.

Wang, J. et al. "A Novel Conductive Polymer-Sulfur Composite Cathode Material for Rechargeable Lithium Batteries," Adv. Mater. 2002, 14, No. 13-14, Jul. 4, pp. 963-965.

Yu, Xian-guo et al. "Lithium storage in conductive sulfur-containing polymers," J. Electroanal. Chem, 2004, 573, pp. 121-128.

Zhang, S. S. "Understanding of sulfurized polyacrylonitrile for superior performance lithium/sulfur battery." *Energies* 7.7. pp. 4588-4600. 2014. 13 Pages.

\* cited by examiner

X = Cl, Br, or I

Redox Active Monomer Precursors

Where X is Cl, Br, or I

A

B

| Analysis | Theory | % Found | |
|---|---|---|---|
| C | | 65.45 | |
| H | | 2.47 | |
| S | | 14.34 | |
| | | | |
| | | | |
| | | | |

| Analyze for: | CH,S | Single ☑ |
|---|---|---|
| | | Duplicate ☐ |
| Air Sensitive: | | Yes ☐ No ☑ |
| Explosive: | | Yes ☐ No ☑ |
| Hazardous: | | Yes ☑ No ☐ |
| Sample Return: | | Yes ☐ No ☑ |
| Molecular Formula: | [(C14H6O2S)3CH]n | |
| Drying: | | Yes ☐ No ☑ |
| Temperature ___ °C | | |
| Time ___ H ___ M | | |

Figure 44

| Analysis | Theory | % Found | |
|---|---|---|---|
| C | | 66.18 | |
| H | | 2.33 | |
| S | | 11.69 | |
| | | | |
| | | | |
| | | | |

| Analyze for: | CH,S | Single ☑ |
|---|---|---|
| | | Duplicate ☐ |
| Air Sensitive: | | Yes ☐ No ☑ |
| Explosive: | | Yes ☐ No ☑ |
| Hazardous: | | Yes ☑ No ☐ |
| Sample Return: | | Yes ☐ No ☑ |
| Molecular Formula: | [(C14H6O2S)3C6H3]n | |
| Drying: | | Yes ☐ No ☑ |
| Temperature ___ °C | | |
| Time ___ H ___ M | | |

Figure 45

CROSSLINKED POLYMERS AND RELATED COMPOSITIONS, ELECTROCHEMICAL CELLS, BATTERIES, METHODS AND SYSTEMS

CROSS REFERENCE TO RELATED APPLICATIONS

The present application claims priority to U.S. Provisional Application No. 62/741,519, entitled "Quinone-comprising network polymers as stable, high capacity organic electrode materials" filed on Oct. 4, 2018 the content of which is incorporated herein by reference in its entirety.

FIELD

The present disclosure relates to electrode active materials, and battery systems that feature electrodes incorporating organic materials. In particular, the present disclosure relates to crosslinked polymers and related compositions, electrochemical cells, batteries, methods and systems that can be used to improve electrochemical cells and batteries performance.

BACKGROUND

Performance has been at the center of various efforts to improve electrode active materials and battery systems.

Despite progresses made in the recent years, however, production for high reliability, high capacity, long-life and/or safe energy storage devices is still challenging in particular reference to batteries in large-scale applications, for example in utility grid storage supporting renewable power generation or in full-home backup battery installations.

SUMMARY

Described herein are, crosslinked polymers and related compositions, methods and systems, which, in several embodiments, allow production of high performance redox active material which can be used in redox cycle stable, high capacity electrochemical cells and batteries with aqueous electrolytes.

According to a first aspect, a crosslinked polymer is described, the crosslinked polymer being a network polymer of Formula (I)

in which Q is a redox active a bidentate, tridentate, tetradentate, pentadentate or a hexadentate monomeric organic moiety comprising carbocyclic structure and at least one carbonyl group or a carboxyl group presented on the carbocyclic structure, Q having a redox potential of 0.5 V to 3.0 V with reference to Li/Li+ electrode potential under standard conditions or −2.54 V to −0.04 V with reference to SHE, Z is a comonomeric moiety selected from a bidentate, tridentate, tetradentate, pentadentate and a hexadentate chemical moiety, x indicates the molar ratio of Z:Q and ranges from 0.2 to 3, and m ranges from 5 to 1,000 wherein at least one of Q and Z of each monomer of the crosslinked polymer is a tridentate, tetradentate, pentadentate or a hexadentate organic moiety linked to at least one of Q and Z of another monomer of the crosslinked polymer; and wherein the crosslinked polymer has a weight average molecular weight of at least 1500 Dalton and a solubility in water of equal or less than 1.0 microgram per mL at room temperature.

According to a second aspect, a crosslinked polymer is described, the crosslinked polymer being a dendritic polymer of Formula (II)

wherein

D is a dendritic core having a core multiplicity,

L is a bidentate, tridentate, tetradentate, pentadentate or a hexadentate redox active monomeric moiety comprising a carbocyclic structure and at least one carbonyl group or a carboxyl group presented on the carbocyclic structure, L having a L-multiplicity $N_L$ and a redox potential of 0.5 V to 3.0 V with reference to Li/Li+ electrode potential under standard conditions or −2.54 V to −0.04 V with reference to SHE, and Y is a comonomeric moiety selected from a bidentate, tridentate, tetradentate, pentadentate and a hexadentate chemical moiety, Y having a Y-multiplicity $N_Y$, wherein $N_D$ number of L is covalently linked to D, ($N_L$-1) number of Y is covalently linked to each L for each successive generation, $N_Y$ number of L is covalently linked to Y, and wherein $N_D$ ranges from 3 to 6, $N_Y$ and $N_L$ range independently from 2 to 6, with the proviso that at least one of $N_Y$ and $N_L$ is at least 3, and

G≥3.

According to a third aspect a method is described for making a crosslinked network polymer, the method comprising providing a redox active monomer comprising a redox active monomeric moiety Q comprising a carbocyclic structure and at least one carbonyl group or a carboxyl group presented on the carbocyclic structure optionally substituted with three to five functional groups, the redox active monomeric moiety Q having a redox potential of 0.5 V to 3.0 V with reference to Li/Li+ electrode potential under standard conditions or −2.54 V to −0.04 V with reference to SHE;

providing a comonomer comprising a comonomeric chemical moiety Z substituted with two to 6 functional groups and capable of reacting with the redox active monomer to form a polymer, contacting the redox active monomer and the comonomer for a time and under conditions to allow reaction of the redox active moiety Q with the comonomeric moiety Z to provide the network polymer of Formula (I) herein described wherein at least one of Q and Z of each monomer of the crosslinked polymer is a tridentate, tetradentate, pentadentate or a hexadentate chemical moiety linked to at least one of Q and Z of another monomer of the network polymer.

According to a fourth aspect a method is described for making a crosslinked dendritic polymer, the method comprising providing a core monomer having dendritic core D having a core multiplicity $N_D$, providing a redox active monomer comprising a redox active monomeric moiety L comprising a redox active monomeric moiety Q comprising a carbocyclic structure and at least one carbonyl group or a carboxyl group presented on the carbocyclic structure optionally substituted with three to five functional groups, the redox active monomeric moiety L having a redox potential of 0.5 V to 3.0 V with reference to Li/Li+ electrode potential under standard conditions or −2.54 V to −0.04 V with reference to SHE, the redox active monomeric moiety L having a L-multiplicity $N_L$, providing a comonomer comprising a comonomeric chemical moiety Y substituted with two to 6 functional groups and capable of reacting with the redox active monomer, the comonomeric moiety Y having a Y-multiplicity $N_Y$, contacting the core monomer with the redox active monomer to form an intermediate $I_0$ of formula IIa

contacting the intermediate $I_0$ of formula IIa with the comonomer to form a dendritic polymer generation, repeating contacting the core monomer with the redox active monomer to form an intermediate $I_0$ and contacting the intermediate Jo with the comonomer to form a dendritic polymer generation, to provide a dendritic polymer of Formula (II) having a generation G of at least 3.

According to a fifth aspect an electrode composition is described, the electrode composition comprising a crosslinked network polymer of Formula (I) herein described and/or a crosslinked dendritic polymer of Formula (II) herein described, together with a binder, and a conductive additive.

According to a sixth aspect, an electrochemical cell is described, the electrochemical cell comprising an anode, a cathode, current collectors, external housing, a separator and an aqueous electrolyte, wherein the anode electrode comprises the network polymer of Formula (I) and/or the network dendrimer of Formula (II) herein described.

According to a seventh aspect, a battery is described, the battery comprising at least one electrochemical cell herein described.

The crosslinked polymers and related compositions electrochemical cells methods and systems, allow in several embodiments to provide batteries with a high capacity (at least 50 mAh/g for active material or redox active network polymer that is utilized), long life-time (e.g. at least 4 years) and/or low safety hazard including low flammability.

The crosslinked polymers and related compositions electrochemical cells methods and systems allow in several embodiments to provide batteries with low spatial footprint and low replacement.

The crosslinked polymers and related compositions electrochemical cells methods and systems as described herein allow in several embodiments to provide batteries having a higher capacity, longer life-time and/or reduced safety hazards with respect to existing lead-acid batteries.

In particular the crosslinked polymers and related compositions electrochemical cells methods and systems, allow in several embodiments to provide batteries having a higher capacity, longer life time and reduced safety hazards with particular reference to lead-acid batteries, lithium-ion batteries using considerable quantities of flammable organic solvent electrolyte of at least 1 mL/Ah in large batteries (having 5 kWh or more, 25 kWh or more, 50 kWh or more).

Additionally, the crosslinked polymers and related compositions electrochemical cells methods and systems, allow in several embodiments to provide batteries having a higher capacity, and longer lifetime with respect to existing batteries based on organic redox materials The crosslinked polymers and related compositions electrochemical cells methods and systems herein described can be used in connection with applications wherein electrochemical cell with high capacity, long life low safety hazards, low spatial footprint and/or low replacement are desired. Exemplary applications comprise batteries for grid storage, telecommunication, automotive start-stop.

The details of one or more embodiments of the disclosure are set forth in the accompanying drawings and the description below. Other features and objects will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 44 shows results of elemental analysis for Sample TU2018080.

FIG. 45 shows results of elemental analysis of Formula (Ve1) (Sample TU2018086).

DETAILED DESCRIPTION

Figure 1:
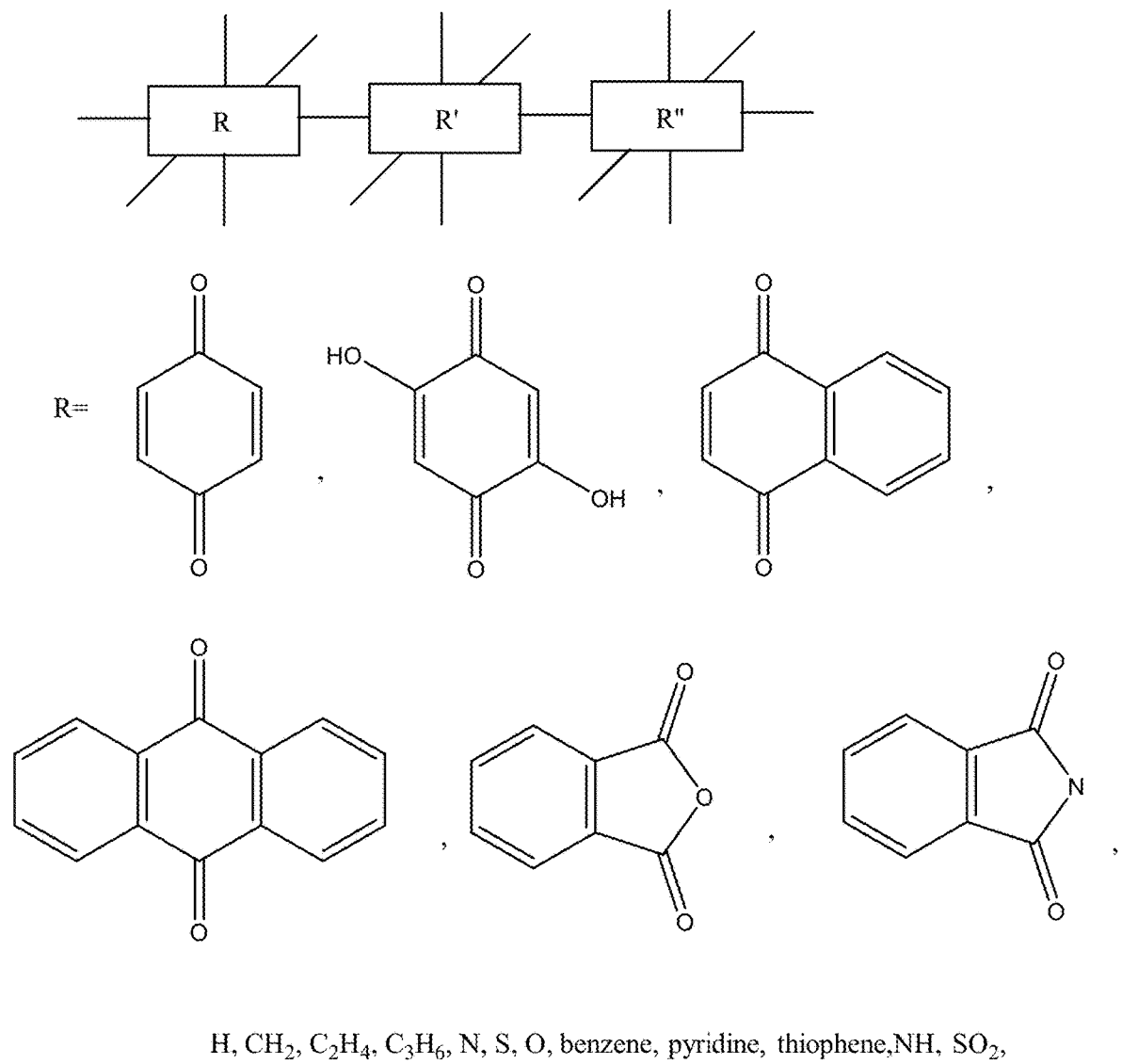
FIG. 1 shows how network structures may be formed by co-polymerizing different monomers substituted in at least two positions whereby at least one monomer comprises an organic redox-active moiety such as a quinone or pyrenetetraone.

Described herein are compositions, methods and systems, which in several embodiments allow making of redox cycle stable, high capacity electrochemical cells and batteries with aqueous electrolytes by incorporating redox active crosslinked polymers including network polymers and dendritic polymers.

As used herein, the wording "crosslinked polymer" indicates an organic macromolecule of at least 1500 Daltons molecular weight composed of repeated subunits at least one of which is branched. In particular, a crosslinked polymer is comprised of a series of monomers resulting from a polymerization reaction or thermal crosslinking. At least one of the monomers used in the crosslinked polymer are redox active. Furthermore, crosslinked polymers exhibit a voltage when coupled with a counter electrode. Furthermore, crosslinked polymers are able to charge and discharge over a set voltage range without immediate decomposition within an electrode.

The term "network polymer" as used herein indicates a crosslinked polymer formed by supramolecular complex comprising multiple linear chain polymers linked one to another.

The term "dendrimer polymer as used herein indicates a crosslinked polymer containing multiple repeating units linked to a central core.

Crosslinked network polymer and dendrimer network polymer as used herein comprise bidentate, tridentate, tetradentate, pentadentate and a hexadentate chemical moieties.

The term "chemical moiety" as used herein indicates an atom or group of atoms that when included in a molecule is responsible for a characteristic chemical reaction of that molecule or an atom or group of atoms that that is retained to become part of the reaction product after the reaction. A chemical moiety comprising at least one carbon atom is also indicated as organic moiety as will be understood by a skilled person.

In particular, as used here, the wording "organic moiety" refers to a carbon containing portion of an organic molecule. For example, within an organic polymer organic moieties can be formed by a distinct portion of the polymer, such as a distinct portions of a monomer that is retained in the polymer following polymerization as part of the monomeric unit of the polymer. An exemplary organic moiety is provided by a 1,5-dichloroanthraquinone or by an anthraquinone moiety retained in a network polymer as disclosed herein.

Exemplary chemical moieties in the sense of the disclosure are provided by functional groups such as hydrocarbon groups containing double or triple bonds, groups containing halogen, groups containing oxygen, groups containing nitrogen and groups containing phosphorus and sulfur all identifiable by a skilled person.

The word "denticity" as used herein in connection with a reference chemical moiety, indicates a number of chemical moieties covalently linked to the reference chemical moiety.

Accordingly, as used herein, the wording "bidentate", "tridentate", "tetradentate", "pentadentate" and a "hexadentate" chemical moiety refer to a chemical moiety covalently linked to two, three, four, five and six other organic moieties respectively.

Accordingly, the term bidentate, tridentate, tetradentate, pentadentate and a hexadentate refers to a degree of denticity of chemical moieties as indicated in the present disclosure which result in corresponding linear, 3-connected, 4-connected, 5-connected and 6-connected polymers, as will be understood by a the skilled person.

In network and dendritic crosslinked polymers herein described covalent linkage of the bidentate, tridentate, tetradentate, pentadentate and a hexadentate organic moiety comprises polymerization linkage resulting from polymerization of a monomer comprising the organic moiety and/or crosslinking linkages resulting from reactions between monomeric units of the polymer.

Accordingly, at least two linkages of a bidentate tridentate, tetradentate, pentadentate and a hexadentate chemical moieties within network and dendritic network polymers herein described are polymerization linkages with other linkages being possibly either polymerization linkages or crosslinking linkages. Linkages can be formed through addition reaction, substitution reaction, photoinitiated reactions, or cycloadditive reactions.

Crosslinked polymers in accordance with the present disclosure are redox active polymers.

The term "redox active" as used herein indicates a chemical moiety (e.g. polymer or monomer or portion thereof) capable of being reversibly oxidized or reduced in an aqueous environment to produce a detectable redox potential. Redox active functional groups include but are not limited to ketones, aldehydes, and carboxylic acids.

In embodiments of the present disclosure, crosslinked polymers are redox polymers having at least two structurally different repeated chemical moieties, a redox active chemical moiety and a comonomeric moiety.

In the crosslinked polymers herein described the redox active moiety has a redox potential of 0.5 V to 3.0 V with reference to Li/Li+ electrode potential under standard conditions or −2.54 V to −0.04 V with reference to SHE (Standard Hydrogen Electrode). It is to be understood that a person of skill in the art would know that Li/Li$^+$ has a potential of −3.04 V vs. SHE, a potential of a redox moiety relative to the potential of Li/Li$^+$ can be converted to a potential of a redox moiety relative to SHE. by subtraction of the potential vs. Li/Li$^+$ by 3.04 V to give the potential vs. SHE.

In the crosslinked polymers herein described the comonomeric moiety is a moiety having a redox potential lower or higher than the redox potential of the redox active monomeric moiety of the crosslinked polymer in the sense of the disclosure. A comonomer is a chemical moiety that is present as repeated unit in a crosslinked network polymer containing a redox active monomeric moiety. Selection of comonomers with lower or higher redox potential can be performed in view of the electrode material which will comprise the crosslinked polymers herein described as will be understood by a skilled person. In some instances the redox potential of a comonomer in crosslinked polymers herein described can be minimized.

Accordingly, the crosslinked polymers herein described have a charging capacity as will be understood by a skilled person. As used herein, the wording "charging capacity" is a measurement of the product of current times time of the charge that the anode material accepts until a cutoff voltage is reached. Discharging capacity is the product of current times time of the charge that the cathode material accepts until a cutoff voltage is reached.

$$Q = \frac{nF}{3600 * MW}$$

where Q is the theoretical capacity,
n is the number of electrons exchanged,
F is Faraday's constant, and
MW is the molecular weight of the electroactive material.

In some embodiments, a crosslinked polymer of the present disclosure is a network polymer of Formula (I)

[Q-co-Z$_x$]$_m$   (I)

in which

Q is a redox active a bidentate, tridentate, tetradentate, pentadentate or a hexadentate monomeric organic moiety comprising carbocyclic structure and at least one carbonyl group or a carboxyl group presented on the carbocyclic structure, Q having a redox potential of 0.5 V to 3.0 V with reference to Li/Li+ electrode potential under standard conditions of −2.54 V to −0.04 V with reference to SHE, Z is a comonomeric moiety selected from a bidentate, tridentate, tetradentate, pentadentate and a hexadentate chemical moiety which can be in some embodiments an organic moiety, x indicates the molar ratio of Z:Q and ranges from 0.2 to 3, m ranges from 5 to 1,000, wherein at least one of Q and Z of each monomer of the crosslinked polymer is a tridentate, tetradentate, pentadentate or a hexadentate moiety linked to at least one of Q and Z of another monomer of the crosslinked polymer; and wherein the network polymer has a weight average molecular weight of at least 1500 Dalton and a solubility in water of equal or less than 1.0 microgram per mL at room temperature.

Formula (I) represents any arrangements of Q and Z moieties in the network polymer including random copolymer, block copolymer and alternate copolymer.

In some embodiments herein described in network polymers of Formula (I), the network polymer has a weight average molecular weight of at least 10,000 Dalton and a solubility in water of equal or less than 0.1 microgram per mL at room temperature.

In some embodiments herein described in network polymers of Formula (I), m can be 20 to 500.

In some embodiments herein described in network polymers of Formula (I), m can be 50 to 200.

Accordingly, in network polymers of Formula (I) a bidentate, tridentate, tetradentate, pentadentate and a hexadentate redox active monomeric moiety refer respectively to a redox active monomeric moiety that is covalently bonded to two, three, four, five and six organic moieties, the organic moiety can be a redox active monomeric moiety Q or a comonomeric moiety Z.

In embodiments herein described Q can be one or more monomer units that contains a carbonyl (which herein can be indicated as Q1, Q2, Q3 . . . Qn) in various combinations with one or more comonomers Z (herein indicated as Z1, Z2, Z3, . . . Zn) forming a copolymer as will be understood by a skilled person upon reading of the present disclosure.

In particular, some embodiments, redox active monomer Q, comonomer Z in network polymer of Formula (I) provide a statistical random copolymer in which redox active monomer Q and commoner Z are statistically randomly present in the network polymer. Exemplary statistically random copoloymer of Q and Z can be represented as

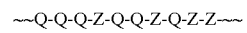

In some embodiments, redox active monomer Q, commoner Z in network polymer of Formula (I) represent an alternating copoloymer in which redox active monomer Q and commoner Z present alternately in the network polymer. Exemplary alternating copoloymer of Q and Z can be represented as

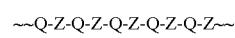

In some embodiments, redox active monomer Q, commoner Z in network polymer of Formula (I) represent an QZ di-block copoloymer in which redox active monomer Q and commoner Z present only in a sequence of at least 5 moieties in the network polymer. Exemplary QZ di-block copoloymer of Q and Z can be represented as

In some embodiments, redox active monomer Q, commoner Z in a network polymer of Formula (I) represent an QZQ tri-block copoloymer in which one of redox active monomer Q and commoner Z present only in at least two sequences of at least 5 moieties separated by a sequence of different moiety of Q or Z in the network polymer. Exemplary QZ tri-block copoloymer of Q and Z can be represented as

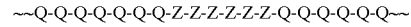

In some embodiments, the at least one redox active monomeric moiety Q can have a carbocyclic structure Q as represented by Formula (III):

Formula (III)

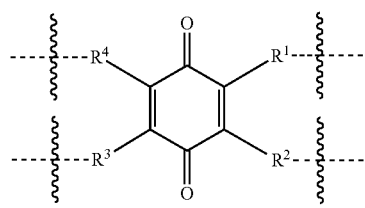

wherein $R^1$, $R^2$, $R^3$, and $R^4$ are each independently null, H, OH, $NR^{10}$, SH wherein $R^{10}$ is a H, linear or branched, substituted or unsubstituted C1-C4 aliphatic group, linear or branched, substituted or unsubstituted C1-C4 aliphatic group, $R^1$ and $R^2$ together and/or $R^3$, and $R^4$ together are part of an aromatic or aliphatic cyclic structure, wherein dash line — represents a hydrogen or a single bond, with the proviso that at least two of the dash lines in Formula (III) represents the single bond.

In some embodiments, the at least one redox active monomeric moiety Q can be selected from the group consisting of (IIIa)

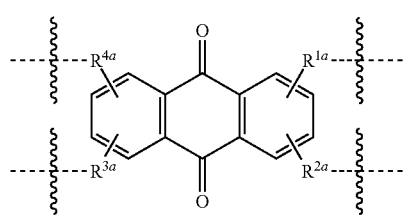

(IIIb)

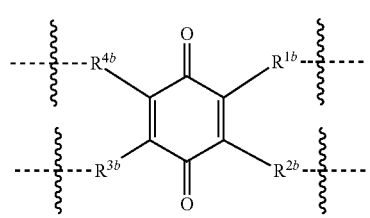

(IIIc)

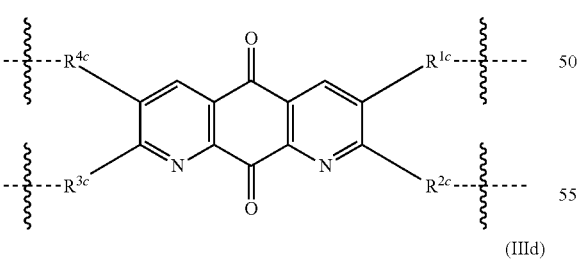

(IIId)

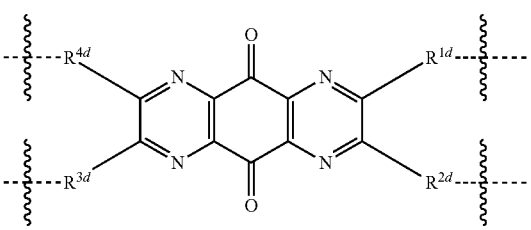

(IIIe)

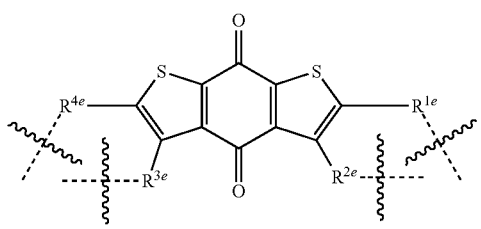

(IIIf)

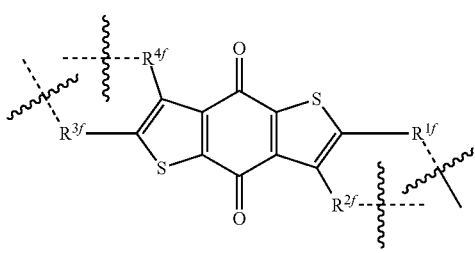

(IIIg)

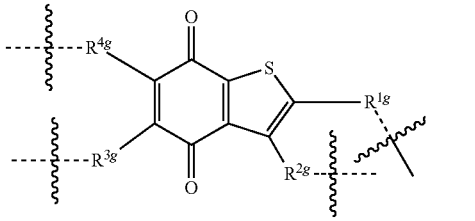

(IIIh)

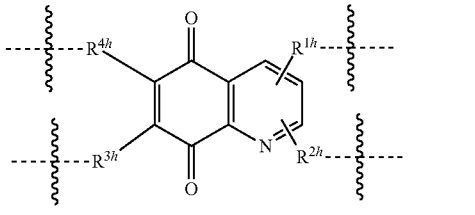

(IIIi)

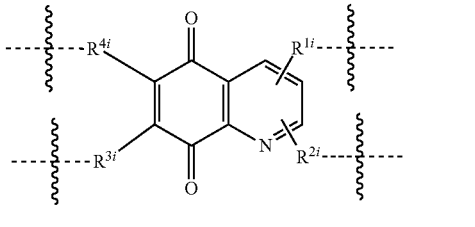

(IIIj)

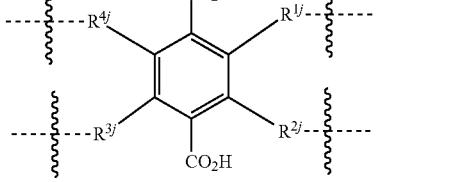

wherein dash line — represents a hydrogen or a single bond, with the proviso that at least two of the dash lines in each formula represents the single bond, wherein $R^{1a\text{-}j}$, $R^{2a\text{-}j}$, $R^{3a\text{-}j}$, and $R^{4a\text{-}j}$ each independently represents null, H, OH, $NR^{10}$, SH, wherein $R^{10}$ is a H, linear or branched, substituted or unsubstituted C1-C4 aliphatic group, linear or branched, substituted or unsubstituted C1-C4 aliphatic group, wherein dash line — represents a hydrogen or a single bond, with the proviso that at least two of the dash lines in each of Formulas (IIIa-j) represents the single bond.

In some embodiment, one or two of $R^{1b}$, $R^{2b}$, $R^{3b}$, and $R^{4b}$ are a OH group.

In some embodiment, the redox active monomeric moiety Q can be one selected from the redox monomeric moieties reported in Table I

TABLE I

|  | V vs. SHE |
|---|---|
| Anthraquinone | −0.74 |
| Benzoquinone | −0.94 |
| Benzo[1 2-b:4 5-b']dipyrimidine-4 8-dione | −0.29 |
| Benzo[1 2-b:4 5-b']dipyridine-4 8-dione | >−0.29 |
| benzo[1 2-b:4 5-b']dithiophene-4 8-dione | −0.64 |
| Teraphthalic Acid | −1.99 |
| Napthoquinone | −1.84 |
| Benzoquinoic Acid | −0.74 |

In embodiments herein described, crosslinked polymer of Formula (I) can comprise a same moiety or different redox active moiey Q as will be understood by a skilled person upon reading of the present disclosure.

In crosslinked polymer of Formula (I) herein described, the redox active monomeric moiety Q is linked to a comonomeric chemical moiety Z.

In some embodiments, at least one comonomeric moiety Z can be selected from the group consisting of

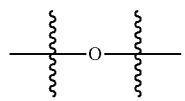

(IVa)

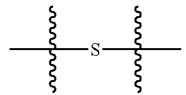

(IVb)

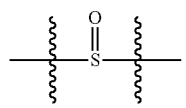

(IVb1)

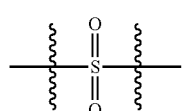

(IVc)

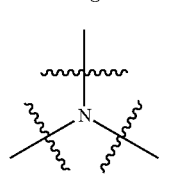

(IVd)

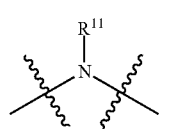

(IVe)

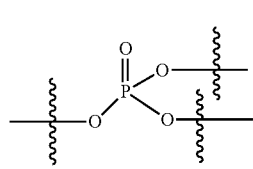

(IVf)

-continued

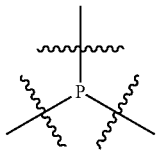

(IVf1)

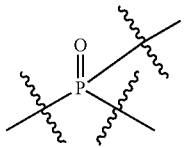

(IVf2)

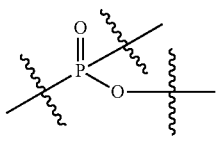

(IVf3)

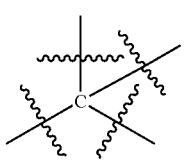

(IVg)

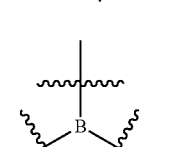

(IVh)

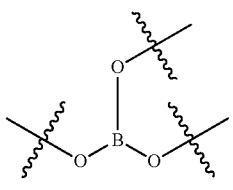

(IVi)

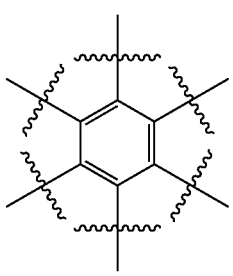

(IVj)

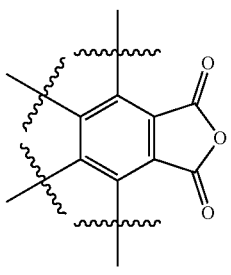

(IVk)

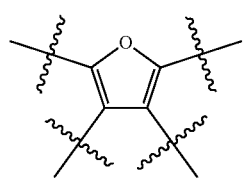 (IVl)
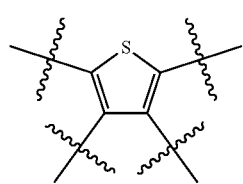 (IVm)
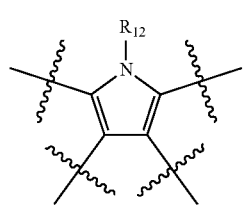 (IVn)
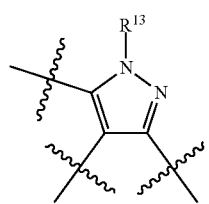 (IVo)
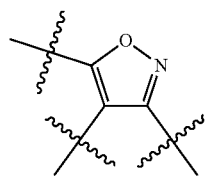 (IVp)
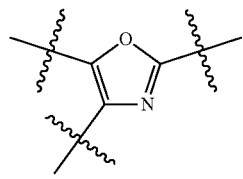 (IVq)
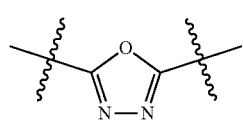 (IVr)
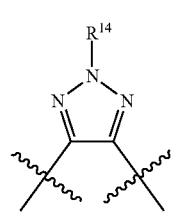 (IVs)
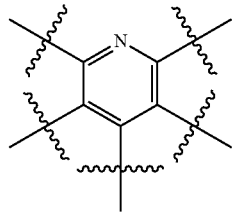 (IVt)
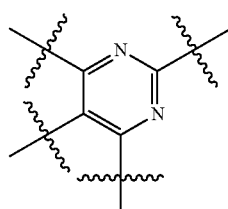 (IVu)
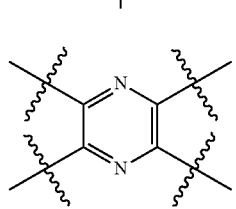 (IVv)
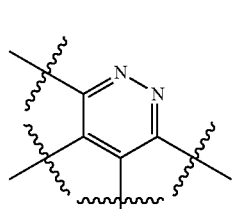 (IVw)
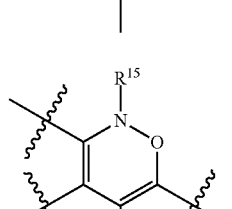 (IVx)
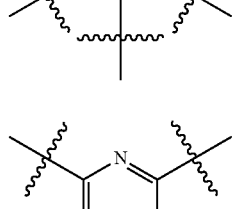 (IVy)
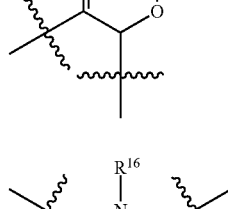 (IVz)

-continued (IVa1)
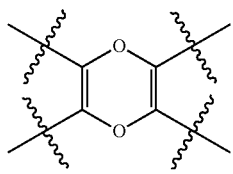

(IVb1)
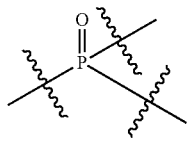

(IVc1)
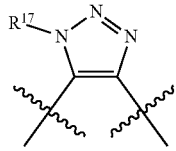

wherein $R^{11}$, $R^{12}$, $R^{13}$ $R^{14}$, $R^1$, $R^{16}$, and $R^{17}$ are independently a H, linear or branched, substituted or unsubstituted C1-C4 aliphatic group.

In embodiments herein described, crosslinked polymer of Formula (I) can comprise a same or different comonomers Z as will be understood by a skilled person upon reading of the present disclosure.

In embodiments of crosslinked polymer of Formula (I) herein described, x ranges from 0.2 to 3

In embodiments of crosslinked polymer of Formula (I) herein described, n ranges from 5 to 1,000.

In some embodiments herein described in crosslinked polymers of Formula (I), m can be 20 to 500.

In some embodiments herein described in crosslinked polymers of Formula (I), m can be 50 to 200.

In embodiments of crosslinked polymer of Formula (I) herein described, at least one of Q and Z of each monomer of the crosslinked polymer is a tridentate, tetradentate, pentadentate or a hexadentate organic moiety linked to at least one of Q and Z of another monomer of the crosslinked polymer.

In embodiments of crosslinked polymer of Formula (I) herein described, the network polymer has a weight average molecular weight of at least 1500 Dalton and a solubility in water of equal or less than 1.0 microgram per mL at room temperature.

In embodiments of crosslinked polymer of Formula (I) herein described, the network polymer has a weight average molecular weight of at least 10,000 Dalton and a solubility in water of equal or less than 0.1 microgram per mL at room temperature.

In some embodiments, redox active monomers, comonomer or heteroatom linker in network polymer of Formula (I) represent a statistical random copoloymer.

In some embodiments, redox active monomers, comonomer or heteroatom linker in network polymer of Formula (I) represent an alternative block copoloymer.

In some embodiments, the network polymer of crosslinked polymers of Formula (I) can be selected from the group consisting of

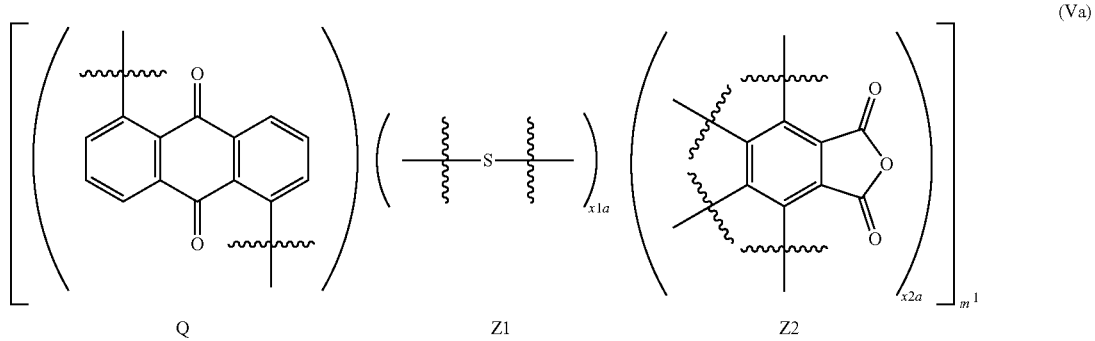

(Va)

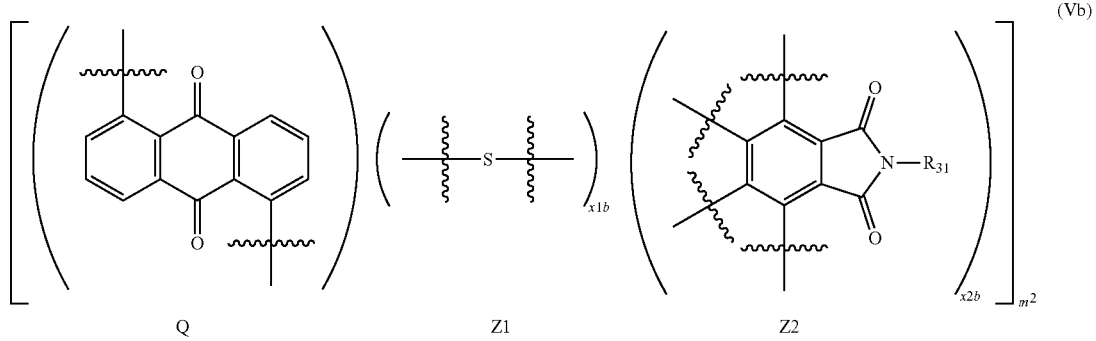

(Vb)

-continued

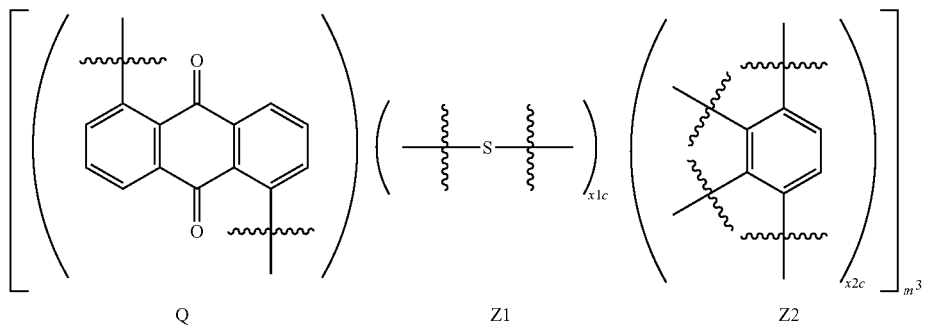

(Vc)

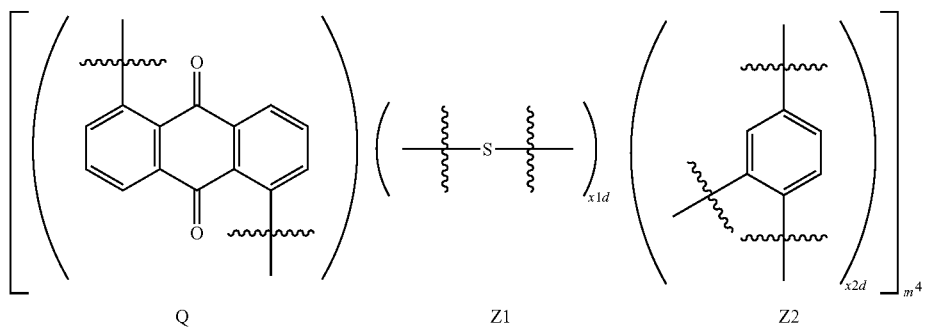

(Vd)

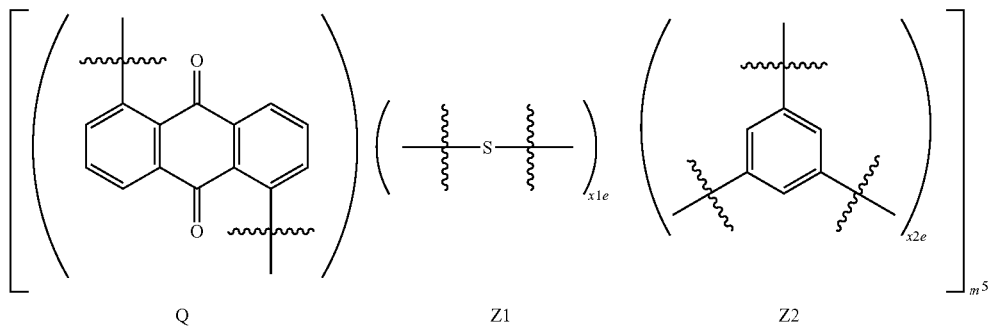

(Ve)

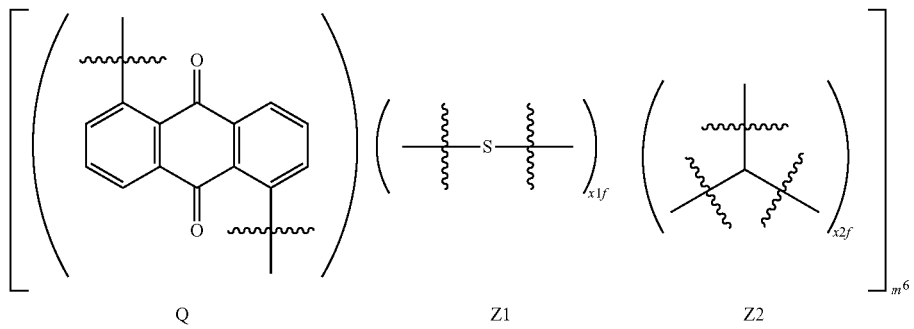

(Vf)

wherein
x1a, x1b, x1c, x1d, x1e x1f indicates the molar ratio of the respective Z comonomer moiety with the Q indicated in the same polymer, as indicated, and
wherein $x1a = 1 + 2 \times (x2a)$, $x1b = 1 + 2 \times (x2b)$, $x1c = 1 + 2 \times (x2c)$, $x1d = 1 + 1.5 \times (x2d)$, $x1e = 1 + 1.5 \times (x2e)$, $x1f = 1 + 1.5 \times (x2f)$, $m^1$, $m^2$, $m^3$, $m^4$, $m^5$ and $m^6$ each independently range from 5 to 1,000, and $R^{31}$ is a H, linear or branched, substituted or unsubstituted C1-C4 aliphatic group.

In some embodiments, xa2 ranges from 0.01 to 0.1, and $m^1$ ranges from 500 to 1,000.

In some embodiments herein described in crosslinked polymers of Formula (I), $m^1$ $m^2$ $m^3$, $m^4$, $m,^5$ and $m^6$ can be 20 to 500.

In some embodiments herein described in crosslinked polymers of Formula (I), $m^1$, $m^2$, $m^3$, $m^4$, $m,^5$ and $m^6$ can be 50 to 200.

In some embodiments, crosslinked polymers of the instant disclosure comprise dendrimer polymers.

The term "dendrimers" used herein refer to repetitively branched molecules having two basis architectural components namely (i) a dendritic core, and (ii) organic monomeric moieties having a denticity of at least 3.

In particular, in dendrimers in the sense of the disclosure, a "dendritic core" D is a chemical moiety having a 2 to 6 fold symmetry, chemically bonded to at least three moieties.

In particular in the dendrimer core of a dendrimer in the sense of the disclosure, the backbone of the dendrimer core can be any stable chemical moiety having the capability to present anchoring positions for the attachment of branch cell units. In particular, the core backbone structure can be one of aromatic, heteroaromatic rings, aliphatic, or heteroaliphatic rings or chains. In some embodiments, the backbone of the dendrimer core can be one single atom, including C, N, O, S, Si, or P.

In dendrimers herein described, the core of the dendrimers is typically the center from which size, shape, directionality and multiplicity are expressed via the covalent connectivity to the outer shells.

Figure 13:
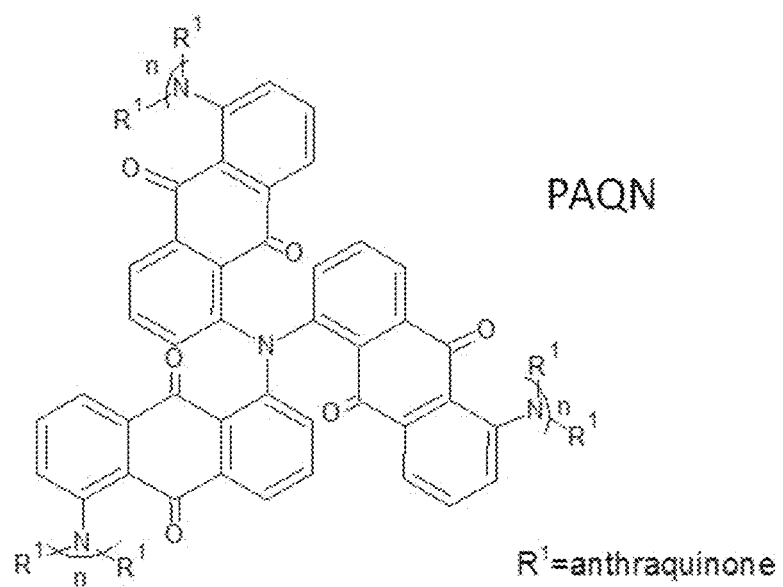
FIG. 13 shows a triarylamine-anthraquinone network polymer PAQN in which a linkage occurs through a trivalent tertiary nitrogen atom, in which n is at least 2 and up to 10.
Figure 14:
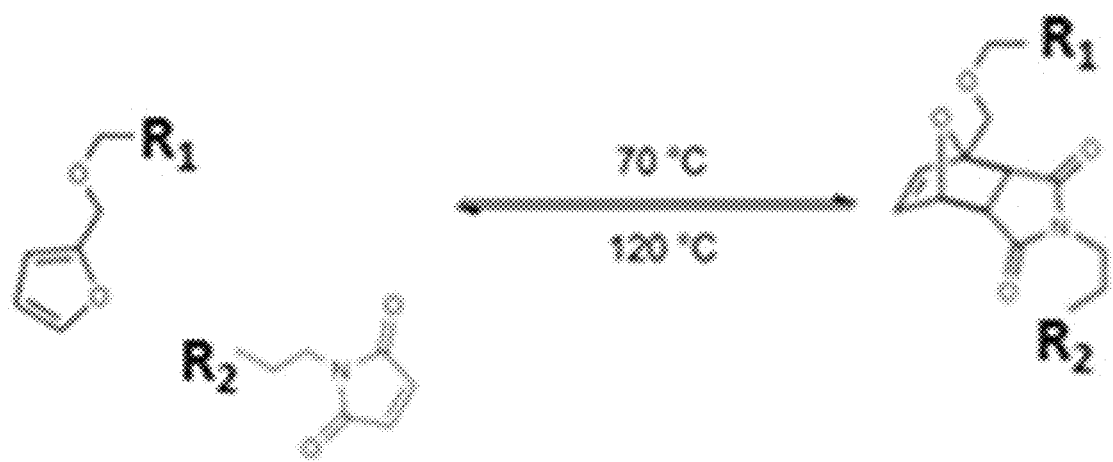
FIG. 14 shows an exemplary Diel-Alder reaction for crosslinking of two polymers, R1 and R2, for making a network polymer as disclosed herein.
Figure 15:
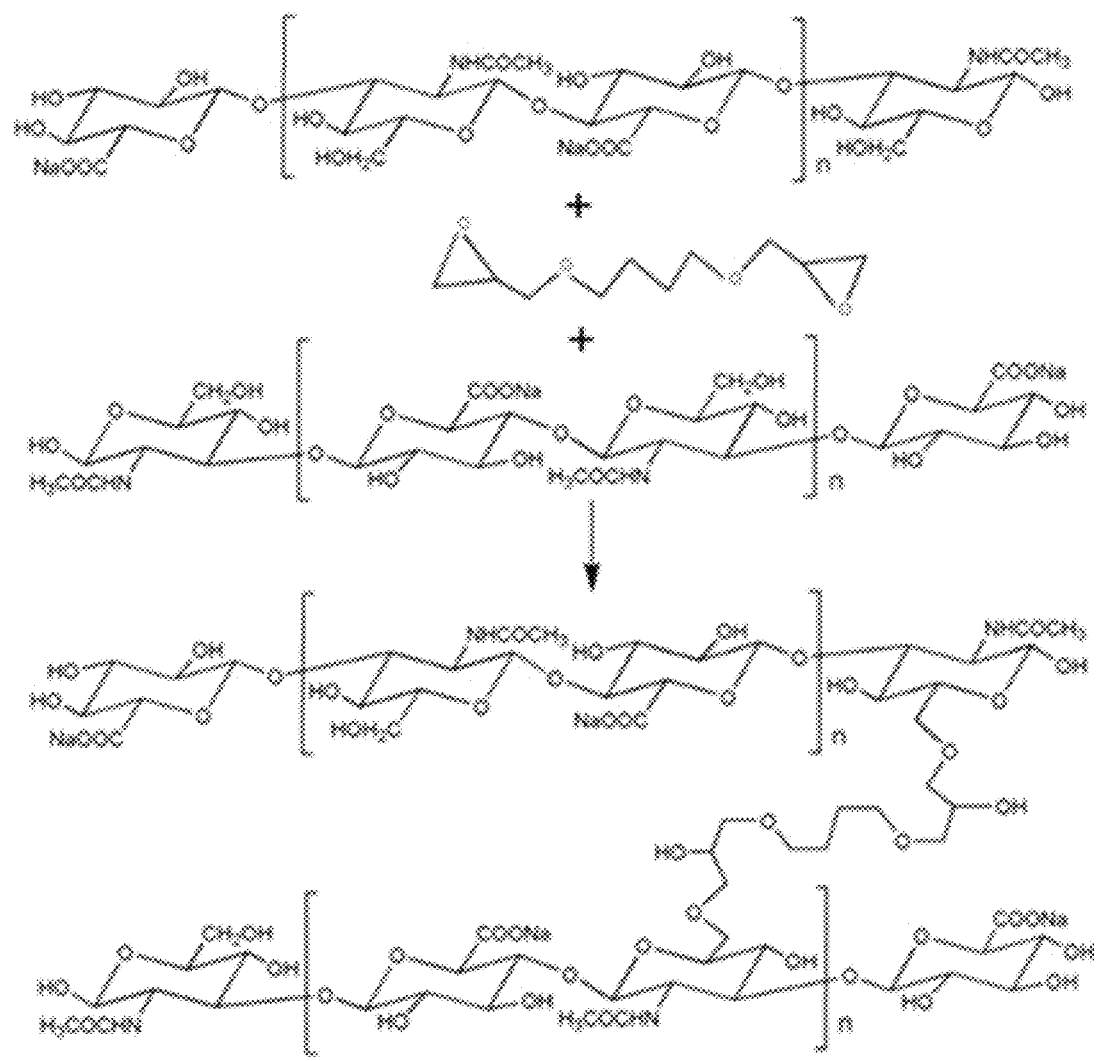
FIG. 15 shows exemplary nucleophilic reactions of a diepoxide with two polysaccharides as an illustration of crosslinking of two polymers for making a network polymer as disclosed herein.
Figure 16:
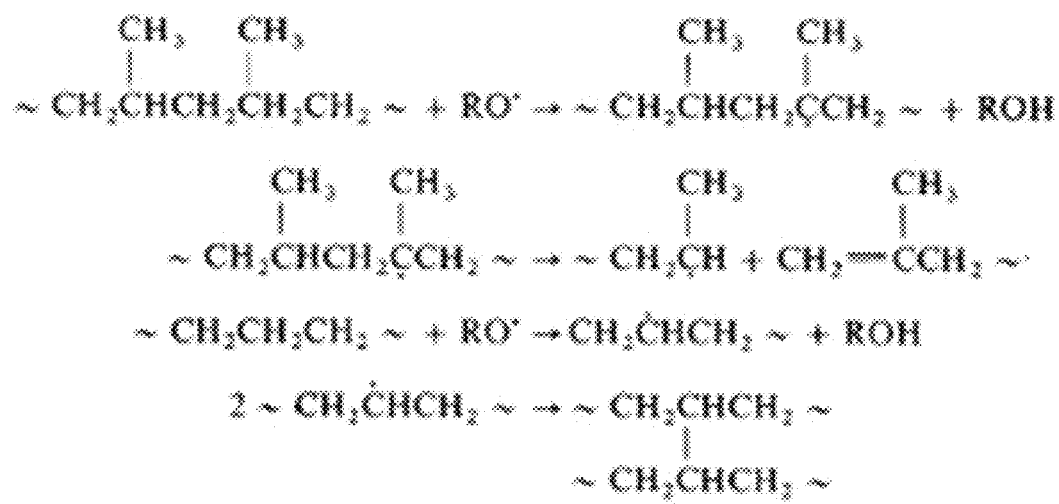
FIG. 16 shows exemplary free radical reactions of two aliphatic hydrocarbon polymers as an illustration of crosslinking of two polymers for making a network polymer as disclosed herein.
Figure 17:
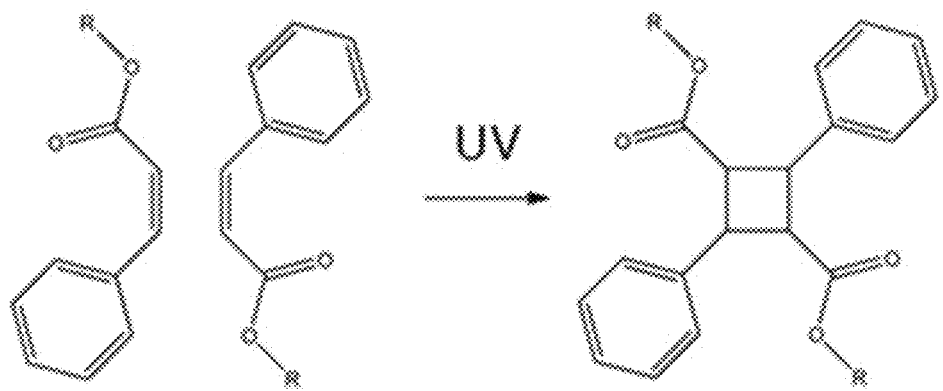
FIG. 17 shows exemplary UV light initiated coupling reactions of two cinnamate containing polymers R as an illustration of crosslinking of two polymers for making a network polymer as disclosed herein.
Figure 18:
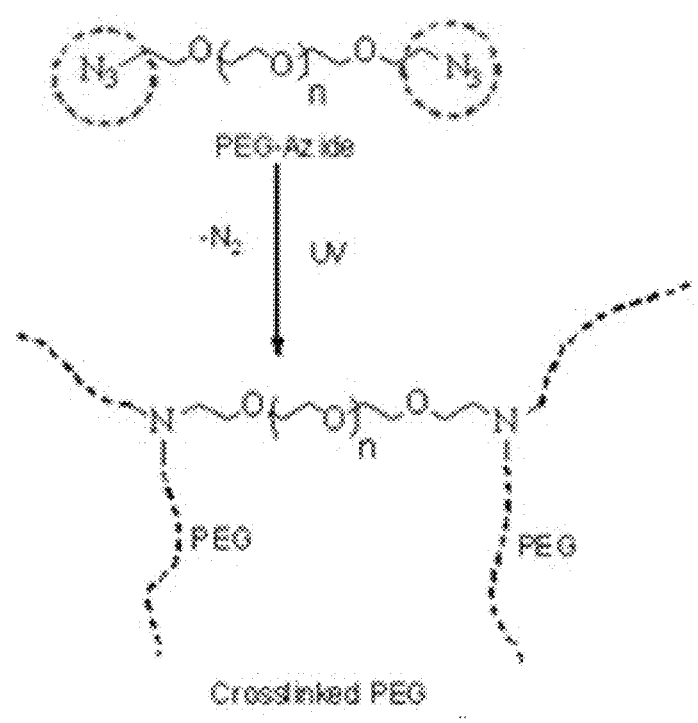
FIG. 18 shows exemplary UV light initiated coupling reactions of two azide containing PEG polymers (polyethylene glycol polymer) as an illustration of crosslinking of two azide functionalized polymers for making an exemplary crosslinked polymer herein described.

An exemplary illustration of a dendrimer core is provided in the tridentate nitrogen (N) of PAQN FIG. 13.

In dendrimers in the sense of the disclosure, the dendrimer further comprises organic monomeric moieties having a denticity of at least 3 directly or indirectly attached to the dendrimer core as will be understood by a skilled person.

The term "organic monomeric moiety" when used in connection with a dendrimer indicates an organic chemical structure presenting one head attachment atom and at least two tail attachment atoms that forms a repetitive unit in a polymer. The head attachment atom defines a bonding position to an anchor atom of a dendrimer core or a tail attachment atom of another organic monomeric moiety. The tail attachment atom defines a bonding position to a head attachment atom of another organic monomeric moiety or to a terminal functional group with the attachment possibly performed directly or indirectly. A generation of repetitive organic monomeric moiety within a dendrimer defines a shell of the dendrimer as will be understood by a skilled person (see "Dendrimers and other Dendritic polymers" by Jean M. J. Frechet and Donald A. Tomalia 2001 herein incorporated by reference in its entirety).

One of the properties used to characterize the organic monomeric moieties is referred to as organic monomeric moieties multiplicity, which represents a total number of tail attachment atoms on each branch cell unit and determines the density and degree of amplification as an exponential function of the generation (G) as will be understood by a skilled person. In the embodiment shown in FIG. 13, the generation (G) or n as shown in the figure has a value of at least two. In some embodiments, n in FIG. 13 can be 10.

The dendrimer generation is provided as a result of an iterative manufacturing process by which dendrimers are "grown" off a central core, wherein in each iteration organic monomeric moiety are attached to the core of the dendrimer or to terminal organic monomeric moieties of the dendrimer. Accordingly. in the iterative manufacturing processes each iteration provides a generation of branch cell units defining a new shell of the dendrimer as well as a new "generation" of the dendrimer. The term "terminal organic monomeric moiety" indicates organic monomeric moiety presenting functionalized or unfunctionalized tails on the outermost part of the dendrimers and forming the outer shell of the dendrimer. In some embodiments, dendrimers can be synthesized by divergent methods. Divergent synthesis refers to the sequential "growth" of a dendrimer layer by layer, starting with a core moiety which contains functional groups capable of acting as active sites in the initial reaction. Each round of reactions in the series forms a new generation of dendrimers with exponentially increased number of available surface groups. In other embodiments, dendrimers can also be synthesized by convergent methods as will be understood by a person of ordinary skill in the art. Detailed information about the dendrimer synthesis methods can be found in related publications and textbooks such as "Dendrimers and other Dendritic polymers" by Jean M. J. Frechet and Donald A. Tormalia 2001 herein incorporated by reference in its entirety.

The dendrimer diameters usually increase linearly as a function of shells or generations added, whereas, the terminal functional groups increase exponentially as a function of generation.

Highly branched dendrimers typically comprise dendrimer of generation G4 or higher. Low generation dendrimers typically comprise dendrimer of generation G3 or lower.

Lower generations generally have open, floppy structures, whereas higher generations become robust, less deformable spheroids, ellipsoids or cylinders depending on the shape and directionality of the core.

Higher generation dendrimers also have a high degree of branching and more exposed functional groups on the surface, which can later be used to customize the dendrimer for a given application. For example, highly branched dendrimers typically indicate a macromolecule whose structure is characterized by a high degree of branching that originates from a central core region. Exemplary highly branched dendritic macromolecules comprise dendrimers, hyperbranched polymers, dendrigraft polymers, dendronized linear polymers, tecto-dendrimers, core-shell (tecto) dendrimers, hybrid linear dendritic copolymers, dendronized polymers and additional molecule identifiable by a skilled person (see e.g. US 2006/0021938, US 2008/0185341, US 2009/0001802, US 2010/0181257, US 2011/0315636, and US 2012/0035332 each incorporated by reference in its entirety, also describing method of making highly branched dendritic macromolecules). Exemplary dendritic nanomaterials can include, for example, any highly branched dendritic macromolecules or mixtures thereof, in dendrimer-based supramolecular assemblies, 3-D globular nanoparticles or dendritic nano/microparticles identifiable by a skilled person (see, for example, US 2006/0021938, US 2008/0185341, US 2009/0001802, US 2010/0181257, US 2011/0315636, and US 2012/0035332 each incorporated by reference in its entirety).

In embodiments of the present disclosure, a network polymer can comprise a dendritic polymer of Formula (II)

$$[D\text{-}L_{ND}\text{-}Y_{NL\text{-}1}^{NY\text{-}1}]_G \quad (II)$$

wherein

D is a dendritic core having a core multiplicity,

L is a bidentate, tridentate, tetradentate, pentadentate or a hexadentate redox active monomeric moiety comprising a carbocyclic structure and at least one carbonyl group or a carboxyl group presented on the carbocyclic structure, L having a L-multiplicity $N_L$ and a redox potential of 0.5 V to 3.0 V with reference to Li/Li+ electrode potential under standard conditions or −2.54 V to −0.04 V with reference to SHE, and Y is a comonomeric moiety selected from a bidentate, tridentate, tetradentate, pentadentate and a hexadentate organic moiety, Y having a Y-multiplicity $N_Y$, wherein $N_D$ number of L is covalently linked to D, ($N_L$-1) number of Y is covalently linked to each L for each successive generation, $N_Y$ number of L is covalently linked to Y, and wherein $N_D$ ranges from 3 to 6, $N_Y$ and $N_L$ range independently from 2 to 6, with the proviso that at least one of $N_Y$ and $N_L$ is at least 3, and G≥3.

In particular in dendritic polymer of Formula (III) disclosed herein, dendritic core D has a D-multiplicity $N_D$ in which the D-multiplicity $N_D$ refers to the valence of the dendritic core D.

In general, the term multiplicity as used herein refers to the degree of denticity of a chemical moiety.

In particular, in dendritic polymer of Formula (III) described herein, D-multiplicity $N_D$ refers to the degree of denticity of a dendritic core D, which has a $N_D$ value of 3, 4, 5 and 6 for a tridentate, tetradentate, pentadentate and hexadentate dendritic core D respectively. Accordingly, in dendritic polymer of Formula (III) described herein, a dendritic core D can be tridentate, tetradentate, pentadentate and a hexadentate dendritic core D as will be understood by a skilled person. In particular, as used herein, a tridentate, tetradentate, pentadentate and a hexadentate dendritic core D refer respectively to a dendritic core that is covalently bonded to three, four, five and six organic moieties, the organic moiety can be a comonomeric moiety or a redox active monomeric moiety. For example, PAQN has $N_D$ value of three due to the core tridentate nitrogen (N).

In some embodiments, the dendritic core D of the dendritic polymer of Formula (II) is selected from the group consisting of

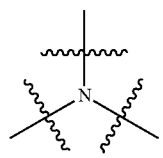
(IVd)

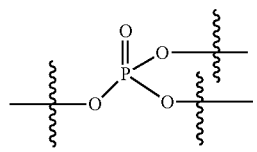
(IVf)

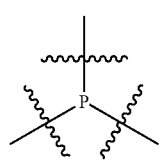
(IVf1)

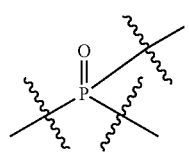
(IVf2)

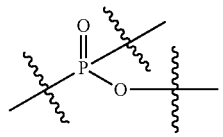
(IVf3)

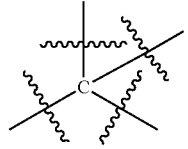
(IVg)

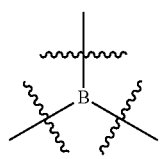
(IVh)

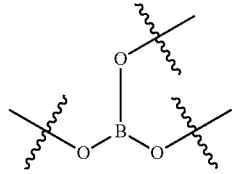
(IVi)

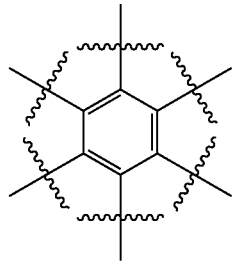
(IVj)

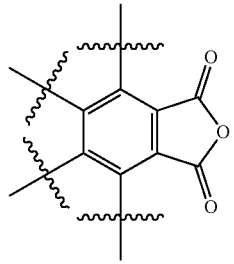
(IVk)

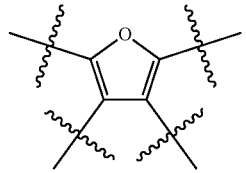
(IVl)

(IVm)

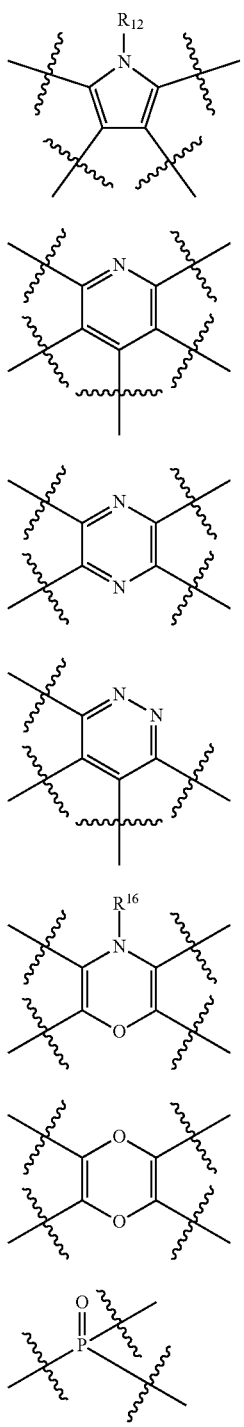

(IVn)
(IVt)
(IVv)
(IVw)
(IVz)
(IVa1)
(IVb1)

in which, $R^{12}$, is a H, linear or branched, substituted or unsubstituted C1-C4 aliphatic group.

Dendritic polymer of Formula (III) described herein comprise at least one redox active organic monomeric moiety L having a L-multiplicity NL.

In particular, dendritic polymer of Formula (III) described herein, L-multiplicity $N_L$ refers to the denticity of a redox active monomeric moiety L, which has a $N_L$ value of 2, 3, 4, 5 and 6 for a bidentate, tridentate, tetradentate, pentadentate and hexadentate monomeric moiety L respectively.

In some embodiments, the at least one redox active monomeric moiety L of the dendritic polymer of Formula (II) of the present disclosure is selected from the group consisting of

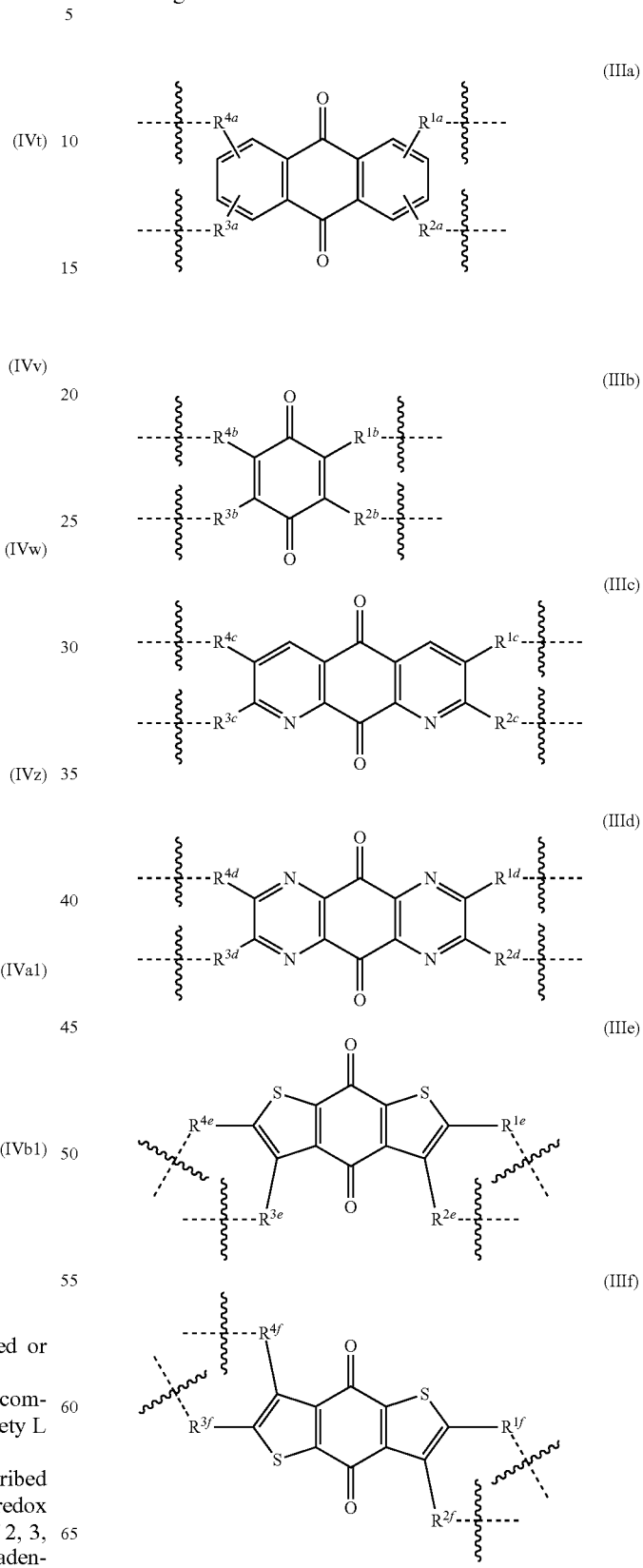

(IIIa)
(IIIb)
(IIIc)
(IIId)
(IIIe)
(IIIf)

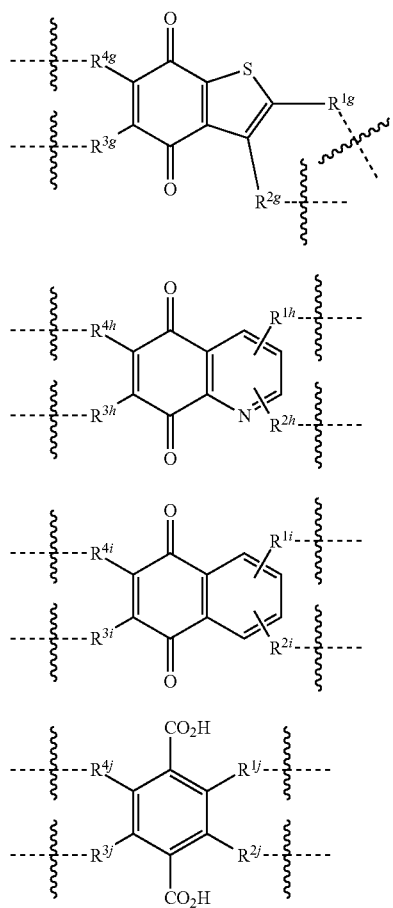

(IIIg)

(IIIh)

(IIIi)

(IIIj)

wherein dash line — represents a hydrogen or a single bond, with the proviso that at least two of the dash lines in each formula represents the single bond, and wherein $R^{1a\text{-}j}$, $R^{2a\text{-}j}$, $R^{3a\text{-}j}$, and $R^{4a\text{-}j}$ each independently represents null, H, OH, $NR^{10}$, SH, wherein $R^{10}$ is a H, linear or branched, substituted or unsubstituted C1-C4 aliphatic group, linear or branched, substituted or unsubstituted C1-C4 aliphatic group, wherein dash line — represents a hydrogen or a single bond, with the proviso that at least two of the dash lines in each of Formulas (IIIa-j) represents the single bond.

Dendritic polymer of Formula (II) described herein comprise at least one organic comonomeric moiety Y having a Y-multiplicity NY.

As used herein, a Y-multiplicity $N_Y$ refers to the valence of a comonomeric moiety Y, which has a $N_Y$ value of 2, 3, 4, 5 and 6 for a bidentate, tridentate, tetradentate, pentadentate and hexadentate comonomeric moiety Y respectively.

In some embodiments, the at least one comonomeric moiety Y of the dendritic polymer of Formula (II) is selected from the group consisting of

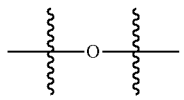

(IVa)

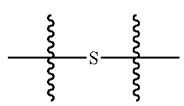

(IVb)

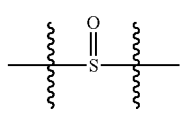

(IVb1)

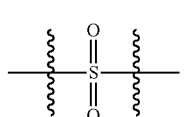

(IVc)

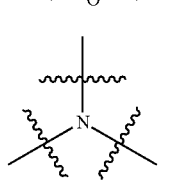

(IVd)

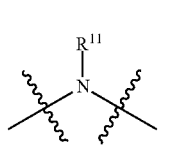

(IVe)

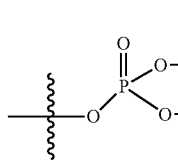

(IVf)

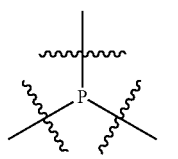

(IVf1)

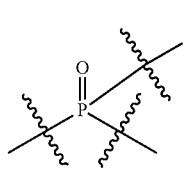

(IVf2)

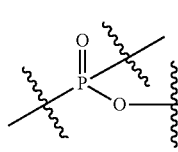

(IVf3)

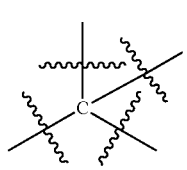

(IVg)

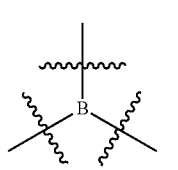

(IVh)

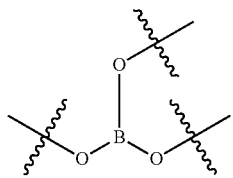
(IVi)
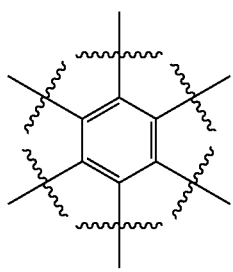
(IVj)
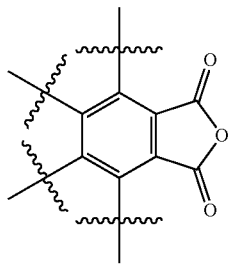
(IVk)
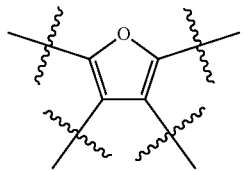
(IVl)
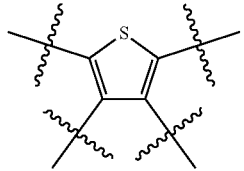
(IVm)
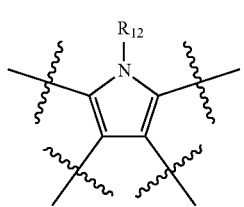
(IVn)
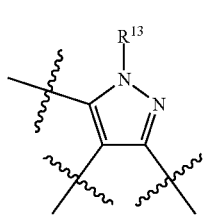
(IVo)
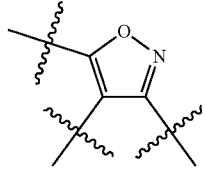
(IVp)
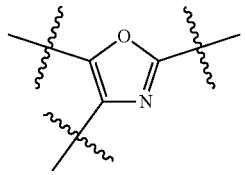
(IVq)
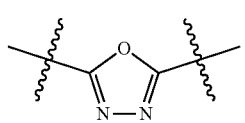
(IVr)
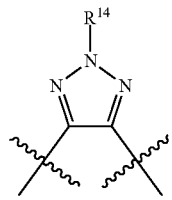
(IVs)
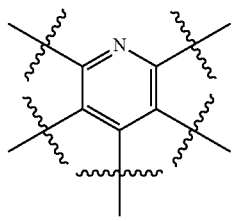
(IVt)
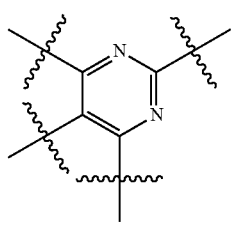
(IVu)
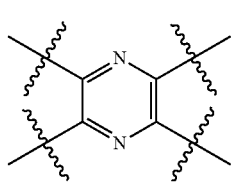
(IVv)
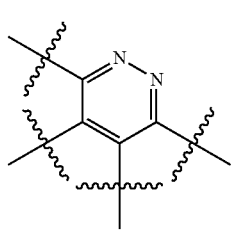
(IVw)

-continued (IVx)
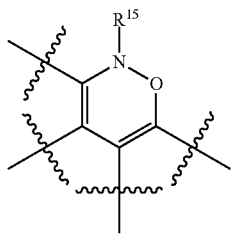

(IVy)
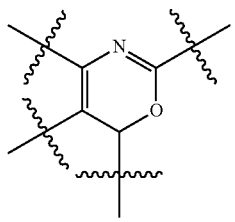

(IVz)
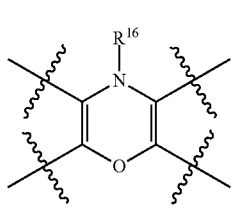

(IVa1)
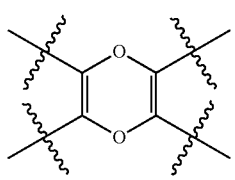

(IVb1)
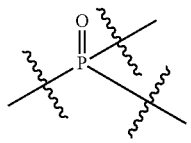

(IVc1)
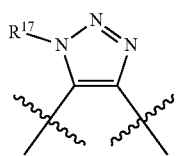

wherein $R^{11}$, $R^{12}$, $R^{13}$ $R^{14}$, $R^{15}$, $R^{16}$, and $R^{17}$ are independently a H, linear or branched, substituted or unsubstituted C1-C4 aliphatic group.

In the dendrimer as described herein $N_Y$ and $N_L$ ranges independently from 2 to 6, with the proviso that at least one of $N_Y$ and $N_L$ is at least 3.

In particular the parameter G indicates the generation number of the dendrimer as will be understood by a skilled person as dendrimers are typically classified by generation number. The common notation for this classification is GX followed by the name of the dendrimer, where X is a number referring to the generation number. A zero generation dendrimer is annotated as G0 followed by the name of the dendrimer; a first generation dendrimer is annotated as G1 followed by the name of the dendrimer and so on. For example, the zero generation PAQN dendrimer is annotated as G0 PAQN, the first generation PAQN dendrimer is annotated as G1 PAQN, the second generation PAQN dendrimer is annotated as G2 PAQN and so on.

In some embodiments, a dendritic network polymer can have the dendritic polymer comprising a dendritic polymer of Formula (VI)

(VI)
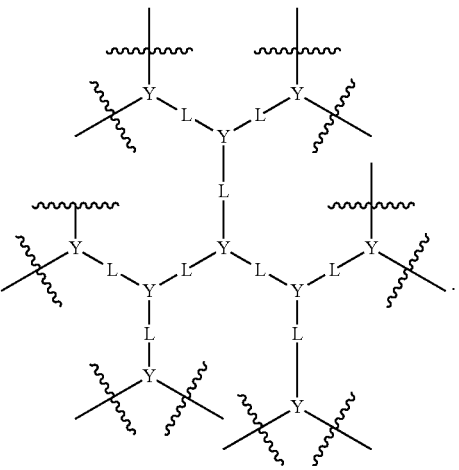

In some embodiments, a dendritic polymer herein described is a dendritic polymer of at least 2 generations and is represented by Formula (VII), wherein the dendritic polymer is terminated with a dimethyl amino group.

(VII)
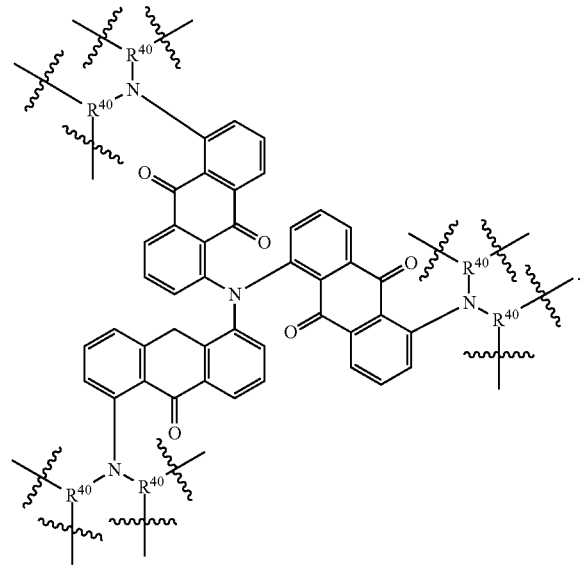

$R^{40}=$ 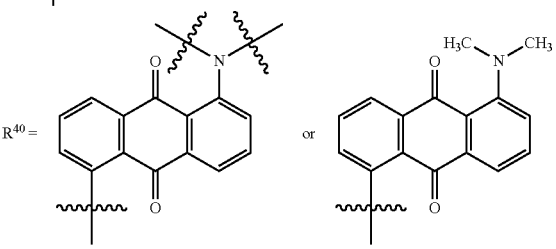

In some embodiments a network dendritic polymer herein described is a 4 to 7 generation dendrimer.

In some embodiments of a network dendritic polymer herein described the network polymer has a solubility in water of equal or less than 1.0 microgram per mL at room temperature.

In some embodiments, crosslinked network polymers of Formula (I) and crosslinked dendrimer polymers of Formula (II) can be formed by polymerization of branched monomers presenting two to 6 functional groups. In some additional or alternative embodiments, network polymers of Formula I can be formed by polymers crosslinked by UV, heath or other crosslinking agents to reach a desired degree of denticity (see Examples section)

The performance of crosslinked network polymers of Formula (I) and crosslinked dendrimer polymers of Formula (II as conductive material is expected to increase with a higher denticity of the respective monomers taking into account the type of conductive material desired. A desired denticity can be identified by a skilled person in view of the to density and amount of polymer that can be compressed in the desired electrode. This limit can be identified with a method where one test compressibility of the polymer given the dimension of the electrode material desired.

The performance of crosslinked network polymers of Formula (I) and crosslinked dendrimer polymers of Formula (II) as conductive material is expected to increase with a decreased solubility of the polymer in alkaline solution used for the electrochemical cell where the material is to be included. Accordingly in some embodiments crosslinked polymers herein described can have monomers having a pKa (the negative base-10 logarithm of the acid dissociation constant (Ka) of a solution according to equation pKa=−log 10Ka) larger than 14.

In some embodiments, crosslinked polymers herein described can have monomers comprising hydrocarbon and unsubstituted moieties where the presence of functional groups increasing solubility of the monomers is reduced or minimized. For example, amine functional groups are acceptable in alkaline electrolyte solutions.

Since in crosslinked network polymers herein described redox active moieties Q and L have a redox potential of 0.5 V to 3.0 V with reference to Li/Li+ electrode potential under standard conditions of −2.54 V to −0.04 V with reference to SHE, to increase or decrease the redox potential of a starting redox active monomeric moiety, a substituent group can be selected, based on the Hammett Sigma constant such as the constants shown in the following Table 1.

TABLE 1

Hammett Sigma Constants*

| Group | $\sigma$meta | $\sigma$para | $\sigma$I | $\sigma$v | $\pi$ | $E_s$ | MR |
|---|---|---|---|---|---|---|---|
| H | 0.00 | 0.00 | 0.00 | 0.00 | 0.00 | 0.00 | 1.03 |
| $CH_3$ | −0.07 | −0.17 | −0.04 | 0.52 | 0.56 | −1.24 | 5.65 |
| $C_2H_5$ | −0.07 | −0.15 | −0.05 | 0.56 | 1.02 | −1.31 | 10.30 |
| n-$C_3H_7$ | −0.07 | −0.13 | −0.03 | 0.68 | 1.55 | −1.60 | 14.96 |
| i-$C_3H_7$ | −0.07 | −0.15 | −0.03 | 0.76 | 1.53 | −1.71 | 14.96 |
| n-$C_4H_9$ | −0.08 | −0.16 | −0.04 | 0.68 | 2.13 | −1.63 | 19.61 |
| t-$C_4H_9$ | −0.10 | −0.20 | −0.07 | 1.24 | 1.98 | −2.78 | 19.62 |
| $H_2C=H$** | 0.05 | −0.02 | 0.09 | 2.11 | 0.82 | | 10.99 |
| $C_6H_5$** | 0.06 | −0.01 | 0.10 | 2.15 | 1.96 | −3.82 | 25.36 |
| $CH_2Cl$ | 0.11 | 0.12 | 0.15 | 0.60 | 0.17 | −1.48 | 10.49 |
| $CF_3$ | 0.43 | 0.54 | 0.42 | 0.91 | 0.88 | −2.40 | 5.02 |
| CN | 0.56 | 0.66 | 0.53 | 0.40 | −0.57 | −0.51 | 6.33 |
| CHO | 0.35 | 0.42 | 0.25 | | −0.65 | | 6.88 |
| $COCH_3$ | 0.38 | 0.50 | 0.29 | 0.50 | −0.55 | | 11.18 |
| $CO_2H$** | 0.37 | 0.45 | 0.39 | 1.45 | −0.32 | | 6.93 |
| $Si(CH_3)_3$ | −0.04 | −0.07 | −0.13 | 1.40 | 2.59 | | 24.96 |
| F | 0.34 | 0.06 | 0.52 | 0.27 | 0.14 | −0.46 | 0.92 |

TABLE 1-continued

Hammett Sigma Constants*

| Group | $\sigma$meta | $\sigma$para | $\sigma$I | $\sigma$v | $\pi$ | $E_s$ | MR |
|---|---|---|---|---|---|---|---|
| Cl | 0.37 | 0.23 | 0.47 | 0.55 | 0.71 | −0.97 | 6.03 |
| Br | 0.39 | 0.23 | 0.50 | 0.65 | 0.86 | −1.16 | 8.88 |
| I | 0.35 | 0.18 | 0.39 | 0.78 | 1.12 | −1.40 | 13.94 |
| OH | 0.12 | −0.37 | 0.29 | 0.32 | −0.67 | −0.55 | 2.85 |
| $OCH_3$ | 0.12 | −0.27 | 0.27 | 0.36 | −0.02 | −0.55 | 7.87 |
| $OCH_2CH_3$ | 0.10 | −0.24 | 0.27 | 0.48 | 0.38 | | 12.47 |
| SH | 0.25 | 0.15 | 0.26 | 0.60 | 0.39 | −1.07 | 9.22 |
| $SCH_3$ | 0.15 | 0.00 | 0.23 | 0.64 | 0.61 | −1.07 | 13.82 |
| $NO_2$** | 0.71 | 0.78 | 0.76 | 1.39 | −0.28 | −2.52 | 7.36 |
| NO | 0.62 | 0.91 | 0.37 | | −0.12 | | 5.20 |
| $NH_2$ | −0.16 | −0.66 | 0.12 | | −1.23 | −0.61 | 5.42 |
| NHCHO | 0.19 | 0.00 | 0.27 | | −0.98 | | 10.31 |
| $NHCOCH_3$ | 0.07 | −0.15 | 0.26 | | −0.37 | | 16.53 |
| $N(CH_3)_2$ | −0.15 | −0.83 | 0.06 | 0.43 | 0.18 | | 15.55 |
| $N(CH_3)_3^+$ | 0.88 | 0.82 | 0.93 | 1.22 | −5.96 | | 21.20 |

*$\sigma$meta, $\sigma$para = Hammett constants; $\sigma$I = inductive sigma constant; $\sigma$v = Charton's v (size) values; p = hydrophobicity parameter; Es = Taft size parameter; MR = molar refractivity (polarizability) parameter.
**indicates that the group is in the most sterically hindered conformation.

For example, to increase redox potential of a starting redox active monomeric moiety having an aromatic ring, a CN or a $CF_3$ group can be comprised as can be comprised in view of the related Hammett Sigma Constant. Additional modifications to increase or decrease the redox potential of a starting moiety will be understood by a skilled person upon reading of the present disclosure.

Crosslinked polymers herein described, can be comprised within an electrode composition further a binder, and a conductive additive. In particular electrode compositions herein described can comprise one or more of the network polymer of Formula (I) herein described and/or dendrimer polymer of formula (II) herein described as will be understood by a skilled person upon reading of the disclosure. Preferably in the electrode composition the crosslinked polymer a solubility in water of equal or less than 1.0 microgram per mL at room temperature.

In some embodiments of an electrode composition comprising a crosslinked polymer, a binder, and a conductive additive, the binder can be 0.5-10% by weight of one selected from the group of Polytetrafluoroethylene (PTFE), Styrene-butadiene or styrene-butadiene rubber (SBR), poly (vinylidene-fluoride) (PVDF), poly(tetrafluoroethylene), sodium carboxymethylcellulose (CMC), styrene-butadiene rubber, polyacrylic acid (PAA), polyvinyl alcohol (PVA), polyethylene glycol (PEG or PEO), polyamide imide (PAI), Polyacrylonitrile (PAN) Xanthan Gum, Gum Arabic, and Agar any combination thereof.

In some embodiments of an electrode composition comprising a crosslinked polymer, the crosslinked polymer can be present in 60 to 90% percent by weight of the total electrode composition. With increased conductivity of the active material or network polymer, the amount of conductive additives in the electrode can be reduced appropriate while maintaining the same degree of the conductivity for the electrode composition. With increased stability of active material or network polymer, the amount of binders in the electrode can be reduced accordingly physical stability of the electrode composition.

In some embodiments of an electrode composition comprising network polymer, a binder, and a conductive additive, the conductive additive can be 5-25% by weight of one selected from the group of Carbon Black (Acetylene Black, Super P Li, C-nergy, Ketjen Black-300, Ketjen Black-600), Imerys (Super P, C-Nergy), carbon nanotubes (C-Nano, Tuball), graphene (xGnP Grade R, xGnP Grade H, xGnP Grade C, xGnP Grade M) and Graphite (KS-4, KS-8, KC-4, KC-8), and nickel powder or any combination thereof.

As used herein, a binder as used herein refers to a polymeric material which is non redox active under the battery working condition but enhance the adhesion of the composition to a metal surface on the electrode and maintains contact to conductive additives.

In some embodiments, the binder for the electrode composition as described herein can be selected from one of Polytetrafluoroethylene (PTFE), Styrene-butadiene or styrene-butadiene rubber (SBR), poly(vinylidene-fluoride) (PVDF), poly(tetrafluoroethylene), sodium carboxymethylcellulose (CMC), styrene-butadiene rubber, polyacrylic acid (PAA), polyvinyl alcohol (PVA), polyethylene glycol (PEG or PEO), polyamide imide (PAI), Polyacrylonitrile (PAN) Xanthan Gum, Gum Arabic, and Agar any combination thereof.

In some embodiments, the binder for the electrode composition as described herein is present in 1 to 20% by weight of the total electrode composition.

As used herein, a conductive additive is a solid material which when present in the electrode composition enhances the electrical conductivity of the resulting electrode composition.

In some embodiments, the conductive additive for the electrode composition as described herein can be selected from carbon materials such as graphite, carbon black, acetylene black, and Super-P carbon, as well other electrically conduction particles such as nickel powder or any combination thereof.

In some embodiments, the conductive additive for the electrode composition as described herein is present in 5 to 70% by weight of the total electrode composition.

In some embodiments an electrode composition of the disclosure can comprise comprising a network polymer of Formula (I) herein described and/or a network dendrimer of Formula (II) herein described, in addition to a binder, and a conductive additive.

In particular, electrode active materials comprised in electrode composition according with the present disclosure can incorporate organic quinone redox centers (for example, 1,4-benzoquinone and 9,10-anthraquinone) are of interest due to their low redox potential (~2 V vs. Li+/Li) and high capacity (~200 mAh/g for a two-electron reduction process, based on a single anthraquinone group).

In some embodiment, an electrode composition of the disclosure can comprise comprising a network polymer of Formula (I) herein described and/or a network dendrimer of Formula (II) herein described, in addition to PTFE as binder and Carbon Black as conductive additive.

In some embodiment, an electrode composition of the disclosure can comprise comprising a network polymer of Formula (I) herein described and/or a network dendrimer of Formula (II) herein described, and between 70-87% by weight of active polymer material and between 3-10% by weight of binder and 10-20% by weight of conductive additive.

In some embodiments, an electrode composition of the present disclosure preferably comprises PTFE and Carbon Black.

Electrodes are preferably formed with between 70-87% active polymer material and between 3-10% binder and 10-20% conductive additive.

In embodiments herein described, network polymers of the present disclosure can be incorporated into functional electrodes by mixing with suitable binder and conductive additive. Mixing methods include planetary mixing and high shear mixing.

Electrode formation methods include drop casting, doctor blade casting, spin coating, comma-roll coating and extrusion. In some embodiments, the composition of electrodes may vary from 30-100 wt % active material, 5-70 wt % conductive additive and 1-20 wt % binder with the total wt % of all species summing to 100%.

After mixing and coating of such electrodes, the electrodes are subjected to pressure through calendaring, followed by heating at temperatures above 50° C. Calendaring may be achieved using a heated or unheated roller.

In embodiments herein described a network polymer of the disclosure can be comprised within an electrochemical cell.

As used herein, an "electrochemical cell" refers to a device capable of generating electrical energy by chemical reaction, or a device capable of using electrical energy to drive a chemical reaction, or both.

The electrochemical cells which generate an electric current are called voltaic cells or galvanic cells and those that generate chemical reactions, via electrolysis for example, are called electrolytic cells.

In particular voltaic cell (galvanic cell) is an electrochemical cell that generates electrical energy through redox (reduction-oxidation) reactions in the cell. An electrochemical cell can also use externally applied electrical energy to drive a redox reaction within the cell, referred to as an electrolytic cell. A fuel cell is an electrochemical cell that generates electrical energy from a fuel through electrochemical reaction of hydrogen with an oxidizing agent.

A voltaic cell or a redox generating electrochemical cell can include a permeable barrier between the two electrodes that allow anions and/or cations to pass from the electrolyte in contact with one electrode to the electrolyte in contact with the other electrode.

As used herein, "electrode" refers an electrically conductive material that makes contact with a non-conductive element. In the case of an electrochemical cell, the non-conductive element is an electrolyte where the chemical reactions occur. The two types of electrodes in cell are the anode and cathode. The anode is the electrode where electrons leave the electrochemical cell and where oxidation occurs. The cathode is the electrode where electrons enter the cell and where reduction occurs. By convention, anodes are considered "negative" and cathodes are considered "positive" when producing electrical energy. When the cell is using electrical energy to drive a reaction (e.g. when a rechargeable battery is charging), then the cathode is negative with respect to the anode's polarity and the convention is usually (but not always) reversed. A cell can change between energy producing (voltaic) and redox producing (electrolytic) by changing the externally applied voltage between the electrodes (changing the direction of the current through the cell).

An "electric current" or "electrical current" by the sense of the description can be described as a flow of positive charges or as an equal flow of negative charges in the opposite direction. Electrical current, by convention, goes from cathode to anode (the opposite of the flow of electrons) outside the cell, regardless of method of operation (voltaic vs. electrolytic).

The electrochemical cell as described herein can contain a cathode on a metal substrate with current collector and an anode on a metal substrate with current collector which are separated by a semipermeable insulative membrane. The cell contains an aqueous salt solution that conducts ions. These components are placed within a container. Any of the cathode or anode can comprise the redox active composition as described herein.

In particular in some embodiments, an electrochemical cell is described comprising an anode, a cathode and an aqueous electrolyte, wherein the anode electrode comprises the network polymer of Formula (I) and/or the network dendrimer of Formula (II) herein described.

As used herein, "electrolyte" refers to a liquid or mixture of liquid and solid that contains at least a cation and a counterion for conducting ions during an electrochemical reaction in an electrochemical cell. In some embodiments as described herein, the cation of the electrolyte can be lithium ion.

The electrolyte as described herein can have a mixture of a cyclic carbonate of ethylene carbonate (EC) or monofluoroethylene carbonate (FEC) co-solvent, ethyl methyl carbonate (EMC), a flame retardant additive, a lithium salt, and an electrolyte additive that improves compatibility and performance of the lithium-ion battery.

The lithium salt of the electrolyte as described herein can be selected from the group consisting of lithium hexafluorophosphate ($LiPF_6$), lithium tetrafluoroborate ($LiBF_4$), lithium bis(oxalato)borate (LiBOB), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), and mixtures thereof.

The electrolyte additive as described herein can include lithium bis(oxalato)borate (LiBOB), lithium difluoro(oxalato)borate (LiODFB), lithium tetrafluorooxalatophosphate ($LiPF_4(C_2O_4)$), and mixtures thereof.

The flame retardant additive of the electrolyte as described herein can selected from the group consisting of triphenyl phosphate (TPhPh/TPP/TPPa), tributyl phosphate (TBP/TBuPh), triethyl phosphate (TEP/TEtPh), bis(2,2,2-trifluoroethyl)methyl phosphonate (BTFEMP/TFMPo), tris (2,2,2-trifluoroethyl) phosphate, diethyl ethylphosphonate, diethyl phenylphosphonate, and mixtures thereof.

In embodiments of electrochemical cells herein described, network polymers are comprised within electrodes. If these electrodes are intended to function as the anode in such cells, these electrochemical cells may also comprise suitable cathode such as nickel hydroxide ($Ni(OH)_2$), lead sulfate ($PbSO_4$), lithium cobalt oxide ($LiCoO_2$), lithium nickel-manganese-cobalt oxide ($LiNi_xMn_yCo_zO_2$ where x+y+z=1), lithium nickel-cobalt-aluminum oxide ($LiNi_xCo_yAl_zO_2$ where x+y+z=1), lithium manganese oxide ($LiMn_2O_4$), lithium nickel oxide ($LiNiO_2$), lithium vanadium oxide ($LiV_2O_5$) and lithium iron phosphate ($LiFePO_4$), for example. Suitable separators for such cells include membranes made from microporous poly(olefin) materials, nylon, ceramics such as silicon oxide or zirconium oxide, fiberglass or other glass materials, poly(imides) and other porous, electrically insulating films. In some embodiments, such separator membranes can be between 500 nm and 10 mm thickness. These electrochemical cells may feature aqueous electrolytes of pH between 0-14 at room temperature, and may comprise one or more salts of lithium, sodium and/or potassium such as $Li_2SO_4$, LiGH, $LiClO_4$, $LiCH_3CO_2$ $LiCF_3CO_2$, LiI, LiBr, LiCl LiF, at concentrations from 0.01-10 M, for example. In addition, the aqueous electrolyte may comprise surfactant material such as sodium lauryl sulfate or Triton X-100 at concentrations of 0.01-10 vol % to improve wetting properties of the materials with the electrolyte.

In some embodiments of an electrochemical cell of the disclosure, redox active monomeric moiety contains thiophene or anthraquinone and the electrolyte was 1.0 M $LiPF_6$ in EC:DEC (50:50 v/v). EC and DEC refer to ethylene carbonate and diethyl carbonate respectively.

In an alternative embodiment, these electrochemical cells can feature non-aqueous electrolytes including organic solvents such as propylene carbonate, ethylene carbonate, dialkyl carbonate, glymes, acetonitrile, alongside one or more salts of lithium, sodium and/or potassium such as lithium hexafluorophosphate ($LiPF_6$), lithium hexafluoroarsenate ($LiAsF_6$), lithium perchlorate ($LiClO_4$), lithium tetrafluoroborate ($LiBF_4$), lithium trifluoromethanesulfonate ($LiCF_3SO_3$), lithium trifluoroacetate ($LiCF_3CO_2$), lithium tetrachloroaluminate ($LiAlCl_4$), lithium bis(trifluoromethanesulfonyl)imide ($Li[CF_3SO_2]_2N$, LiTFSI), lithium bis(fluorosulfonyl)imide ($Li[FSO_2]2N$, LiFSI), lithium bis(oxalato)borate ($Li[C_2O_4]_2B$, LiBOB), lithium iodide (LiI), lithium bromide (LiBr), lithium chloride (LiCl) and lithium fluoride (LiF) at concentrations from 0.01-1 M, for example. In particular, the electrodes as described in this disclosure may function as the cathode in such non-aqueous cells, and low-potential metallic or alloy species such as, but not limited to, lithium metal, lithiated graphite, lithium-silicon alloy, magnesium or sodium as the anode.

In such non-aqueous cell embodiments as described above where Li metal features as the anode, the open circuit voltage of the cell (and, hence, the relative potential of the cathode vs. $Li^+/Li$) can be 2.8-3.1 V.

Figure 41:
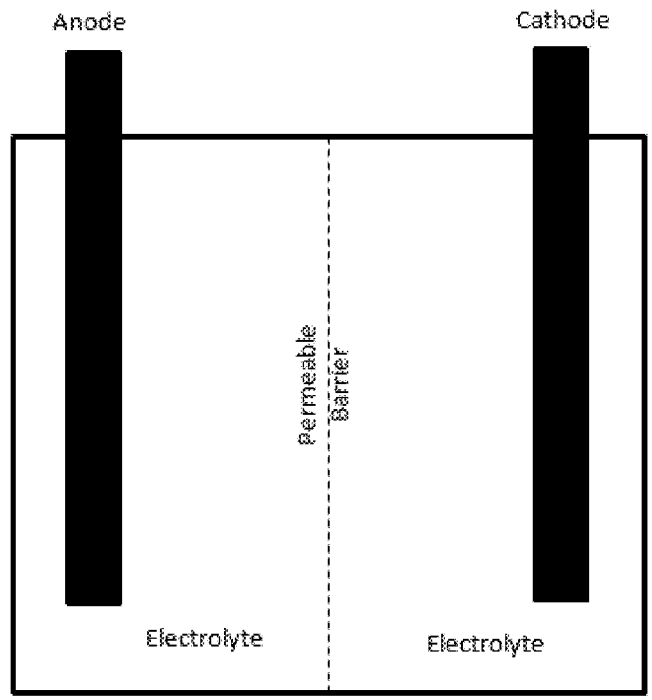
FIG. 41 top panel shows a schematic representation of an exemplary electrochemical cell comprising a network polymer herein described
Figure 41:
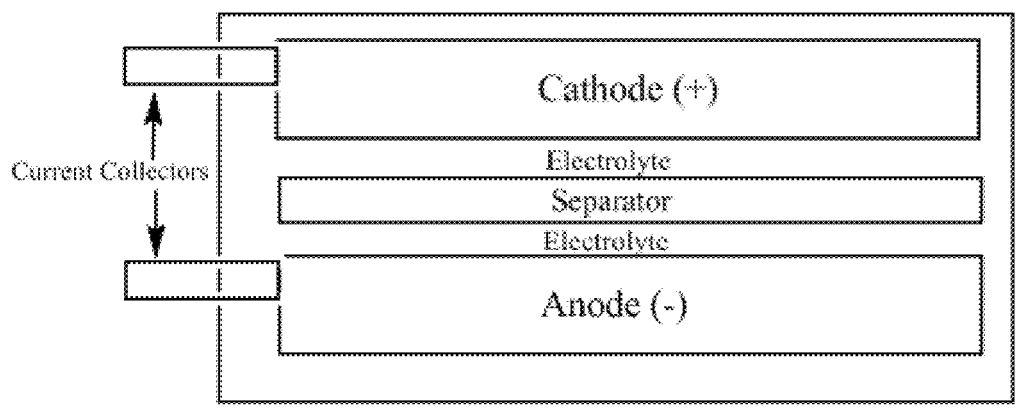

Schematic illustration of possible configuration of an electrochemical cells are illustrated in FIG. 41.

In particular FIG. 41 top panel shows an exemplary electrochemical cell including an anode, a cathode and an electrolyte disposed between the anode and cathode with an optional permeable barrier dividing the electrolyte into two ionically communicative portions. FIG. 41 bottom panel shows an exemplary electrochemical cell in a pouch housing including an anode, a cathode and their respective current collectors and an electrolyte disposed between the anode and cathode with an optional separator dividing the electrolyte into two ionically communicative portions.

In some embodiments, of the present disclosure one or more electrochemical cells can be comprised within a battery.

As used herein, a "battery" is a device consisting of one or more electrical energy generating electrochemical cells arranged in parallel (for increased capacity) or serial (for increased voltage). Battery types include zinc-carbon, alkaline, nickel-oxyhydroxide, lithium, mercury oxide, zinc-air, Zamboni pile, silver-oxide, magnesium, nickel-cadmium, lead-acid, nickel-metal hydride, nickel-zinc, silver-zinc, lithium-iron-phosphate, lithium ion, and others as could be understood by a skilled person.

In particular, a battery according to this disclosure can include one or more electrochemical cells as described herein and may additionally include a first electrode coupled to an anode of the one or more electrochemical cells, a second electrode coupled to a cathode of the one or more electrochemical cells, and a casing or housing encasing the one or more electrochemical cells.

In some embodiments a battery in the sense of disclosure consists of one or more electrochemical cells, connected either in parallel, series or series-and-parallel pattern. In some embodiments, the battery can include a plurality of electrochemical cells can be linked in series or parallel based on performance demands including voltage requirement, capacity requirement.

In some embodiments, electrochemical cell as described can be electrically connected in series to increase voltage of the battery thereof.

In some embodiments, electrochemical cell as described can be electrically connected in parallel to increase charge capacity of the battery thereof.

In some embodiments, the battery as described herein can take a shape of a pouch, prismatic, cylindrical, coin.

Figure 42:
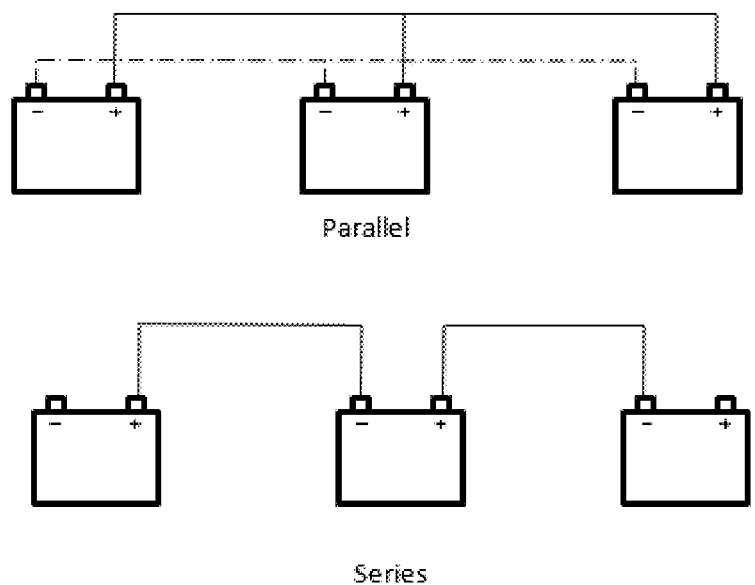
FIG. 42 shows exemplary arrangement of a plurality of electrochemical cells in a battery herein described.
Figure 43:
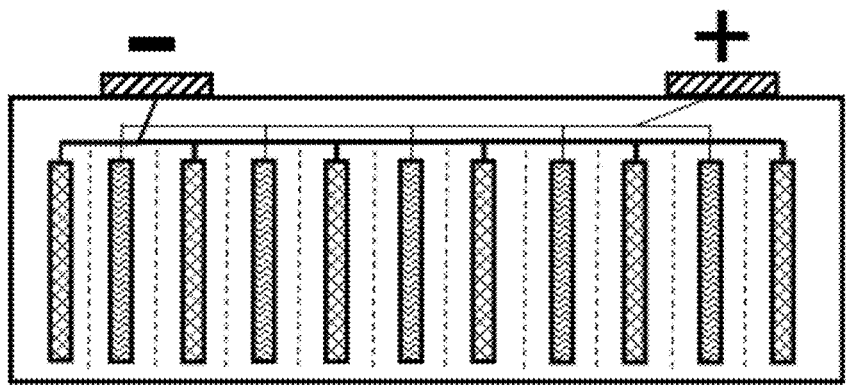
FIG. 43 shows a schematic representation of an exemplary plurality of electrically connected electrochemical cells in accordance with the disclosure.
Figure 43:
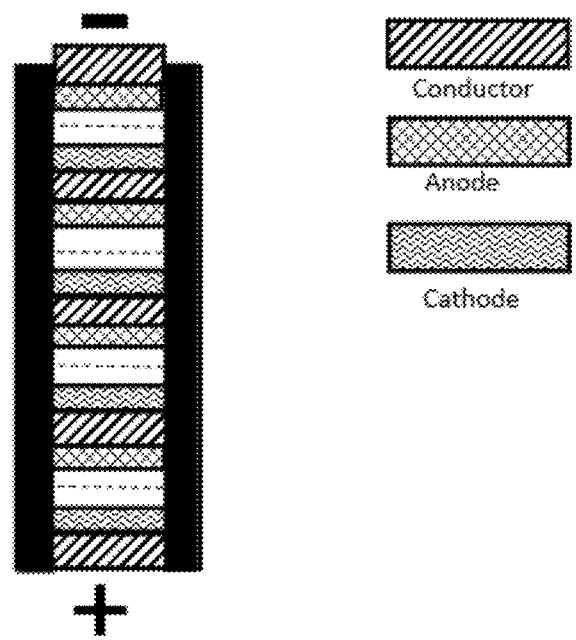

A schematic illustration of the arrangement of the electrochemical cells in a batter of the disclosure is illustrated in FIGS. 42 and 43.

FIG. 42 shows exemplary arrangement of a plurality of electrochemical cells in a battery. The top panel of FIG. 42 shows a plurality of electrically connected electrochemical cells that electrically connected in parallel, whereas the bottom panel of FIG. 42 shows a plurality of electrically connected electrochemical cells that electrically connected in series. A battery of three cells connected in parallel has a capacity of three times that of the individual cell. A battery of three cells connected in series has a voltage of three times that of the individual cell.

The top panel of FIG. 43 shows a plurality of electrically connected electrochemical cells that electrically connected in parallel in an overlapping configuration, whereas the bottom panel of FIG. 43 shows a plurality of electrically connected electrochemical cells that electrically connected in series.

The battery can be configured as a primary battery, wherein the electrochemical reaction between the anode and cathode is substantially irreversible or as a secondary battery, wherein the electrochemical reactions between the anode and cathode are substantially reversible.

Battery comprising network polymer and electrochemical cells of the disclosure are long life battery. A used herein, a long life for a battery indicates a battery that can charge/discharge for over 1,000 cycles, while retaining 70% of charge capacity. In some embodiments, a battery as described herein can have a life-time of at least four years. In some embodiments, a battery as described herein can have charge/discharge for over 1,200 cycles, while retaining 70% of charge capacity.

Network polymers herein described to be included in electrochemical cells and batteries in accordance with the invention can be provided according to methods identifiable by a skilled person upon reading of the present disclosure In particular, a crosslinked network polymer in the sense of the disclosure can be provided by a method for making a crosslinked network polymer comprising providing a redox active monomer comprising a redox active monomeric moiety Q comprising a carbocyclic structure and at least one carbonyl group or a carboxyl group presented on the carbocyclic structure optionally substituted with three to five functional groups, the redox active monomeric moiety Q having a redox potential of 0.5 V to 3.0 V with reference to Li/Li+ electrode potential under standard conditions or −2.54 V to −0.04 V with reference to SHE;

providing a comonomer comprising a comonomeric moiety Z selected from a organic moiety substituted with two to 6 functional groups, contacting the redox active monomer and the comonomer for a time and under conditions to allow reaction of the redox active moiety Q with the comonomeric moiety Z to provide the network polymer of Formula (I) herein described wherein at least one of Q and Z of each monomer of the crosslinked polymer is a tridentate, tetradentate, pentadentate or a hexadentate organic moiety linked to at least one of Q and Z of another monomer of the crosslinked polymer.

In particular, in embodiments of the method for making a crosslinked network polymer herein described, the contacting can be performed through a number of synthetic strategies to form network polymers of Formula (I) and in particular network polymers of Formula (I) including quinone and/or anthraquinone redox moieties. Such network polymers are non-linear, as the constituent monomer units are linked to a number of other monomer groups (for example, by 3 or 4 linkages or "cross-links") so the structure of the polymer is protected against potential solvolysis breaking the material into short linear species, and volume change during cycling is minimized; both of which will result in significantly enhanced cycle life. In this disclosure such species are described, their preparation, characterization, polymerization and use as electrode materials in electrochemical cells.

In one embodiment, the contacting can be performed by co-polymerizing of a suitably-substituted quinone-containing monomer such as a dichlorobenzoquinone, dichloronaphthoquinone or dichloroanthraquinone with a tri- or higher-substituted aromatic and/or carbonyl-containing co-monomer such as tetrachlorophthalic anhydride or 1,3,4-dichlorobenzene. The quinone-comprising monomer may be substituted with 2 or more leaving groups such as chloro-, bromo- or iodo-groups, and may additionally be substituted with alkyl or aryl groups including those that contain heteroatoms, as are commonly understood in Organic Chemistry textbooks and understood by those skilled in the art. Similarly, the aromatic and/or carbonyl-comprising co-monomer may be substituted with 3, 4, 5, 6 or more leaving groups and may additionally be substituted with alkyl or aryl groups including those that contain heteroatoms. The aromatic group may be a hydrocarbon structure such as benzene, naphthalene, anthracene, pyrene, chrysene and similar annulenes, or may comprise a heteroatom-substituted aromatic structure such as thiophene, furan, pyrrole, pyridine or indene. The carbonyl group may be an aldehyde or ketone, ester, anhydride, amide, sulfone or sulfoxide. Formation of block, random, alternating and/or tapered co-polymers of such monomers by reaction with nucleophiles will lead to networks due to the polysubstitution pattern of the second monomer (FIG. 1). Suitable nucleophiles include those that are divalent, forming a linear bridge between each monomer unit at each substitution point. These include, but are not limited to, sulfide anions and oxide anions. In some cases in FIG. 1, R is equivalent to R', R' is equivalent to R", and R is equivalent to R" (e.g., the monomer unit is the same and the material is a network homopolymer). In other cases, R' is equivalent to R" but is different to R (e.g., two different monomers are co-polymerized). In yet other cases, R, R' and R" are all different (e.g., three different monomers are co-polymerized). The degree of branching can further be tuned by adjusting the stoichiometric ratios of the starting monomer materials.

Figure 2:
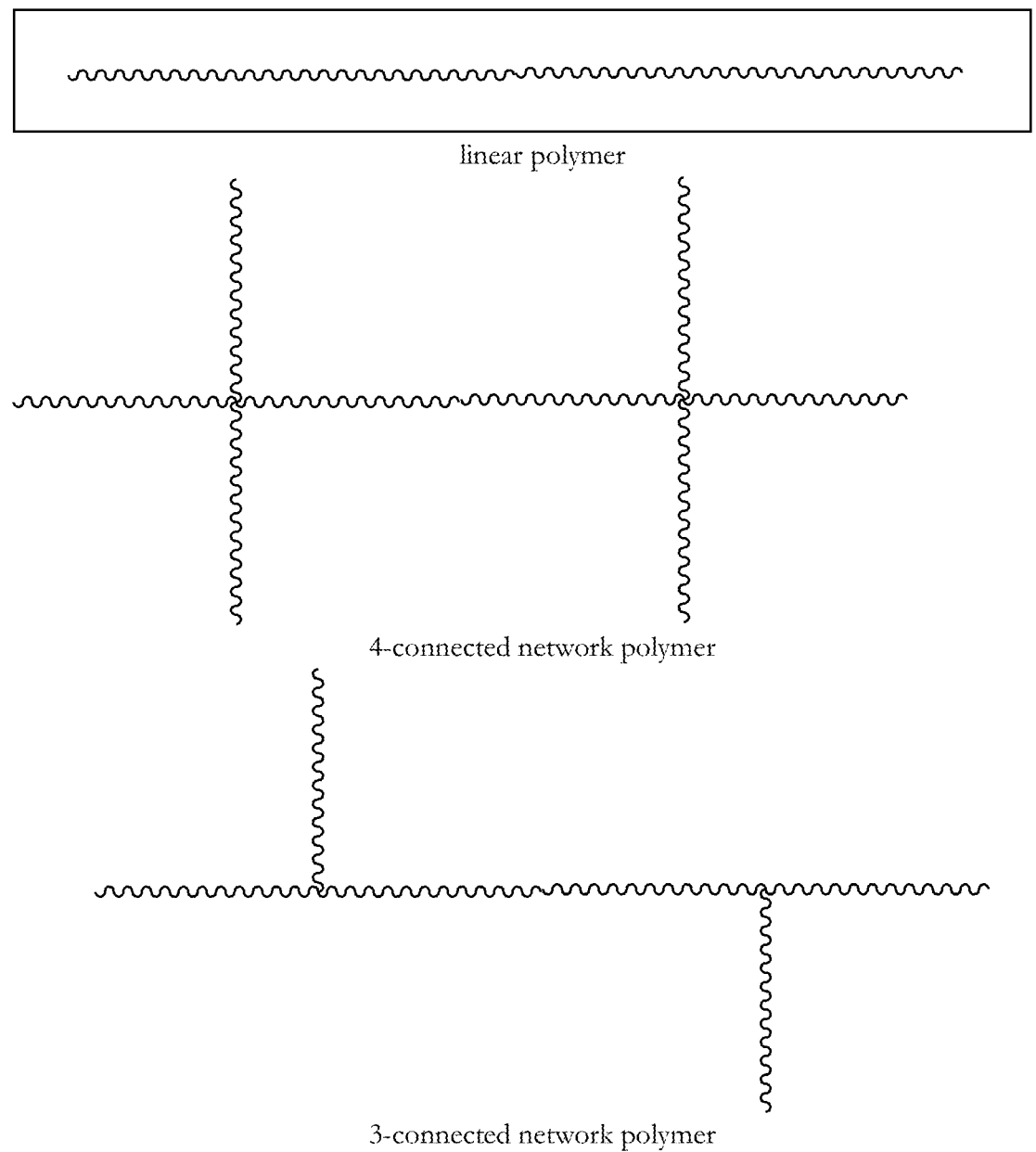
FIG. 2 shows topological differences between a linear polymer and 4- and 3-connected network polymers.
Figure 3:
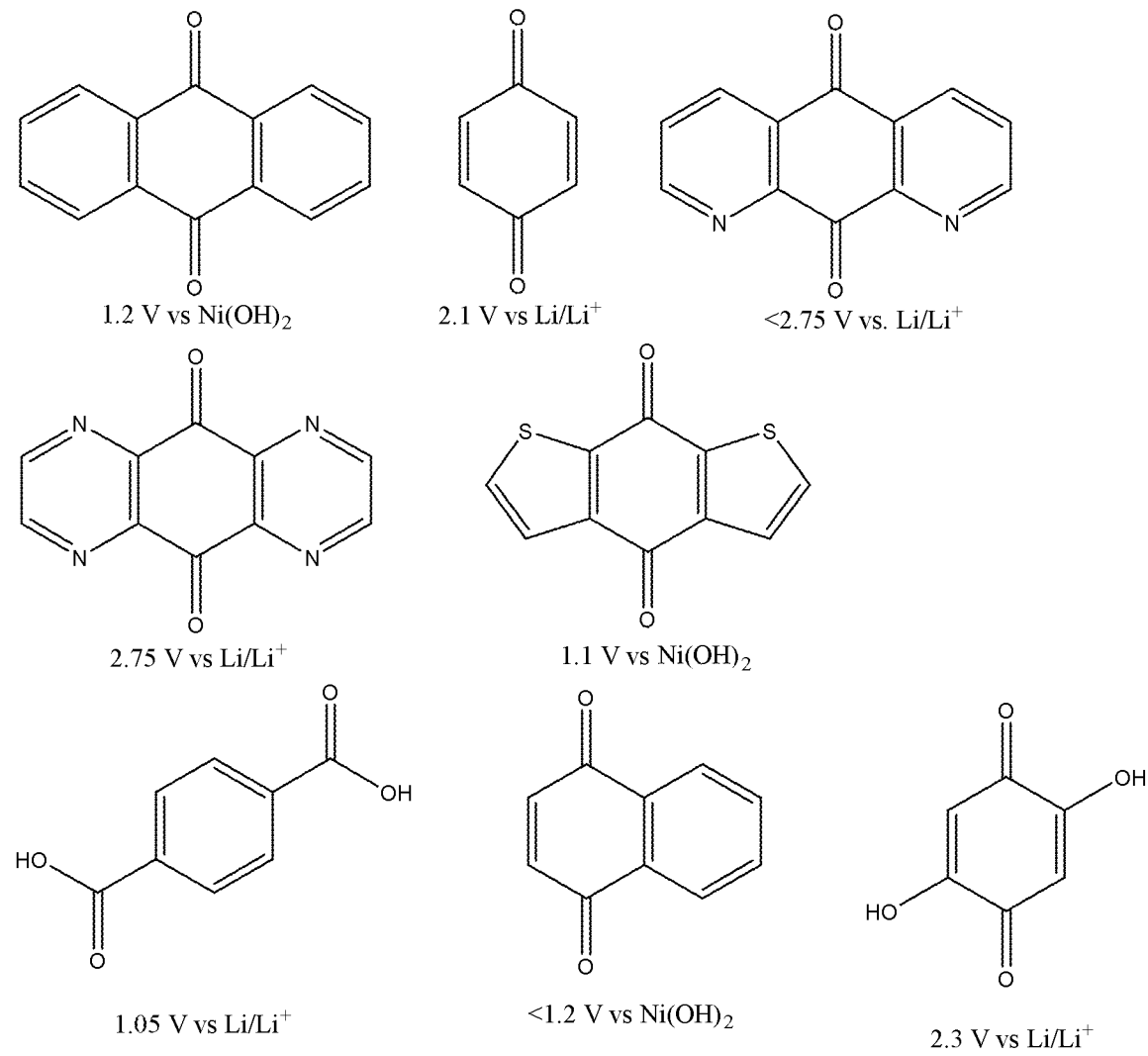
FIG. 3 shows exemplary redox active monomeric moieties of the present disclosure with corresponding redox potentials vs. $Ni(OH)_2/NiOOH$ or $Li/Li^+$ electrode potential under standard conditions.
Figure 4:
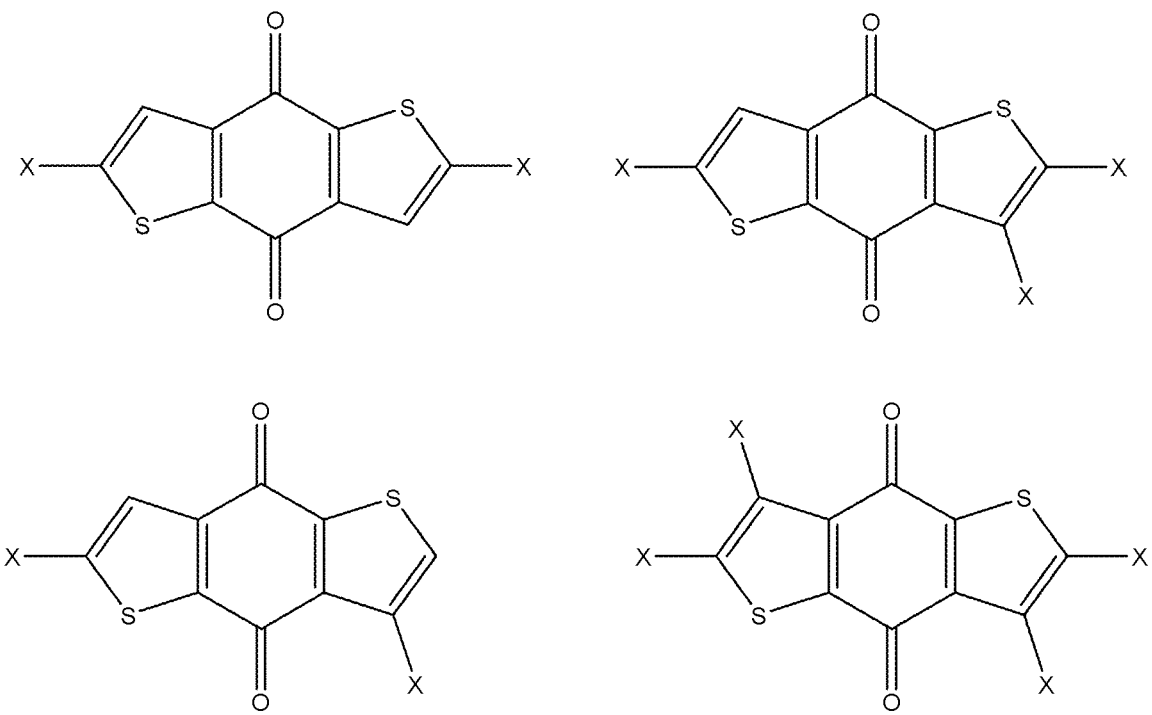
FIG. 4 shows exemplary redox active monomers for benzodithiophene monomeric moiety in which X can be a leaving group such as Cl, Br, or I.
Figure 5:
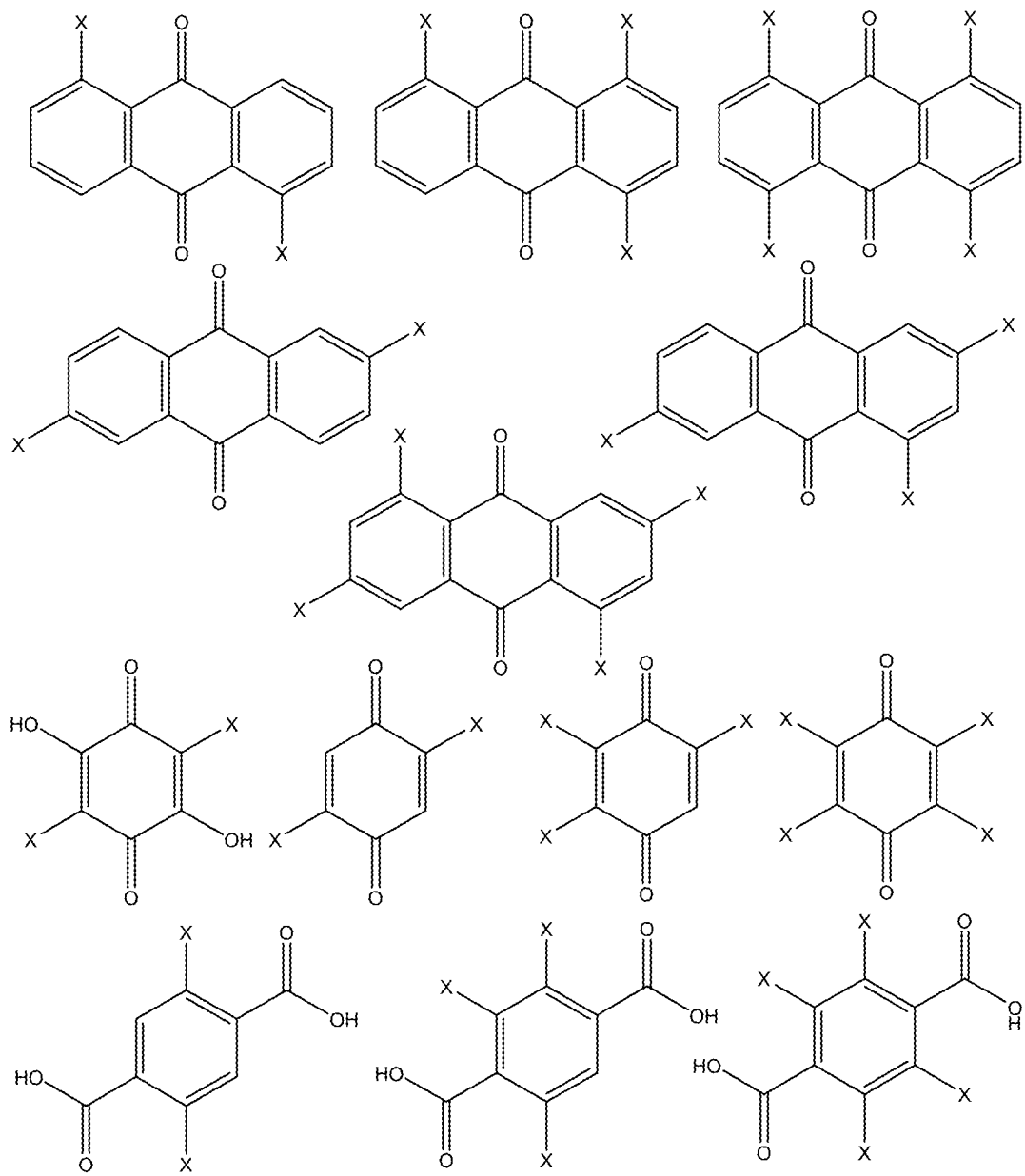
FIG. 5 shows exemplary redox active monomers for quinone, anthraquinone, terephthalic acid, monomeric moiety in which X can be a leaving group such as Cl, Br, or I.
Figure 6:
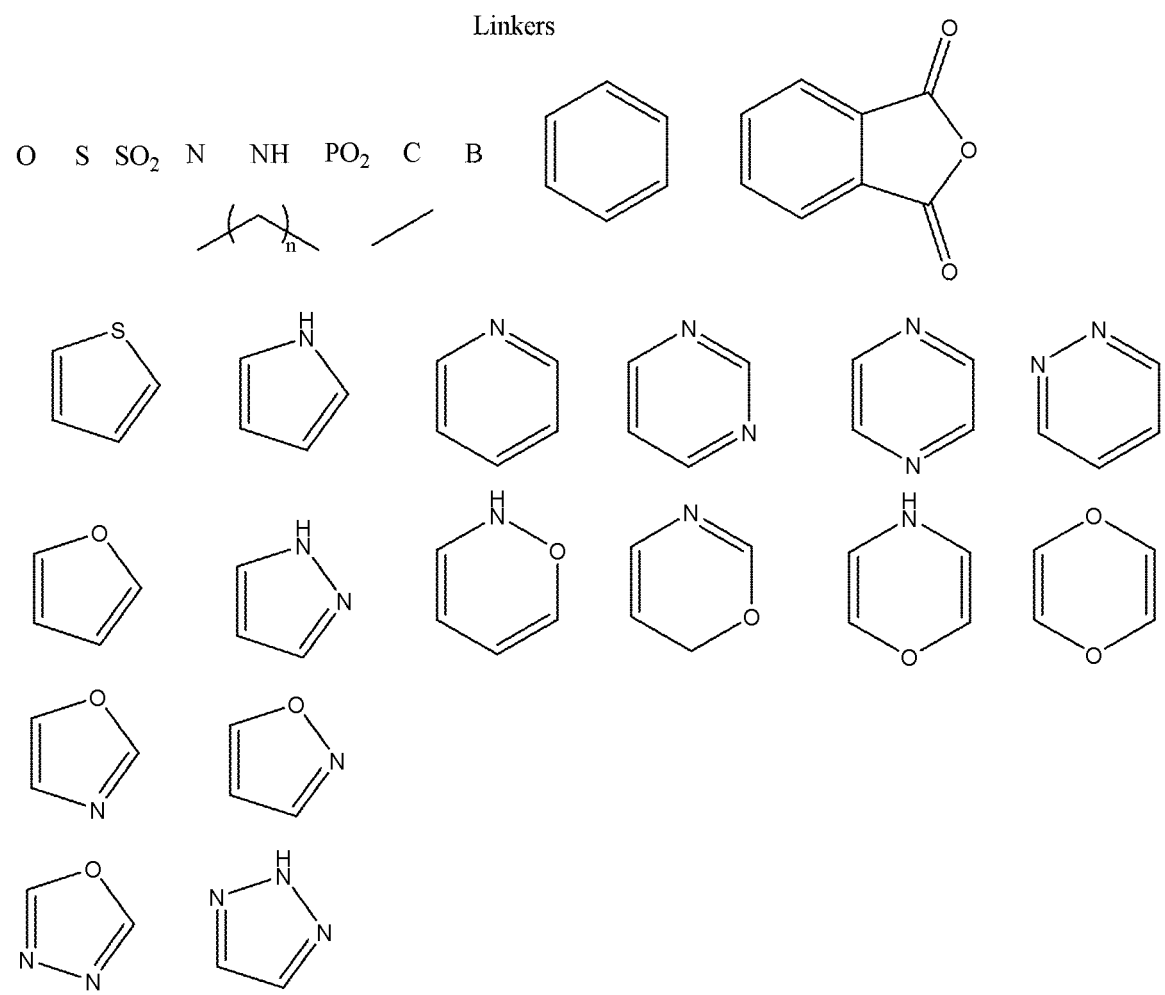
FIG. 6 shows exemplary linkers or comomomeric moieties of the present disclosure, in which each of the exemplary linkers or comomomeric moieties can connect to at least two redox active monomeric moieties.

Exemplary schematics of different network polymer architectures connected through different linkage hierarchies formed according to methods herein described, are given in FIG. 2, whereby a linear polymer configuration is highlighted, in contrast to a 4-connected network polymer and a 3-connected network polymer.

Figure 7:
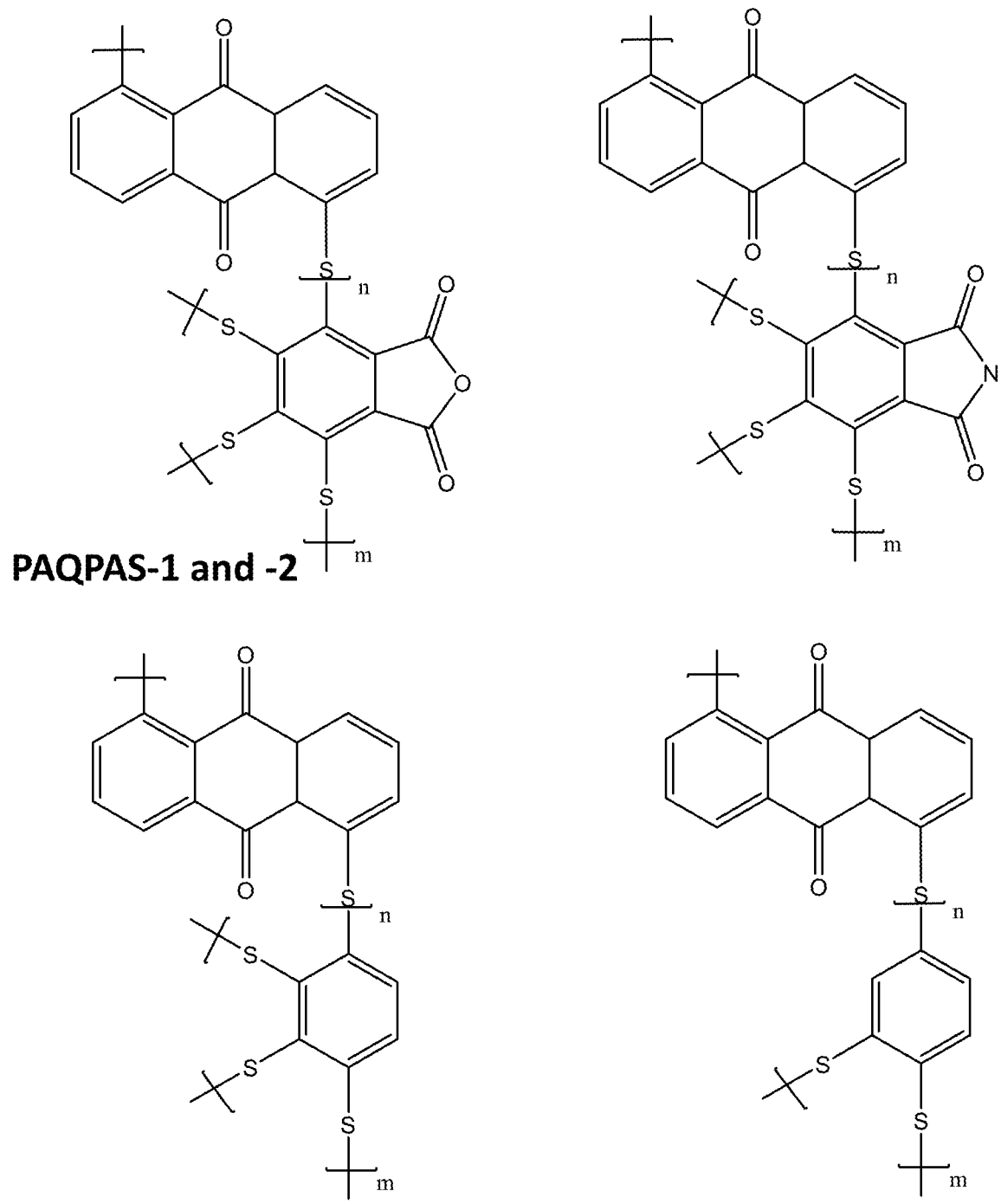
FIG. 7 shows embodiments of exemplary anthraquinone-comprising network polymers.
Figure 8:
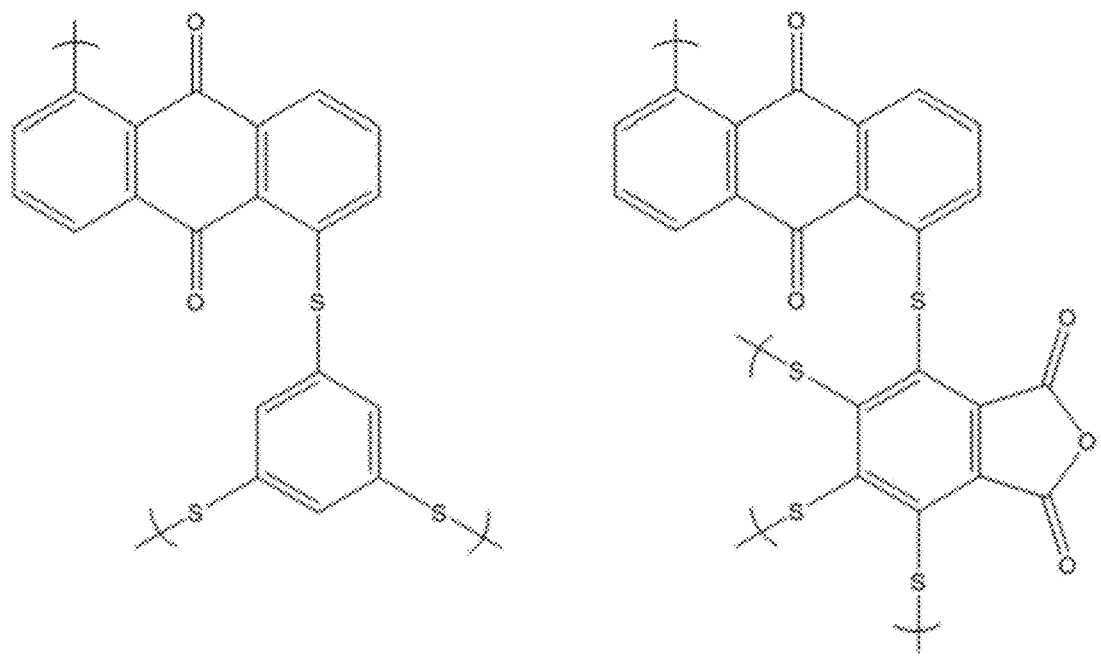
FIG. 8 shows additional embodiments of exemplary anthraquinone-comprising network polymers.
Figure 9:
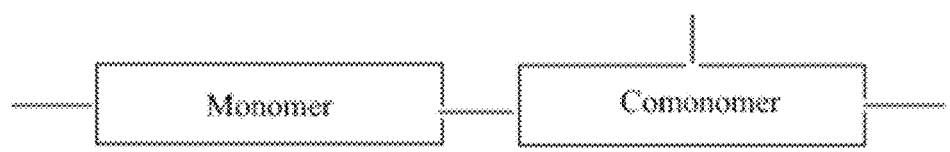
FIG. 9 shows a 3-connected network polymer (top panel) a 4-connected network polymer (bottom panel) in which the branching moiety or a node resides on the comonomeric moiety and the redox active monomeric moiety contains two chemical bonds to rest of the network polymer.
Figure 9:
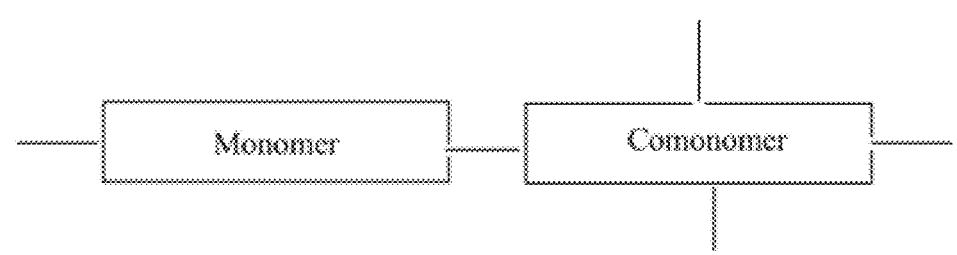
Figure 10:
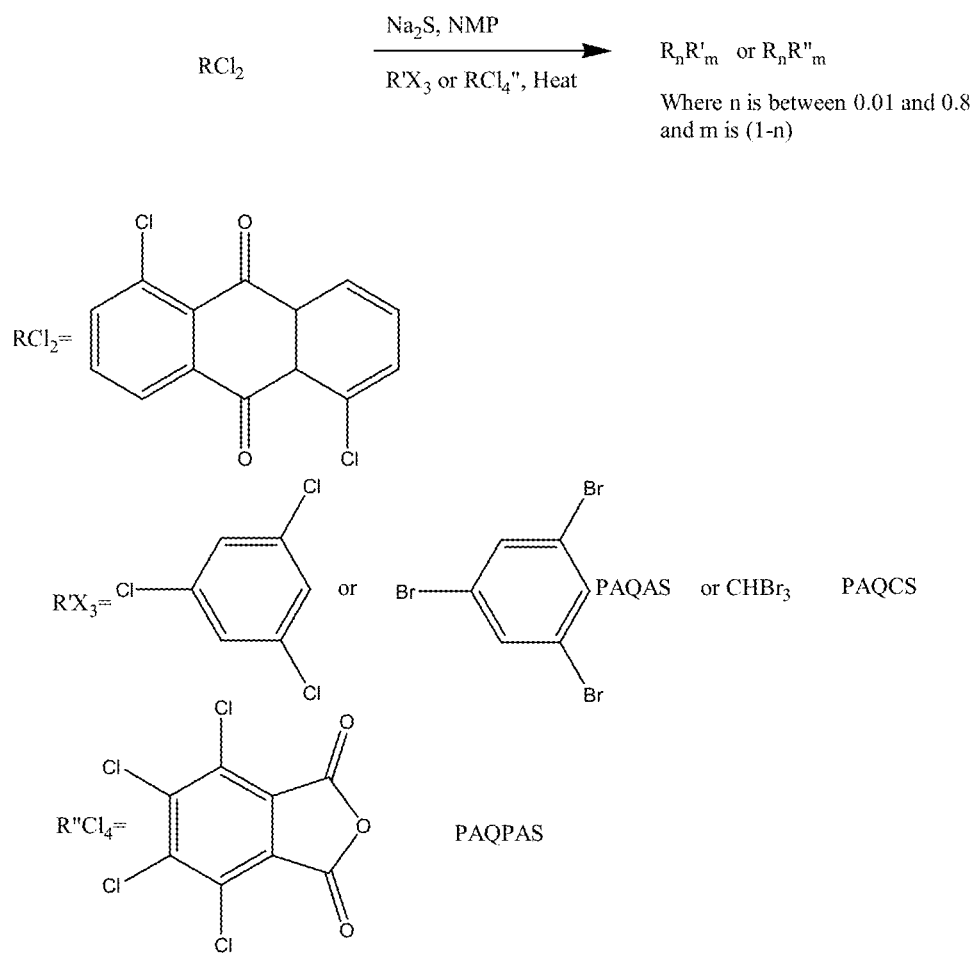
FIG. 10 shows a reaction scheme for making a redox active network polymer of the present disclosure in which redox active monomer 1,5-dichloroanthraquinone ($RCl_2$) is copolymerized with a tridentate (1,3,5-trichlorobenzene, 1,3,5-tribromobenzene or bromoform) to form a polymer PAQAS or PAQCS or tetradentate comonomer (tetrachlorophthalic anhydride) in the presence of sodium sulfide to synthesize redox active network polymer (PAQPAS). The weight percentage of the redox active monomer with respect to the total weight of redox active monomer and comonomer can range from 1 to 99%, preferably 10 to 99%, more preferably 20 to 99%.
Figure 11:
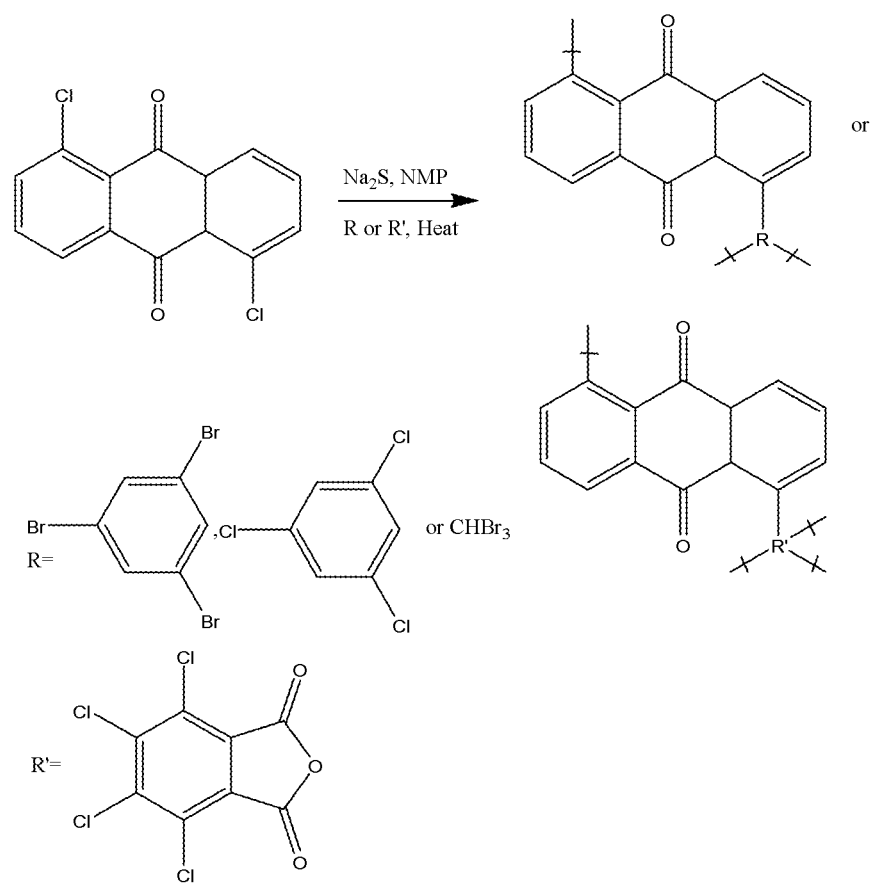
FIG. 11 illustrates exemplary structures of the active network polymer based on reactions shown in FIG. 10.
Figure 12:
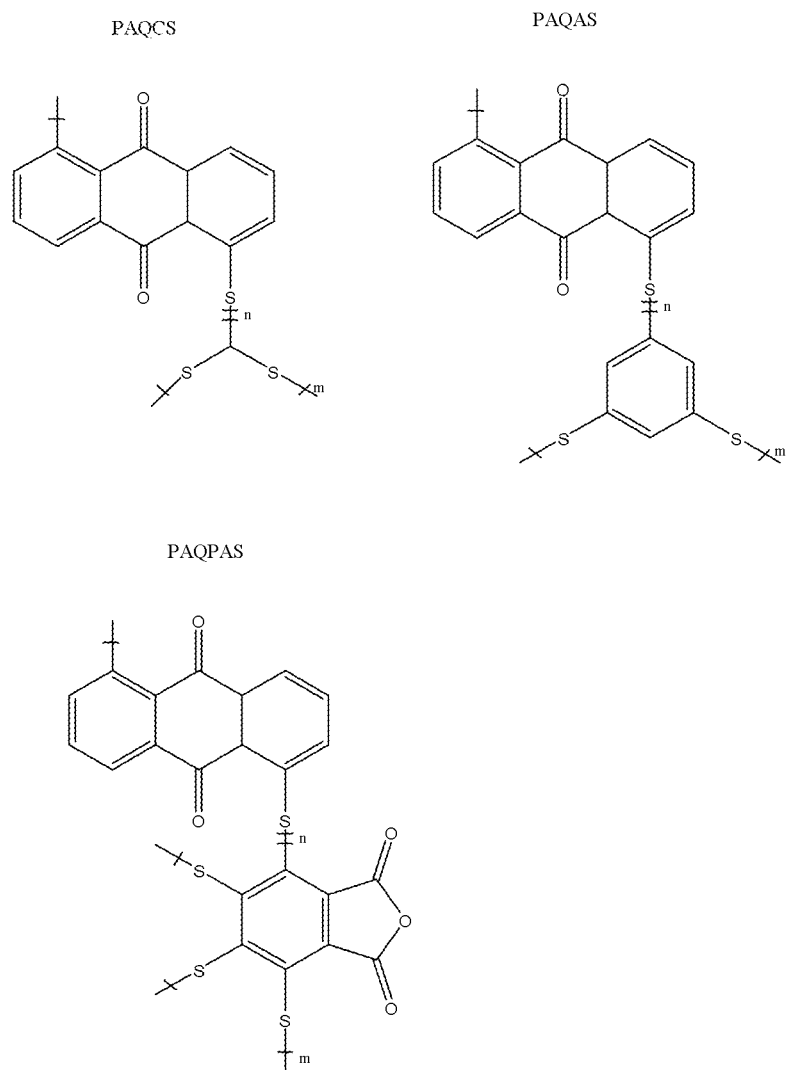
FIG. 12 shows illustrates additional exemplary structures of the active network polymer based on reactions shown in FIG. 10.

Examples of specific network polymer structures formed by reaction of two monomers with sulfide ions are given in FIG. 7.

In an alternative embodiment, the redox-active moiety is a pyrenetetraone in the place of a quinone as described above.

In another embodiment, the network polymer is generated with a contacting performed by linking monomer units with a tri-, tetra- or higher-valent connection between monomers. In some of these a single monomer comprising a redox-active group such as a quinone or pyrenetetraone is linked by a polyvalent connection such as a nitrogen atom (shown in FIG. 13 for a triarylamine-anthraquinone network polymer). Alternatively, multivalent linkage can connect monomers of different types, for example forming network polymers from two individual monomers A and B whereby A can be linked to either 2 additional A monomers, two B monomers and/or one A and one B monomer; similarly for B monomer. In some embodiments copolymers can be formed from 3 or more monomers. Suitable polyvalent linkages include nitrogen, boron, phosphorus, carbon or silicon atoms, or transition metals or lanthanide metals.

In yet another embodiment, a linear or branched polymer including an organic redox-active moiety such as a quinone or pyrenetetraone can be cross-linked into a network by a chemical reaction that occurs as an additional step after the formation of the linear polymer. In these embodiments, the method can comprise modifying the monomer unit to additionally feature cross-linking groups that are activated thermally or photochemically, or by addition of a cross-linker directly to the linear or branched polymer after initial polymerization. Examples of cross-linking include Diels-Alder crosslinking using furan/maleimide groups, radical crosslinking using peroxide initiators, nucleophilic cross-linking and photocrosslinking using species such as cinnamate esters or azides (FIGS. 14-18). Cross-linking may occur by treatment of a mixture of polymer as described earlier in this disclosure (including linear species) and cross-linker, or a single-component system featuring a polymer modified with a cross-linkable group, or a single-component system featuring an unmodified polymer. Such treatment includes heating the materials above 50° C., in particular above 300° C., and/or exposing the materials to energetic radiation such as ultraviolet or visible light, or beta- or gamma-radiation.

Preferred embodiment for thermal crosslinking for synthesis of the network polymer as described herein is a hold at a high temperature for 2 hours and then a subsequent hold at a lower temperature for 6 hours.

Dendritic network polymer in the sense of the disclosure can be provided by a method for making a dendritic network polymer comprising providing a core monomer having dendritic core D having a core multiplicity $N_D$, providing a redox active monomer comprising a redox active monomeric moiety L comprising a redox active monomeric moiety Q comprising a carbocyclic structure and at least one carbonyl group or a carboxyl group presented on the carbocyclic structure optionally substituted with three to five functional groups, the redox active monomeric moiety L having a redox potential of 0.5 V to 3.0 V with reference to Li/Li+ electrode potential under standard conditions or −2.54 V to −0.04 V with reference to SHE the redox active monomeric moiety L having a L-multiplicity $N_L$, providing a comonomer comprising a comonomeric organic moiety Y substituted with two to 6 functional groups, the comonomeric moiety Y having a Y-multiplicity $N_Y$, contacting the core monomer with the redox active monomer to form an intermediate $I_0$ of formula IIIa $$[D\text{-}L_{ND}^{ND-1}]_{G-1} \tag{IIIa}$$

contacting the intermediate $I_0$ of formula IIIa with the comonomer to form a dendritic polymer generation, repeating contacting the core monomer with the redox active monomer to form an intermediate $I_0$ and contacting the intermediate $I_0$ with the comonomer to form a dendritic polymer generation, to provide a dendritic polymer having a generation G of at least 3.

In summary, polymeric electrode materials including quinone or anthraquinone redox-active species in which the structure of the polymer is a non-linear network are described here, alongside functional electrodes incorporating such species and electrochemical cells and batteries including such electrodes. In certain embodiments, the electrode material described herein exhibits high mechanical strength and excellent processability into a functional electrode due to its polymeric network nature. Advantageously, in certain embodiments the electrode supports battery recharging for thousands of cycles without material loss, due to the insoluble nature of the polymer active material in the electrolyte used.

Further details concerning the network polymers, and related composition electrochemical cells, batteries methods and systems including generally manufacturing and packaging of the network polymers compositions, electrochemical cells and/or the batter, can be identified by the person skilled in the art upon reading of the present disclosure.

EXAMPLES

The network polymers, and related composition electrochemical cells, batteries methods and systems herein described are further illustrated in the following examples with respect to crosslinked network polymers comprising a polyanthraquinone sulfide redox active moiety in combination with exemplary comonomers and linker moiety having a different denticity and solubility, which are provided by way of illustration and are not intended to be limiting.

A skilled person will be able to identify additional cross-linked polymers and related composition electrochemical cells, batteries methods and systems in view of the content of the present disclosure.

The following materials and methods can be used for all compounds and their precursors exemplified herein.

X-ray powder diffraction: X-ray powder diffraction was performed on powder samples of material using a Rigaku Minflex(II) instrument at 298K with Cu Kα radiation, at 2 degrees 2θ per minute.

BET measurements: Brunauer Emmett Teller (BET) measurements was performed with a Tristar II Plus which measured the porosity and surface area of powder samples. Samples were left under vacuum for 16 hours before measurements were taken. Nitrogen was used as the adsorptive gas.

Density: Density measurements was conducted with an Accupyc II 1340 instrument which measured density of powder samples. Nitrogen was used as the analysis gas. Samples were purged 60 times before analyzed. The cell volume used was 11.74 cm$^3$. Samples were run 10 times and an average density was found.

All alkaline system electrochemical measurements were taken using a Neware tester except for PAQPAS-1 which was performed by an Arbin tester. PAQPAS and PAQS species were tested at a rate of 72 mA. Other polymers tested were done at 108 mA.

Electrochemical Cells: All lithium ion system electrochemical measurements were taken using a in house constructed CR 2016 coin cell. CR 2016 coin cells are lithium ion coin cells that have a diameter of 20 mm and a height of 1.6 mm. Coin cells were constructed in an argon atmosphere glove box. A polypropylene separator was used with a 1 M LiPF$_6$ in EC:DEC (50/50 v/v) electrolyte.

Polymers treatment: All polymers of the present disclosure were filtered and washed with deionized water and acetone until solvents passing through the filter were clear.

Example 1: Synthesis of Linear PAQS

Linear straight chain active material PolyAnthraQuinoneSulfide (PAQS) was prepared according to the following reaction scheme (1)

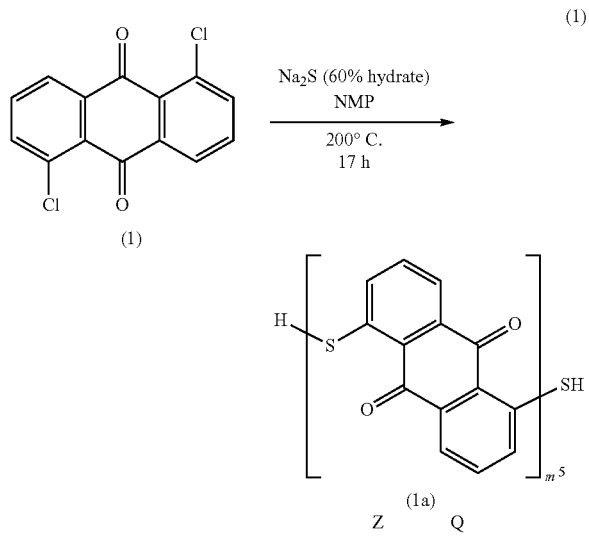

In particular, linear straight chain active material PAQS was prepared under ambient air. A solution of NMP (104.0 mL), 1,5-dichloroanthraquinone (10.318 g), and sodium sulfide 60% hydrate (4.841 g) was made and stirred at 200° C. overnight for 22 hours. The solution was filtered and washed with deionized water and acetone and the powder was collected and dried under vacuum at 120° C. overnight.

Alternatively, linear straight chain active material PAQS was prepared under ambient air. A solution of NMP (543.0 mL), 1,5-dichloroanthraquinone (60.00 g), and sodium sulfide 60% hydrate (28.16 g) was made and stirred at 200° C. overnight for 12 hours. The solution was filtered and washed with deionized water and acetone and the powder was collected and dried under vacuum at 120° C. overnight.

Example 2: Treatment of Linear PAQS at 350° C. in Presence of $O_2$

A linear chain active material PolyAnthraQuinoneSulfide (PAQS) prepared as described in Example 1 was heath treated to provide an exemplary crosslinked polymer in accordance with the present disclosure.

In particular, a sample of the in-house synthesized polyanthraquinone sulfide was placed into a crucible. The Sample was kept open to ambient air and heated to 350° C. over the course of one hour. Sample was then held at 350° C. for two hours. The furnace was then cooled over the course of one hour to 325° C. The sample was held at 325° C. for four hours and then allowed to reach room temperature.

Example 3: Treatment of Linear PAQS at 375° C. in Presence of $O_2$

A linear chain active material PolyAnthraQuinoneSulfide (PAQS) prepared as described in Example 1 was heath treated to provide an exemplary crosslinked polymer in accordance with the present disclosure.

In particular, the sample of the in-house synthesized polyanthraquinone sulfide was placed into a crucible. Sample was kept open to ambient air and heated to 375° C. over the course of one hour. Sample was then held at 375° C. for two hours. The furnace was then cooled over the course of one hour to 325° C. The sample was held at 325° C. for four hours and then allowed to reach room temperature.

Example 4: Treatment of Linear PAQS at 400° C. in Presence of $O_2$

A linear straight chain active material PolyAnthraQuinoneSulfide (PAQS) prepared as described in Example 1 was heath treated to provide an exemplary crosslinked polymer in accordance with the present disclosure.

In particular, the sample of the in-house synthesized polyanthraquinone sulfide was placed into a crucible. Sample was kept open to ambient air and heated to 400° C. over the course of one hour. Sample was then held at 400° C. for two hours. The furnace was then cooled over the course of one hour to 325° C. The sample was held at 325° C. for four hours and then allowed to reach room temperature.

Example 5: Comparative Discharge Profile of PAQS Heath Treated at 350° C., 375° C. and 400° C. with Linear PAQS The discharge profiles of crosslinked PAQS polymers obtained as described in Examples 2 to 4 and of a linear PAQS were detected in a pouch cell format with a nickel hydroxide counter electrode and an alkaline electrolyte.

The heath treated PAQS polymer were tested with a Neware tester with a current density of 8 mA/cm2 down to 70% of initial capacity with a 0.6 V discharge cutoff. The linear PAQS was tested with a Neware tester with a current density of 5.3 mA/cm2 down to 70% of initial capacity with a 0.6 V discharge cutoff In particular, PAQS polymers heath treated under an air atmosphere at 350° C., 375° C., and 400° C., and a linear PAQS were tested in a 3 cm×5 cm single layer pouch cell vehicle using an alkaline electrolyte with nickel hydroxide cathode and a separator. Electrodes were punched to 3 cm×4.5 cm dimensions. Linear PAQS was charged and discharged at a rate of 72 mA. Charge cycles went for 30 minutes or until a 1.5 V was reached. The heat treated PAQS polymers were charged and discharged at a rate of 108 mA. Charge cycles went for 20 minutes or until a 1.5 V was reached. All cells had a discharge cut off voltage of 0.6 V. Tests were ended when <70% capacity was obtained during the discharge cycle.

Figure 19:
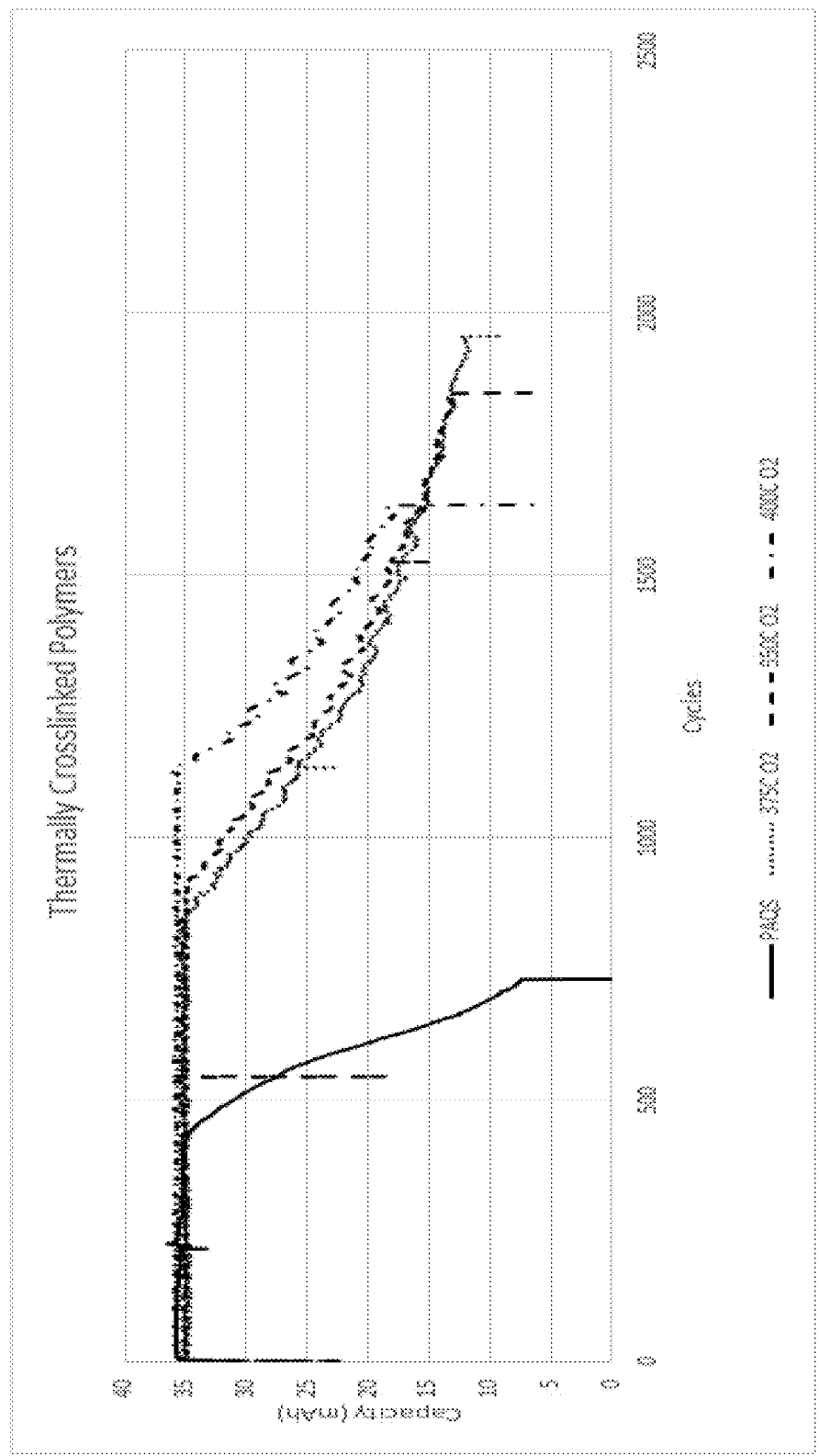
FIG. 19 shows a chart illustrating a comparative discharge profile between heat treated PolyAnthraQuinone Sulfide (PAQS) under different conditions compared to a linear PAQS structure. The y-axis shows the detected capacity (mAh) which is a measurement the current (mA) over time (h) until the cell reached a voltage of 0.6 V. The x-axis shows the number of cycles, which includes both the charge and discharge step.

The results illustrated in FIG. 19 show that the linear PAQS exhibited 532 cycles. Linear PAQS treated in ambient air at 350° C., 375° C., and 400° C. exhibited 1,219, 1,162, and 1,353 cycles, respectively. Linear PAQS treated under a nitrogen atmosphere at 400° C. exhibited 1,731 cycles.

These results illustrated in FIG. 19, support the conclusion that crosslinking of a linear polymer comprising a redox moiety and a comonomeric moiety herein described, performed with oxygen yields significantly better cycle life than a corresponding untreated linear polymer.

In particular, crosslinking so performed is expected to decrease solubility which accounts for the longer cycle life whiteout negatively impacting the redox activity of the redox moiety as shown by the coulombic efficiency and voltage curves of the crosslinked PAQS reported in Examples 6 and 7 below.

Example 6: Comparative Coulombic Efficiency of Crosslinked PAQS Heath Treated at 350° C., 375° C. and 400° C. with Linear PAQS The discharge profiles of crosslinked PAQS polymers obtained as described in Examples 2 to 4 and of a linear PAQS were detected in a pouch cell format with a nickel hydroxide counter electrode and an alkaline electrolyte.

The experimental setup was the same indicated in Example 5.

Figure 20:
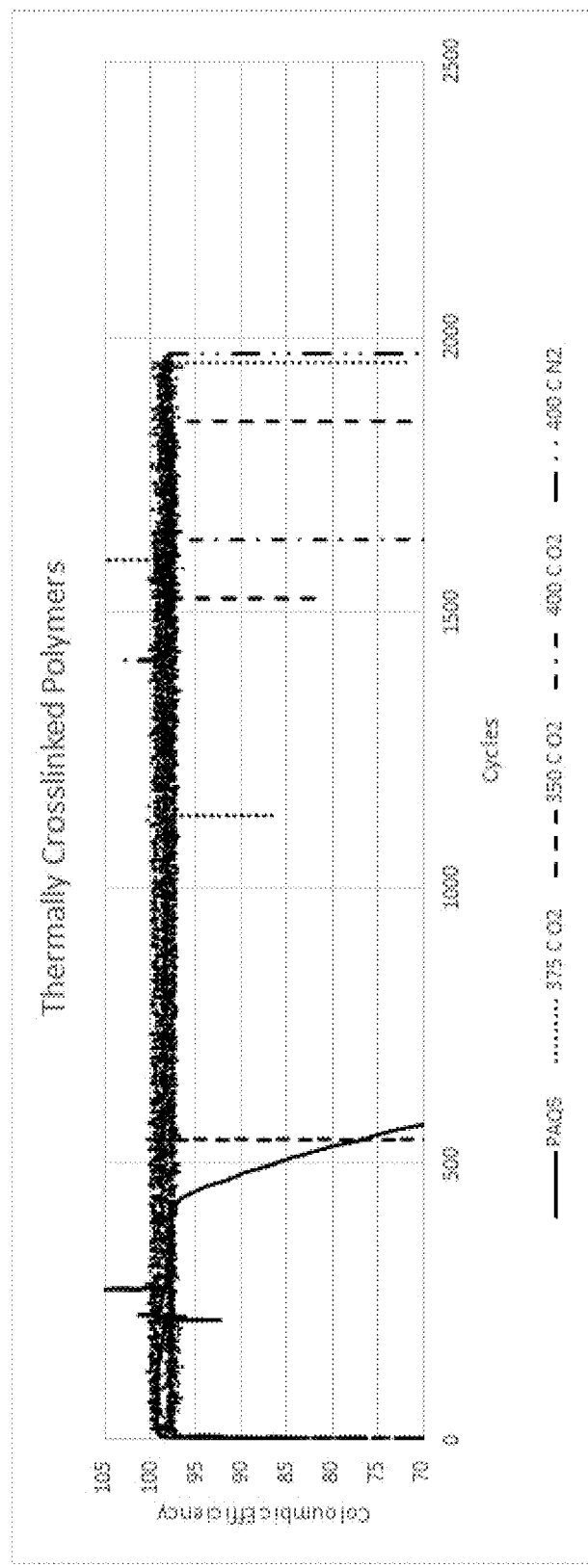
FIG. 20 shows a chart illustrating the coulombic efficiency of the thermally crosslinked materials of FIG. 19. Shown in the y-axis, is the coulombic efficiency of the thermally crosslinked materials obtained from the ratio of the capacity of the charge cycle to the capacity of the discharge cycle. The x-axis indicates the charge and discharge cycles (herein also indicated as cycles), where one cycle is equivalent to one charge and one discharge step.

The results reported in FIG. 20 show that linear PAQS treated at 350° C. under ambient air conditions exhibited efficiencies over 98%. All other species of PAQPAS, PAQCS, and PAQAS as described herein exhibited efficiencies over 99%.

The results reported in FIG. 20 therefore show that the efficiency in charging and discharging of an electrochemical cell comprising the crosslinked PAQS polymers obtained as described in Examples 2 to 4 is comparable with the one of an electrochemical cell comprising a linear PAQS.

Therefore the results reported in FIG. 20 show that crosslinking of linear polymers comprising a redox moiety and a comonomer according to the present disclosure has no detrimental effect on the efficiency in charging and discharging of a cell comprising a corresponding linear polymer as will be understood by a skilled person upon reading of the present disclosure.

Example 7: Voltage Curves of Cross Linked PAQS Heat Treated at 350° C., 375° C. and 400° C. with Linear PAQS The results reported in FIG. 21 therefore show that the charging and discharging voltages of an electrochemical cell comprising the crosslinked PAQS polymers obtained as described in Examples 2 to 4 is comparable with the one of an electrochemical cell comprising a linear PAQS.

The experimental setup was the same indicated in Example 5. Therefore the results reported in FIG. 21 show that crosslinking of linear polymers comprising a redox moiety and a comonomer according to the present disclosure has no detrimental effect on the voltage performance of a corresponding linear polymer as will be understood by a skilled person upon reading the present disclosure.

Figure 21:
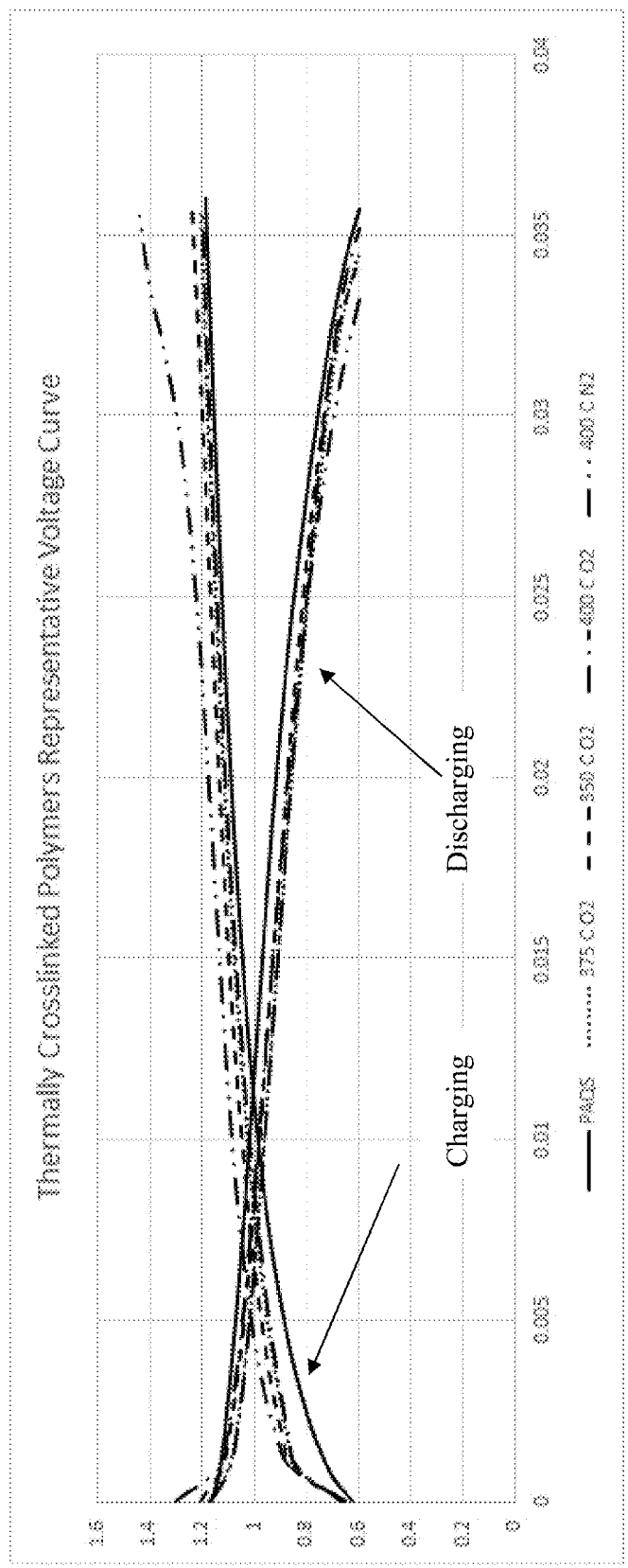
FIG. 21 shows a chart illustrating the voltage curves of an electrochemical cell with electrodes comprising the exemplary thermally crosslinked PolyAnthraQuinone Sulfide (PAQS) in FIG. 19 compared to the voltage of a cell with electrodes comprising linear PAQS. The y-axis indicates the voltage of the cell. The x-axis indicates the capacity (Ah) of the cell. The upper curves represent the charge step, while the lower curves that end at 0.6 V represent the discharge step of the cycle.

The results reported in FIG. 21 show that the exemplary crosslinked polymers PAQPAS, PAQAS, and PAQCS exhibit similar voltage profiles to linear PAQS.

The results reported in FIG. 21 therefore show that the charging and discharging voltages of an electrochemical cell comprising the crosslinked PAQS polymers obtained as described in Examples 2 to 4 is comparable with the one of an electrochemical cell comprising a linear PAQS.

Therefore, the results reported in FIG. 21 show that crosslinking of linear polymers comprising a redox moiety and a comonomer according to the present disclosure has no detrimental effect on the performance of a corresponding linear polymer as will be understood by a skilled person upon reading of the present disclosure.

Example 8: Synthesis of an Exemplary Branched PAQS Material (PAOPAS-1a)

Branched PAQS material was prepared according to the following reaction scheme (2) using a.

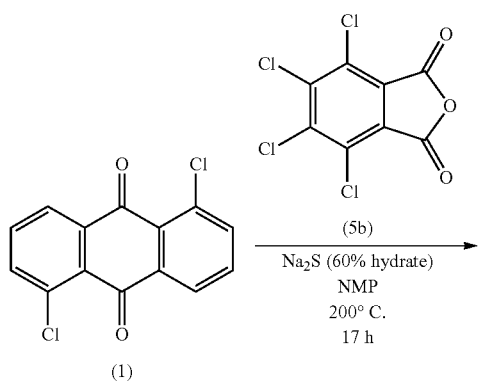

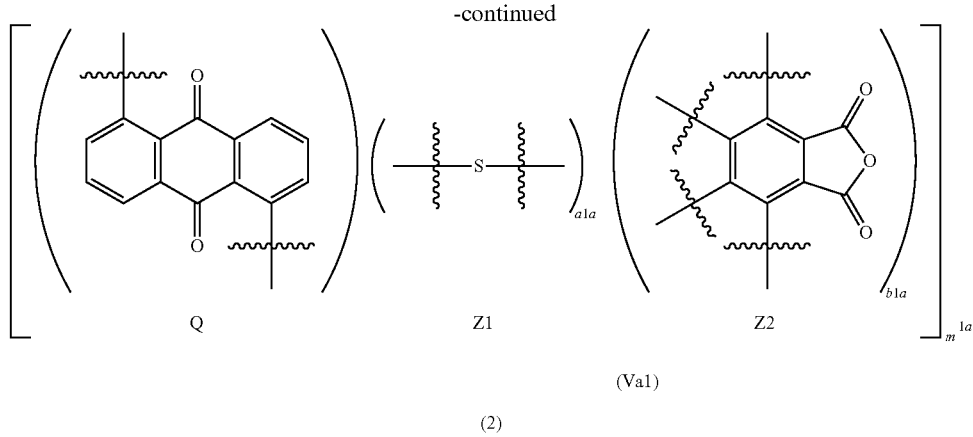

(Val)

(2)

in which a1a indicates the molar ratio of Z1:Q, b1a indicates the molar ratio Z2:Q, a1a+b1a ranges from 0.2 to 3 and $m^{1a}$ is at least 5

In particular, branched chain active material PAQPAS sample 1 (3aa) was prepared under ambient air. A solution of NMP (99.8 mL), 1,5-dichloroanthraquinone (9.540 g), tetrachlorophthalic anhydride (0.475 g) and sodium sulfide 60% hydrate (4.680 g) was made and stirred at 200° C. overnight for 17 hours. The solution was filtered and washed with deionized water and acetone and the powder was collected and dried under vacuum at 120° C. overnight. Elemental Analysis: C=67.05%, H=2.61%, S=17.25%.

The resulting polymer having the Va1 structure shown in scheme (2) above has a bidentate redox monomer Q formed by an anthraquinone, a first comonomers Z formed by a tetradentate phthalic anhydride moiety and a second comonomer Z formed by a sulfur moiety as will be understood by a skilled person upon reading of the present disclosure.

Example 9: Synthesis of an Exemplary Branched PAQS Material (PAOPAS-1b)

Branched PAQS material was prepared according to the following reaction scheme (3).

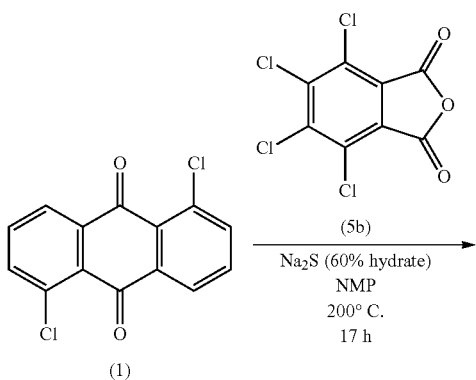

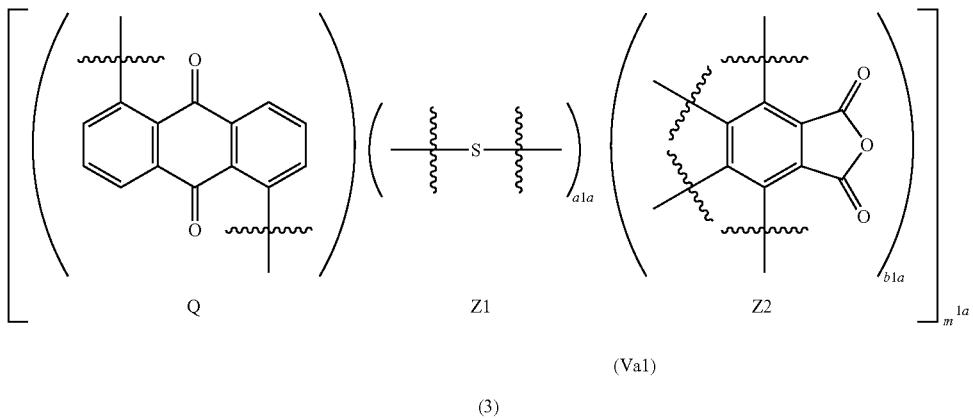

(Val)

(3)

in which a1a indicates the molar ratio of Z1:Q, b1a indicates the molar ratio Z2:Q, a1a+b1a ranges from 0.2 to 3, and $m^{1a}$ is at least 5, with a same procedure used in Example 8 with a different drying temperature as indicated below.

In particular a round bottom flask was charged, in ambient conditions, with 1,5-dichloroanthraquinone (9.65 g, 34.8 mmol), N-methyl-2-pyrollidone (100 mL), 60 wt % sodium sulfide hydrate (5.34 g, 41.1 mmol) and tetrachlorophthalic anhydride (0.482 g, 1.69 mmol). The mixture was stirred and heated to 200° C. for eighteen hours. The solution was allowed to cool and then filtered with acetone and water. The precipitate was dried at 100° C. under vacuum.

The resulting polymer having the Va1 structure shown in scheme (2) above has a bidentate redox monomer Q formed by an anthraquinone a first comonomers Z formed by a tetradentate phthalic anhydride moiety and a second comonomer Z formed by a sulfur moiety, as will be understood by a skilled person upon reading of the present disclosure.

Example 10: Synthesis of Branched PAQS Material (PAOPAS-2)-1.69 Mmol-120° C.

Branched PAQS material was prepared according to the following reaction scheme (4).

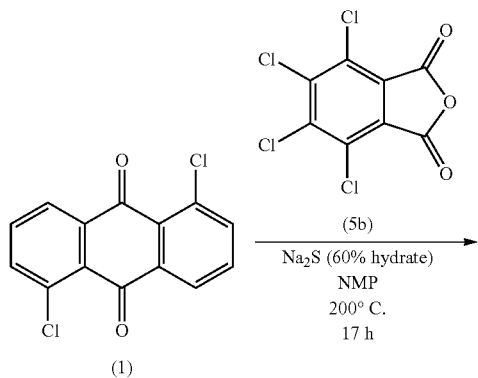

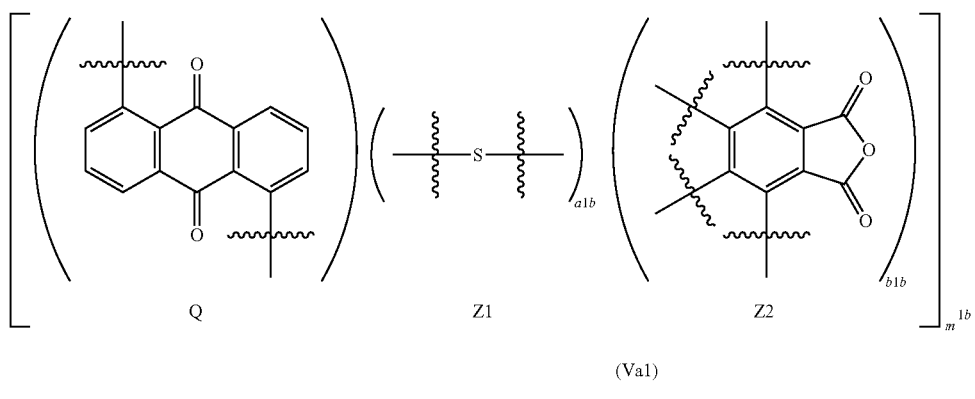

in which a1b indicates the molar ratio of Z1:Q, b1b indicates the molar ratio Z2:Q, a1b+b1b ranges from 0.2 to 3 and $m^{1b}$ is at least 5 with a same procedure used in Example 8 with a different drying temperature as indicated below.

In particular branched chain active material PAQPAS sample 2 (3ab) was prepared under ambient air. A solution of NMP (100.0 mL), 1,5-dichloroanthraquinone (9.650 g, 34.8 mmol), tetrachlorophthalic anhydride (0.482 g, 1.69 mmol), and sodium sulfide 60% hydrate (5.340 g, 41.1 mmol) was made and stirred at 200° C. overnight for 18 hours. The solution was filtered and washed with deionized water and acetone and the powder was collected and dried under vacuum at 120° C. overnight. Elemental Analysis: C=56.78%, H=2.36%, S=8.64%.

The resulting polymer having the Va1 structure shown in scheme (2) above has a bidentate redox monomer Q formed by an anthraquinone, a first comonomers Z formed by a tetradentate phthalic anhydride moiety and a second comonomer Z formed by a sulfur moiety as will be understood by a skilled person upon reading of the present disclosure.

Example 11: Synthesis of Branched PAQS Material (PAOPAS-2)—3.3 Mmol

Branched PAQS material was prepared according to the following reaction scheme (5).

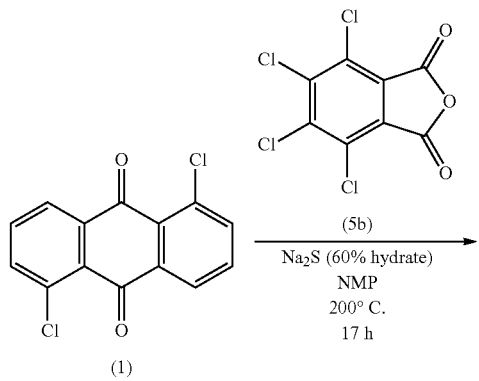

in which a1c indicates the molar ratio of Z1:Q, b1c indicates the molar ratio Z2:Q, a1c+b1c ranges from 0.2 to 3 and $m^{1c}$ is at least 5, with a same procedure used in Example 8 using different drying time and higher tetrachlorophthalic anhydride: 1,5-dichloroanthraquinone ratio.

In particular, a round bottom flask was charged, under argon, with 1,5-dichloroanthraquinone (9.556 g, 34.5 mmol), N-methyl-2-pyrollidone (100 mL), 60 wt % sodium sulfide hydrate (5.387 g, 41.4 mmol) and tetrachlorophthalic anhydride (0.9522 g, 3.3 mmol). The mixture was sparged with argon and heated to 200° C. for three hours. The solution was allowed to cool and then filtered with acetone and water. The precipitate was dried at 115° C. under vacuum.

The resulting polymer having the Va1 structure shown in scheme (2) above has a bidentate redox monomer Q formed by an anthraquinone a first comonomers Z formed by a tetradentate phthalic anhydride commoner and a second comonomer Z formed by a sulfur moiety as will be understood by a skilled person upon reading of the present disclosure.

Example 12: Synthesis of PAQCS-Bromoform 16 Mmol

Branched PAQCS material was prepared according to the following reaction scheme (6)

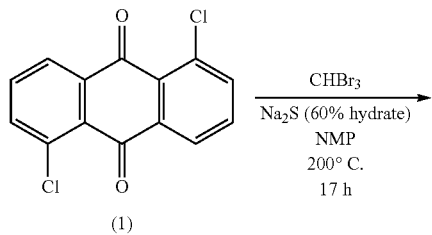

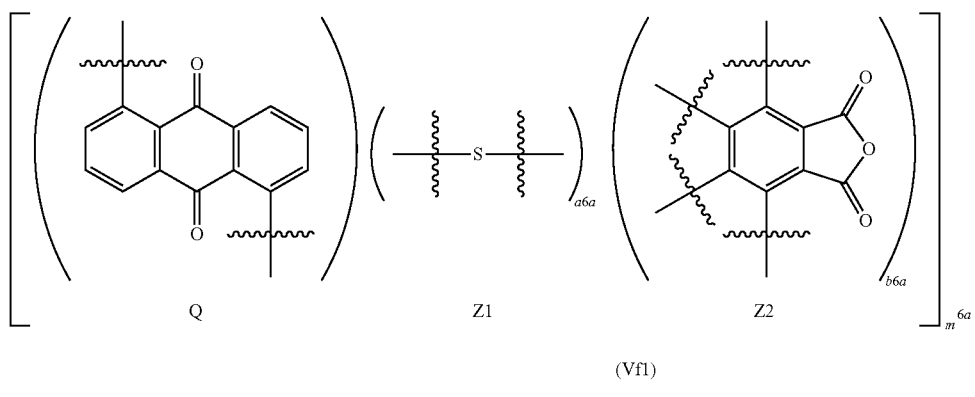

(Vf1)

(6)

in which a6a indicates the molar ratio of Z1:Q, b6a indicates the molar ratio Z2:Q, a6a+b6a ranges from 0.2 to 3 and $m^{6a}$ is at least 5.

In particular, a round bottom flask was charged, under argon, with 1,5-dichloroanthraquinone (15.0 g, 54 mmol), NMP (130 mL), and bromoform (1.4 mL, 16 mmol). After sparging with argon for 30 minutes, 60 wt % sodium sulfide hydrate (7.0 g, 54 mmol) was added. The mixture was stirred and heated to 185° C. for 3 hours. The solution was allowed to cool and then filtered three times with acetone and hot water. The precipitate was dried under vacuum at 120° C.

The resulting polymer having the Vf1 structure shown in scheme (6) above has a bidentate redox monomer Q formed by an anthraquinone a first comonomer Z formed by a tridentate carbon moiety, and a second comonomer Z formed by a sulfur moiety. as will be understood by a skilled person upon reading of the present disclosure.

Example 13: Synthesis of PAQCS-Bromoform 5 Mmol

Branched PAQCS material was prepared according to the following reaction scheme (7)

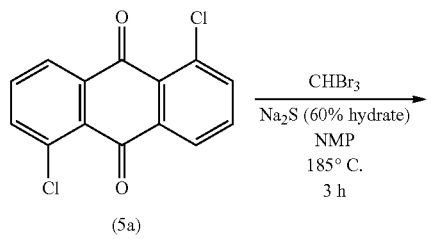

(5a)

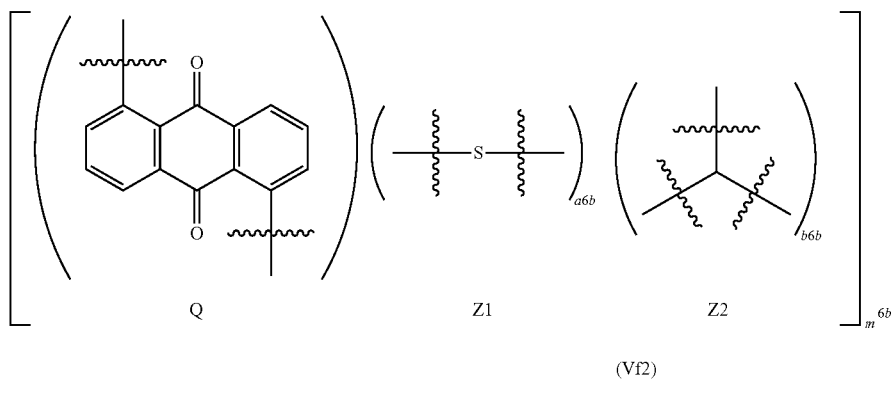

(Vf2)

(7)

in which a6b indicates the molar ratio of Z1:Q, b6b indicates the molar ratio Z2:Q, a6b+b6b ranges from 0.2 to 3 and $m^{6b}$ is at least 5 with the same procedure reported in Example 12 using a different amount of bromoform as indicated below.

In particular, a round bottom flask was charged, under argon, with 1,5-dichloroanthraquinone (15.0 g, 54 mmol), NMP (130 mL), and bromoform (0.5 mL, 5 mmol). After sparging with argon for 30 minutes, 60 wt % sodium sulfide hydrate (7.0 g, 54 mmol) was added. The mixture was stirred and heated to 185° C. for 3 hours. The solution was allowed to cool and then filtered three times with acetone and hot water. The precipitate was dried under vacuum at 120° C.

The resulting polymer having the Vf1 structure shown in scheme (3) above has a bidentate redox monomer Q formed by an anthraquinone a first comonomer Z formed by a tridentate carbon moiety, and a second comonomer Z formed by a sulfur moiety. as will be understood by a skilled person upon reading of the present disclosure.

The result of elemental analysis (Sample TU2018080) is shown in FIG. 44.

Example 14: Synthesis of PAQCS-Bromoform 49 Mmol

Branched PAQCS material was prepared according to the following reaction scheme (8)

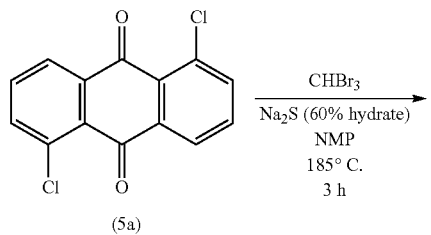

(5a)

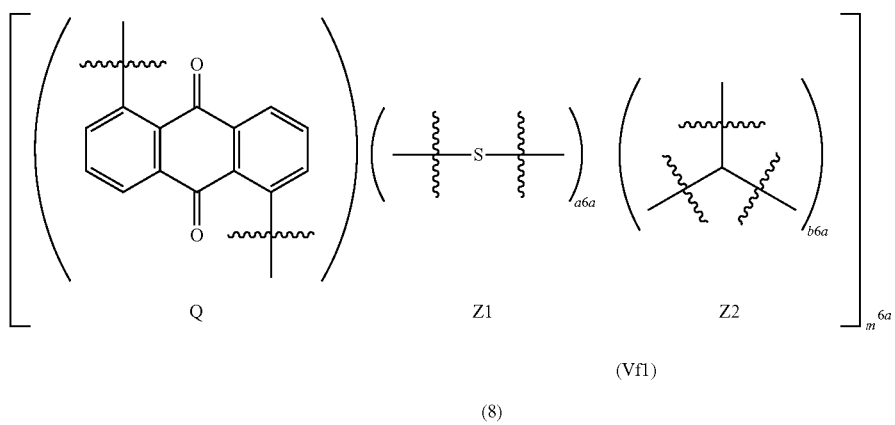

(Vf1)

(8)

in which a6a indicates the molar ratio of Z1:Q, b6a indicates the molar ratio Z2:Q, a6a+b6a ranges from 0.2 to 3 and $m^{6a}$ is at least 5 with the same procedure reported in Example 12 using a different amount of bromoform as indicated below.

In particular, a round bottom flask was charged, under argon, with 1,5-dichloroanthraquinone (45.0 g, 162 mmol), NMP (391 mL), and bromoform (4.3 mL, 49 mmol). After sparging with argon for 30 minutes and heating to 150° C., 60 wt % sodium sulfide hydrate (21.1 g, 162 mmol) was added. The mixture was heated to 180° C. and stirred for 16 hours. The solution was allowed to cool and then filtered three times with acetone and hot water. The precipitate was dried under vacuum at 120° C.

The resulting polymer having the Vf1 structure shown in scheme (3) above has a bidentate redox monomer Q formed by an anthraquinone a first comonomer Z formed by a tridentate carbon moiety, and a second comonomer Z formed by a sulfur moiety. as will be understood by a skilled person upon reading of the present disclosure.

Example 15: Synthesis of PAQAS-Trichlorobenzene

The following PAQAS trichlorobenze material

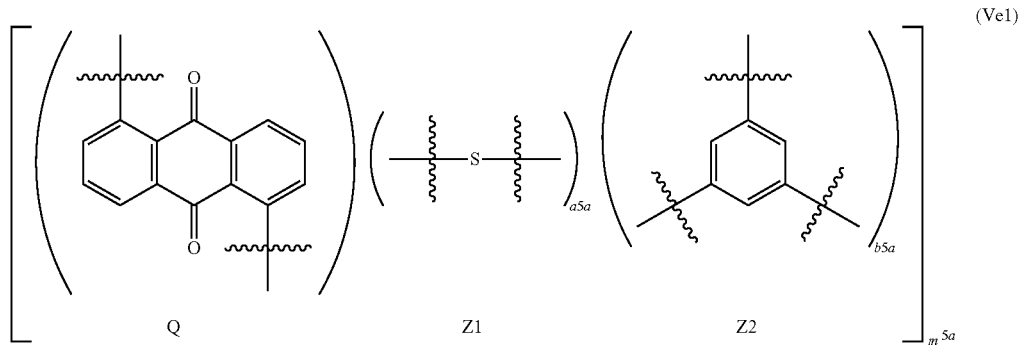

in which a5a indicates the molar ratio of Z1:Q, b5a indicates the molar ratio Z2:Q, a5a+b5a ranges from 0.2 to 3 and $m^{5a}$ is at least 5 was provided using the following process.

A round bottom flask was charged, under argon, with 1,5-dichloroanthraquinone (15.0 g, 54 mmol), NMP (130 mL), and 1,3,5-trichlorobenzene (2.9 g, 16 mmol). After 30 minutes of sparging with argon 60 wt % sodium sulfide hydrate (7.0 g, 54 mmol) was added. The mixture was stirred and heated to 170° C. for 3 hours. The solution was allowed to cool and then filtered three times with acetone and hot water. The precipitate was dried under vacuum at 120° C.

The resulting polymer has a bidentate redox monomeric moiety Q formed by an anthraquinone a first tridentate benzene commoner Z and a second comonomer Z formed by sulfur, as will be understood by a skilled person upon reading of the present disclosure.

The result of elemental analysis of Formula (Ve1) (Sample TU2018086) is shown in FIG. 45.

Example 16: Synthesis of PAQAS-Tribromobenzene

The following PAQAS material

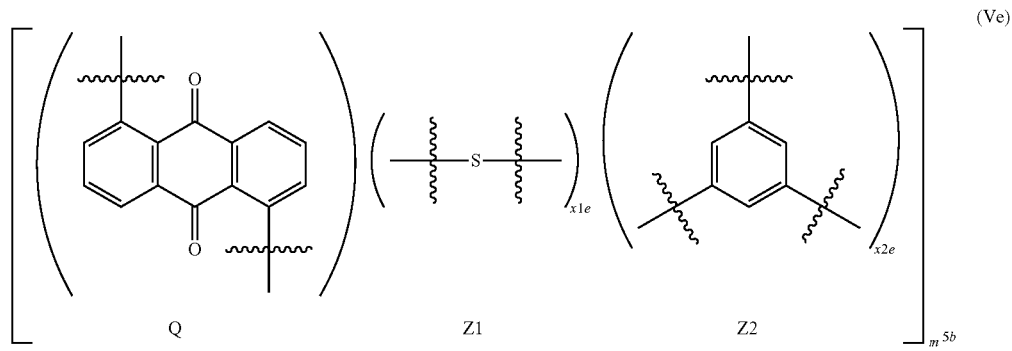

in which x1a indicates the molar ratio of Z1:Q, x2e indicates the molar ratio Z2:Q, x1e+x2e ranges from 0.2 to 3 and $m^{5b}$ is at least 5 was prepared according to the following process.

A round bottom flask was charged, under argon, with 1,5-dichloroanthraquinone (16.0 g, 58 mmol), NMP (130 mL), and 1,3,5-tribromobenzene (5.5 g, 17 mmol). The mixture was stirred and heated to 155° C. 60 wt % sodium sulfide hydrate (7.5 g, 58 mmol) was then added to the mixture. The reaction stirred for 16 hours at 155° C. The solution was allowed to cool and then filtered three times with acetone and hot water. The precipitate was dried under vacuum at 120° C.

The resulting polymer has a bidentate redox monomer Q formed by an anthraquinone, a first comonomer Z formed by the tridentate benzene moiety and a second Z comonomer formed by the heteroatom linker sulfur moiety, as will be understood by a skilled person upon reading of the present disclosure.

Example 17: Comparative XRD Patterns of PAQAS, PAQCS an PAOPAS

XRD diffraction patters have been obtained for linear PAQS and for exemplary crosslinked network polymers PAQAS prepared with a procedure exemplified in Examples 15, PAQCS prepared with a procedure exemplified in Example 13 and PAQPAS prepared with a procedure exemplified in Examples 9 and 10.

Figure 34:
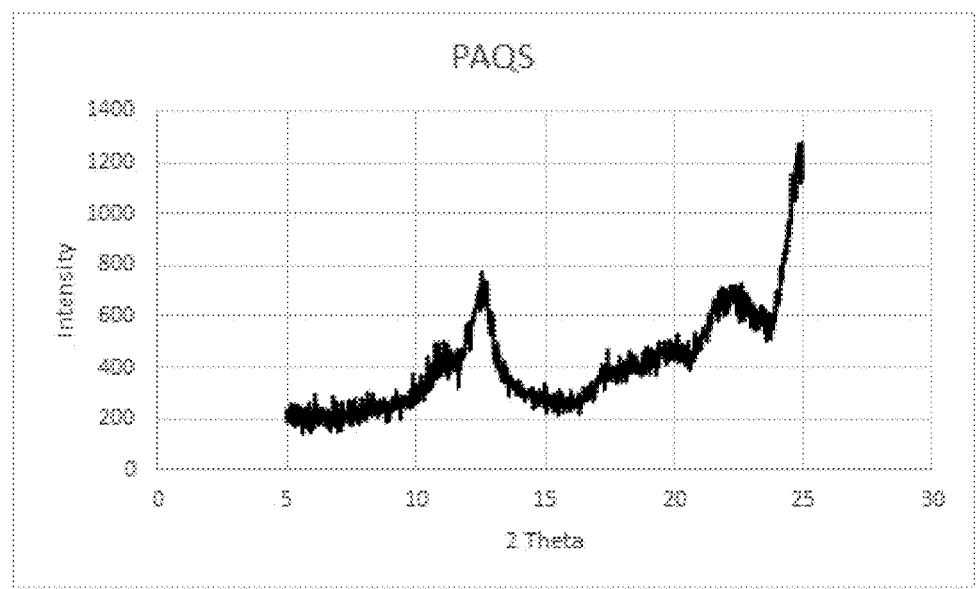
FIG. 34 shows a powder X-ray diffractogram of an exemplary network polymer PAQS.
Figure 35:
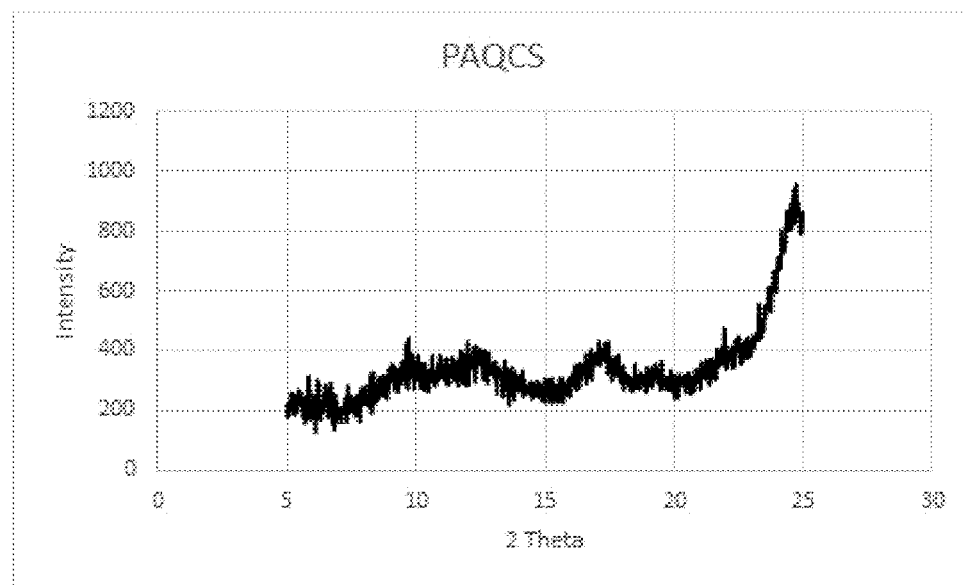
FIG. 35 shows a powder X-ray diffractogram of an exemplary network polymer PAQCS.
Figure 36:
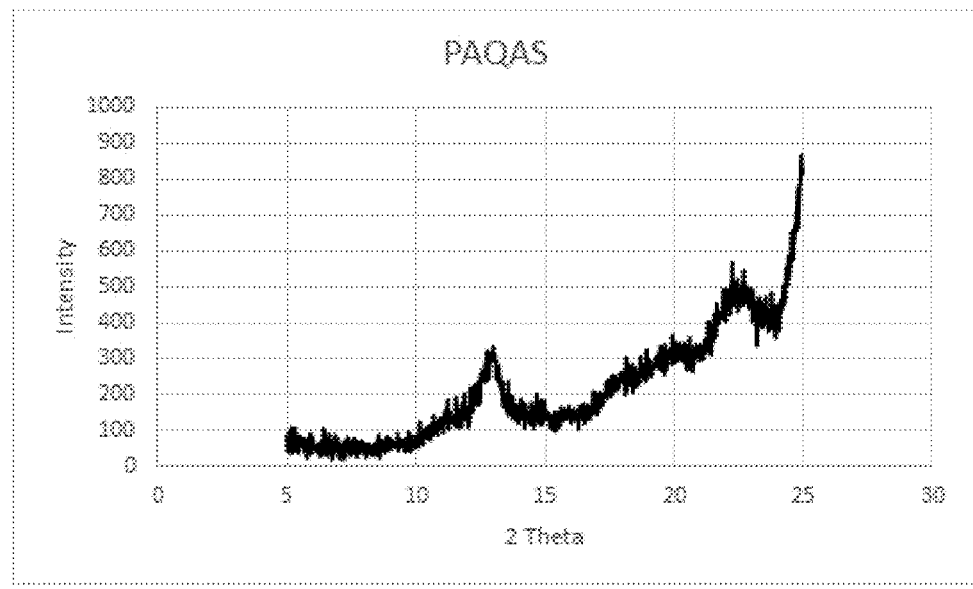
FIG. 36 shows a powder X-ray diffractogram of an exemplary network polymer PAQAS.
Figure 37:
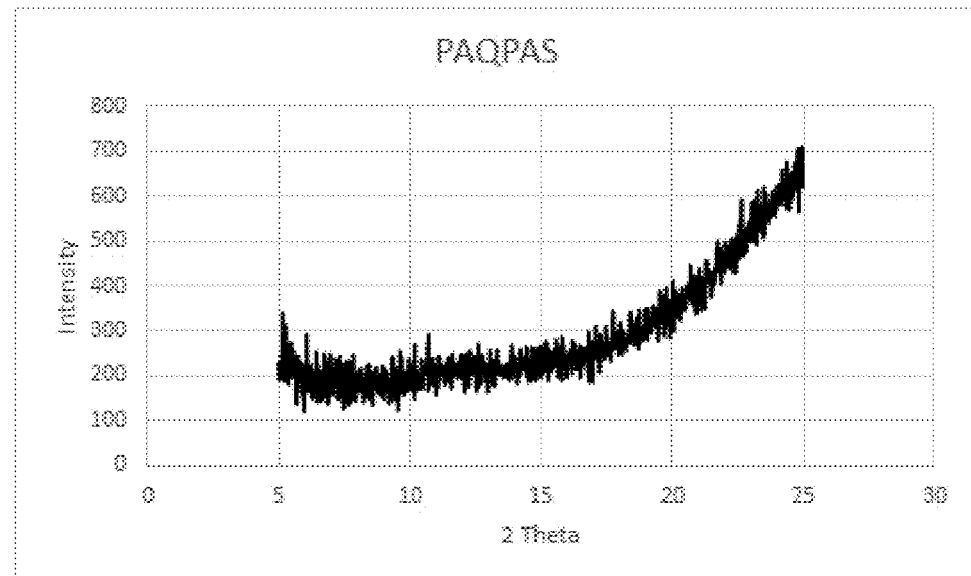
FIG. 37 shows a powder X-ray diffractogram of an exemplary network polymer PAQPAS.

In particular, the XRD diffractogram for PAQS linear polymer is shown in FIG. 34, the XRD diffractogram for exemplary crosslinked polymer PAQAS is shown in FIG. 35, the XRD diffractogram for exemplary crosslinked polymer PAQCS is shown in FIG. 36, and the XRD diffractogram for exemplary crosslinked polymer PAQPAS is shown in FIG. 37.

Figure 38:
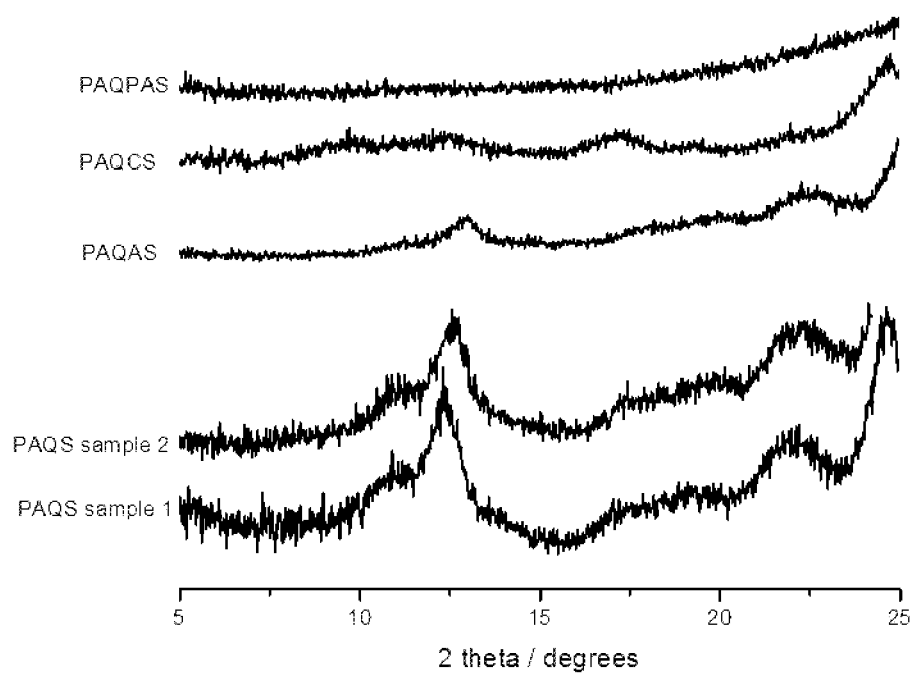
FIG. 38 shows overlaid powder X-ray diffractograms of network polymer PAQPAS, PAQCS, PAQAS and two PAQS samples.

A comparative XRD diffraction pattern reporting the diffractograms of FIGS. 34 to 37 is reported in FIG. 38.

In particular, the results reported in diffractograms of FIGS. 34 to 37 show clear differences between the tested polymers as illustrated in the comparative diffractogram of FIG. 38. is an overlay of this data on the same x-axis with the data vertically off-set between samples. Peaks at low angle 20 (<15 degrees) are consistent with a lattice superstructure with regular order and large (supramolecular) periodic distance i.e., an ordered superstructure for the linear polymer samples.

In particular lack of such a peak on the X-ray diffractograms for the measured materials built from similar units (i.e., linear PAQS vs PAQS cross-linked in various ways) shows that the cross-linked materials have a much more random, irregular superstructure consistent with a network cross-linked (irregular, non-linear) polymer.

Therefore, the diffractogram of FIG. 38 shows clear differences between the tested polymers that are evident between linear PAQS materials, which exhibit well-defined X-ray diffraction peaks at low angles indicative of an ordered superstructure, and cross-linked materials PAQAS, PAQCS and PAQPAS which exhibit weaker or no diffraction in that range characteristic of a disordered network superstructure with little-to-no long-range periodic order (random crosslinks).

The diffractograms reported herein also show that a cross-linked or network polymer as described in the present disclosure can be distinguished from a linear polymer of the same monomeric units by comparison of the respective XRD diffractograms.

Example 18: Comparative Discharge Profile of PAQAS, PAQCS an PAQPAS

Discharge profiles of exemplary crosslinked polymers PAQA, PAQCS and PAQPAS were tested in comparison with discharge profile of linear polymer PAQS.

Materials were tested in a pouch cell with a nickel hydroxide cathode in an alkaline electrolyte solution. PAQAS and PAQCS were tested with a Neware tester with a current density of 8 mA/cm² down to 70% of initial capacity with a 0.6 V discharge cutoff. Linear PAQS and PAQPAS was tested with a Neware tester with a current density of 5.3 mA/cm² down to 70% of initial capacity with a 0.6 V discharge cutoff. In particular, the polymers were tested in a 3 cm×5 cm single layer pouch cell vehicle using an alkaline electrolyte with nickel hydroxide cathode and a separator. Electrodes were punched to 3 cm×4.5 cm dimensions In particular, linear PAQS and PAQPAS were charged and discharged at a rate of 72 mA. Charge cycles went for 30 minutes or until a 1.5 V was reached. PAQAS and PAQCS were charged and discharged at a rate of 108 mA. Charge cycles went for 20 minutes or until a 1.5 V was reached. All cells had a discharge cut off voltage of 0.6 V. Tests were ended when <70% capacity was obtained during the discharge cycle.

Figure 22:
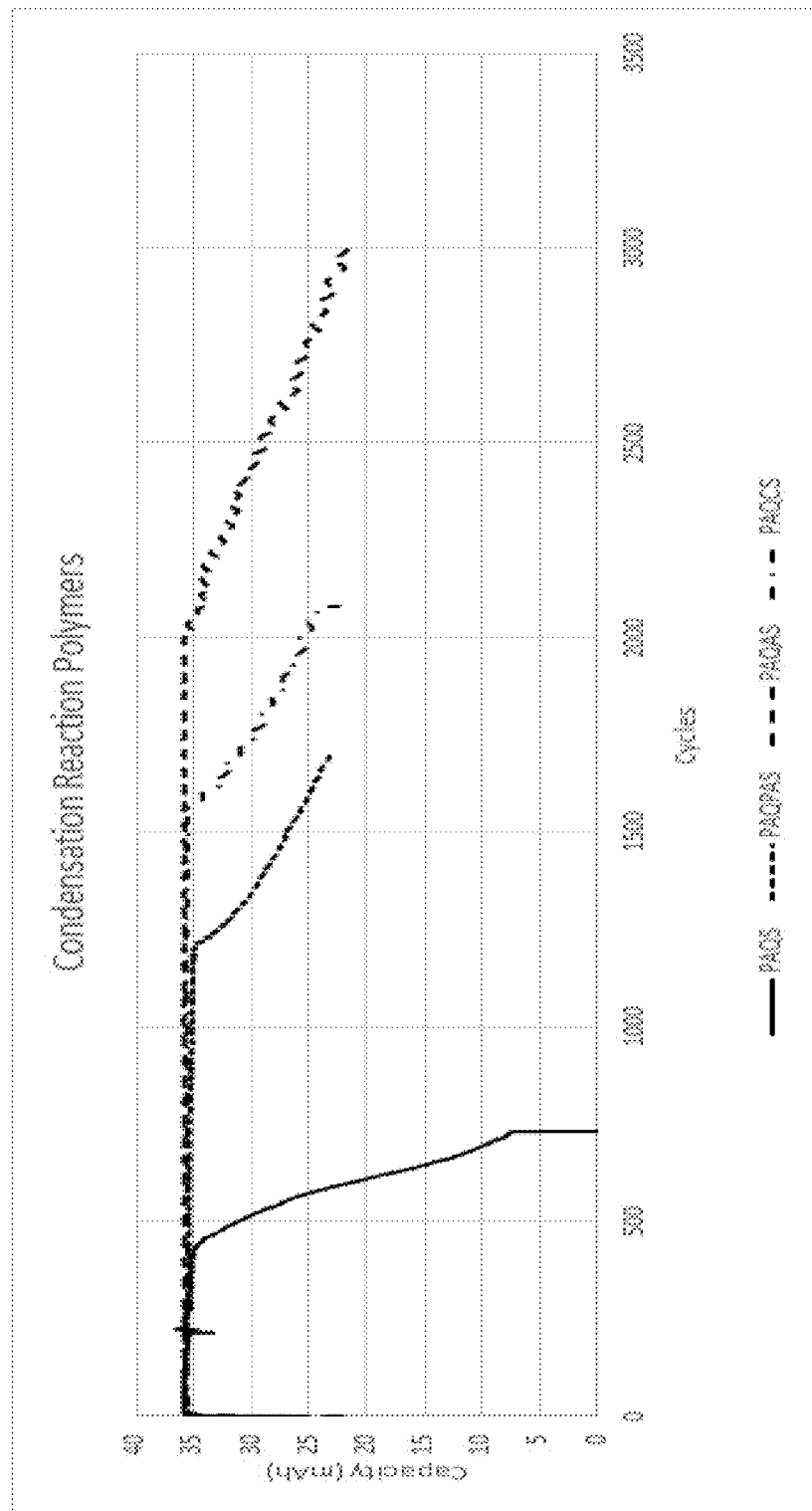
FIG. 22 shows a chart illustrating a comparative discharge profile between branched PolyAnthraQuinone Aryl Sulfide (PAQAS), PolyAnthraQuinone Carbon Sulfide (PAQCS), and PolyAnthraQuinone Phthalic Anhydride Sulfide (PAQPAS) polymers compared to the discharge profile a linear PAQS structure. The y-axis indicates capacity of the electrochemical cell (mAh) which is a measurement the current (mA) over time (h) until the cell reached a voltage of 0.6 V. The x-axis shows the number of charge and discharge cycles, which includes both the charge and discharge step.

The results reported in FIG. 22, show that PAQPAS, PAQCS, and PAQAS exhibited 1,611, 2,969 and 2,769 cycles, respectively. Linear PAQS exhibited 532 cycles.

These results support the conclusion that PAQPAS, while increasing the denticity of the polymer which helped in cycle life also has an anhydride moiety which in of an alkaline media, ring opens and forms two carboxylates, thus increasing solubility of the material. It is expected that the increasing solubility of the material results in a cycle life that falls short of the other two networked polymers.

In comparison, the increased bulk of the comonomer Z in PAQAS likely decreases solubility more than the similarly branched PAQCS, though it provides a lower theoretical capacity.

The above results provide guidance for selection of the denticity and chemical nature of the monomers of the crosslinked polymers herein described to obtain a desired performance in accordance with the present disclosure.

Example 19: Coulombic Efficiency of PAQAS, PAQCS an PAQPAS

Coulombic efficiency of exemplary crosslinked polymers PAQA, PAQCS and PAQPAS were tested in comparison with discharge profile of linear polymer PAQS.

The experimental setup was the same exemplified in Example 18.

Figure 23:
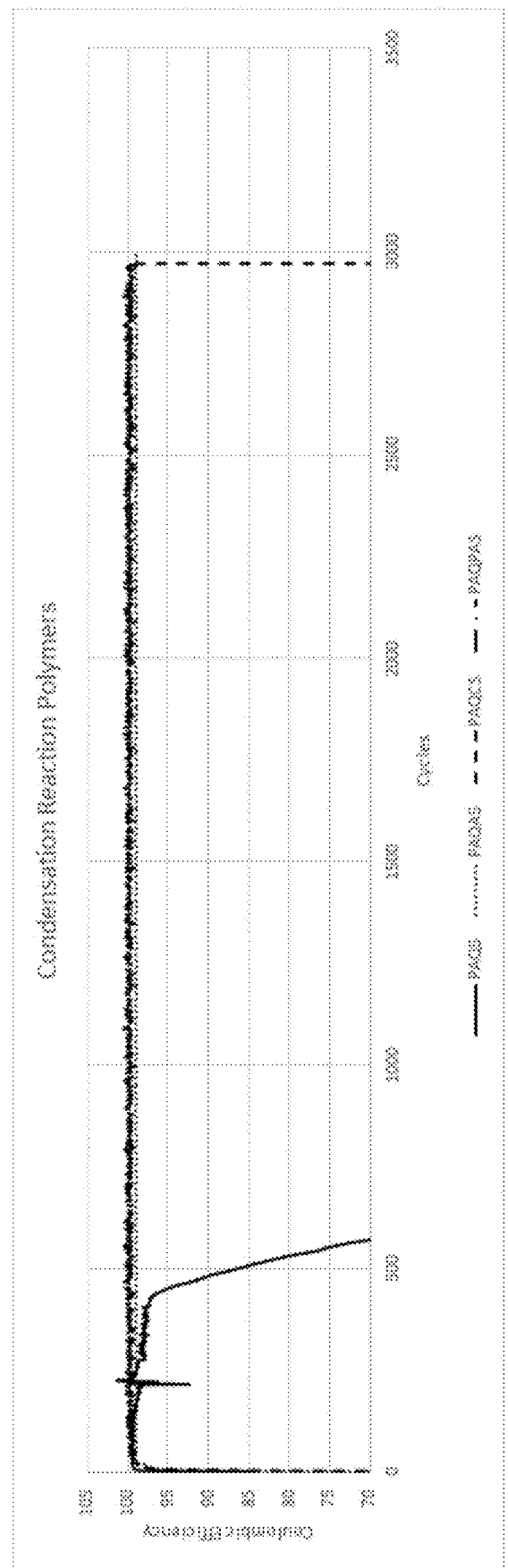
FIG. 23 shows a chart illustrating the coulombic efficiency of the thermally crosslinked materials shown in FIG. 22. The y-axis indicates the coulombic efficiency obtained from the ratio of the capacity of the charge cycle to the capacity of the discharge cycle detected in the cell having the electrodes comprising the thermally crosslinked material. The x-axis indicates the cycles, where one cycle is equivalent to one charge and one discharge step. Experimental setup was the same as in FIG. 22.
Figure 24:
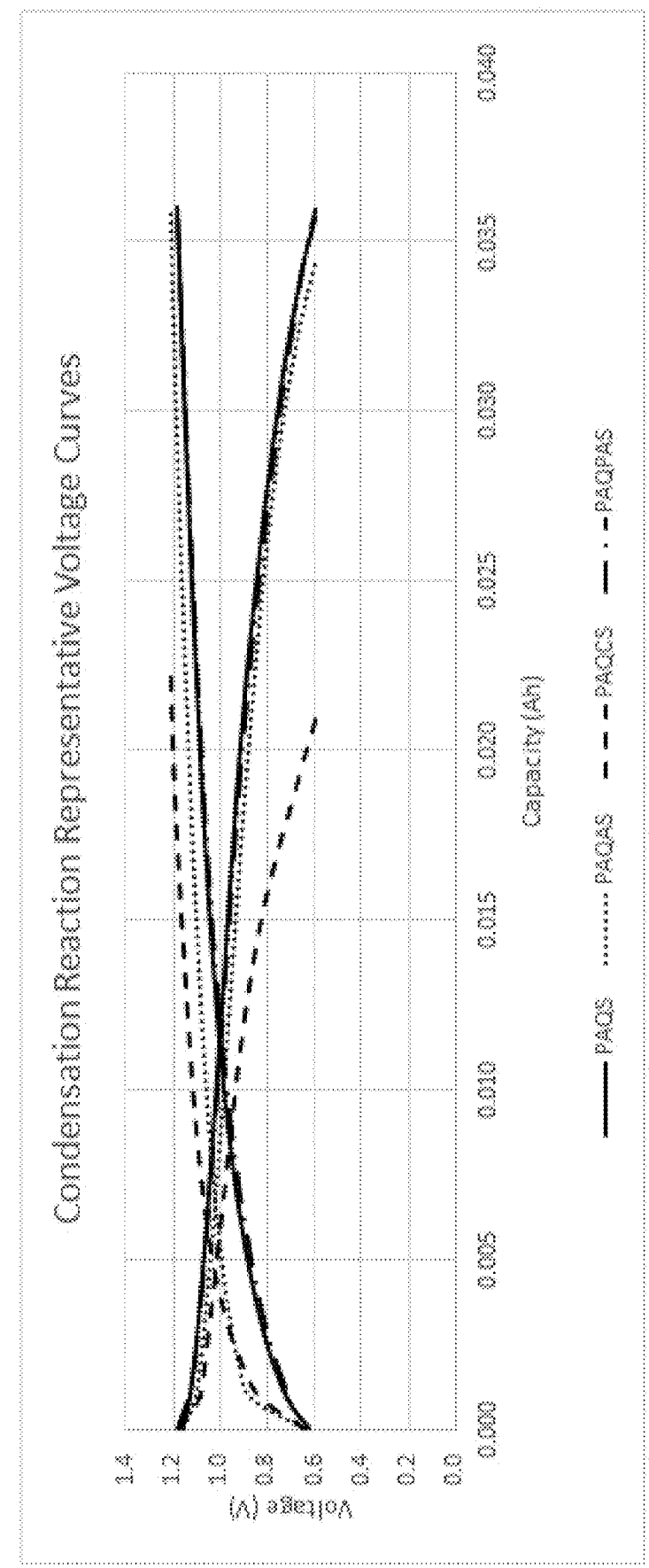
FIG. 24 shows a chart reporting the voltage curves of the crosslinked materials shown in FIG. 22 compared to the voltage curve of a linear PAQS. The y-axis indicates the voltage of the cell. The x-axis references the capacity (Ah) of the cell. The upper curves represent the charge step, while the lower curves that end at 0.6 V represent the discharge step of the cycle.

The results reported in FIG. 23 show that all species of PAQPAS, PAQCS, and PAQAS as described herein exhibited efficiencies over 99%, thus confirming that the cross-linking of linear polymers comprising a redox moiety and a comonomer according to the present disclosure has no detrimental effect on the voltage or efficiency of charging and discharging of a cell compared with a cell comprising a corresponding linear polymer as will be understood by a skilled person upon reading of the present disclosure Example 20: Voltage Curves of PAQAS, PAQCS and PAQPAS Voltage curves of exemplary crosslinked polymers PAQA, PAQCS and PAQPAS were tested in comparison with discharge profile of linear polymer PAQS.

The experimental setup was the same exemplified in Example 18.

The results reported in FIG. 23 show that all species of PAQPAS, PAQCS, and PAQAS as described herein show similar voltage profiles compared with linear PAQS thus confirming that the crosslinking of linear polymers comprising a redox moiety and a comonomer according to the present disclosure has no detrimental effect on the voltages of a corresponding linear polymer as will be understood by a skilled person upon reading of the present disclosure.

Example 21: Electrochemical Cycling of Exemplary PAQPAS Materials in Comparison with PAQS Materials Electrochemical cycling of electrode material comprising exemplary crosslinked polymers PAQPAS herein described, was tested in comparison with PAQS linear polymer.

In particular, the materials were tested in a pouch cell with a nickel hydroxide cathode in an alkaline electrolyte solution. PAQPAS-1 was tested with an Arbin tester with a current density of 5.3 mA/cm² down to 72% of initial capacity with a 0.6 V discharge cutoff. Linear PAQS and PAQPAS-2 was tested with a Neware tester with a current density of 5.3 mA/cm² down to 70% of initial capacity with a 0.6 V discharge cutoff.

Samples were mixed to comprise a ratio of 70% active material, 20% Super P Black, and 10% PTFE. As used herein an active material refers to a redox active polymer. Mixing was carried out in a 50:50 ratio of deionized water to ethanol for all samples.

All mixed samples were dried in an 80° C. oven overnight. Samples were then mixed with a 50:50 ratio of deionized water and ethanol and coated onto a stainless steel mesh substrate. Samples were calendared with cold rollers. Samples were then pressed with 70 C rollers.

3.5×5 cm pouch cells were prepared to test electrochemical performance. Sintered NiOOH cathodes were punched into 4.5×3 cm coupons. Anodes were punched to the same sized coupon. In the example, the PAQS anode weighed 0.8758 g, PAQPAS-1 weighed 0.8688 g, and PAQPAS-2 weighed 1.0328 g. Tabs with sealant were welded onto each electrode. A 11.0 um thick fiberglass separator from Neenah was punched into a 10.5×3.5 cm coupon. Electrodes and separator were stacked and placed into a polypropylene coated aluminum foil pouch. 1.2 g of 10 M KOH electrolyte was pipetted into the cell and put under vacuum. Cells then underwent a final vacuum seal over the side with the tabs.

Scheme 9 illustrates the electrochemical reactions for NiOOH cathode and an anode of exemplified redox active moiety containing a carbonyl group in a network polymer as described herein.

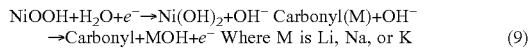

$NiOOH+H_2O+e^- \rightarrow Ni(OH)_2+OH^-$ Carbonyl(M)+OH⁻
→Carbonyl+MOH+e⁻ Where M is Li, Na, or K  (9)

Cells were charged and discharged at 72 mA rates using Neware testers. Cells were charged for 30 minutes or to 1.5 V—whichever condition was met first. Cells were discharged to 0.6 V. Cells had an (Open Circuit Voltage) OCV vs. lithium metal of between 2.8 and 3.1 V.

Figure 25:
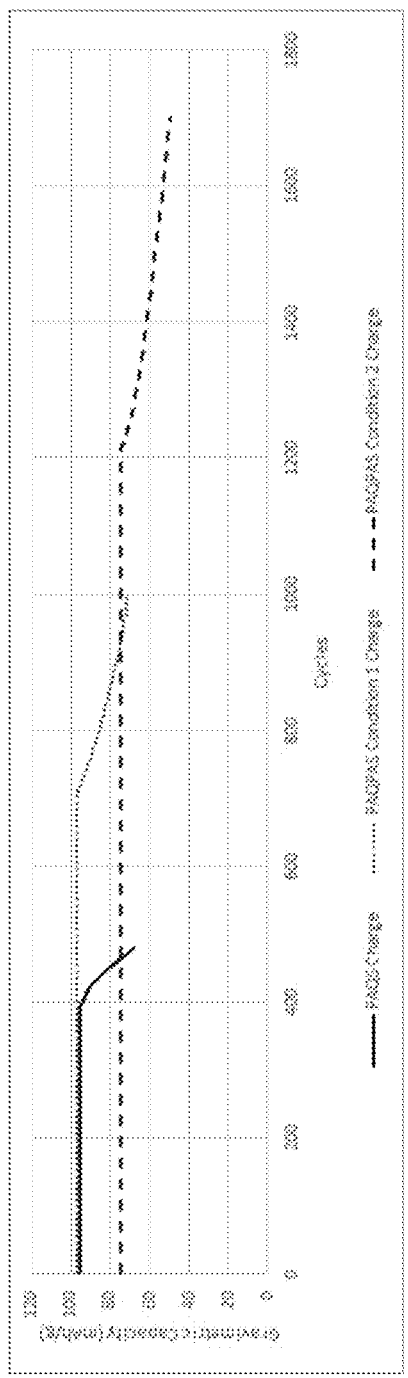
FIG. 25A shows a chart reporting comparative discharge profiles between PAQS, PAQPAS-1, and PAQPAS-2 crosslinked polymers herein described and linear polymer PAQS. The y-axis shows gravimetric capacity (mAh/g) which is a measurement the current (mA) over time (h) until the cell reached a voltage of 0.6 V over the total weight of redox active polymer in the cell. The x-axis shows the number of cycles, which includes both the charge and discharge step.
FIG. 25B shows a chart reporting a comparative gravitational capacity between PAQS, PAQPAS-1, and PAQPAS-2 crosslinked polymers and linear polymer PAQS tested in FIG. 25A. The y-axis shows coulombic efficiency of the material. The x-axis shows the number of cycles, which includes both the charge and discharge step.
Figure 25:
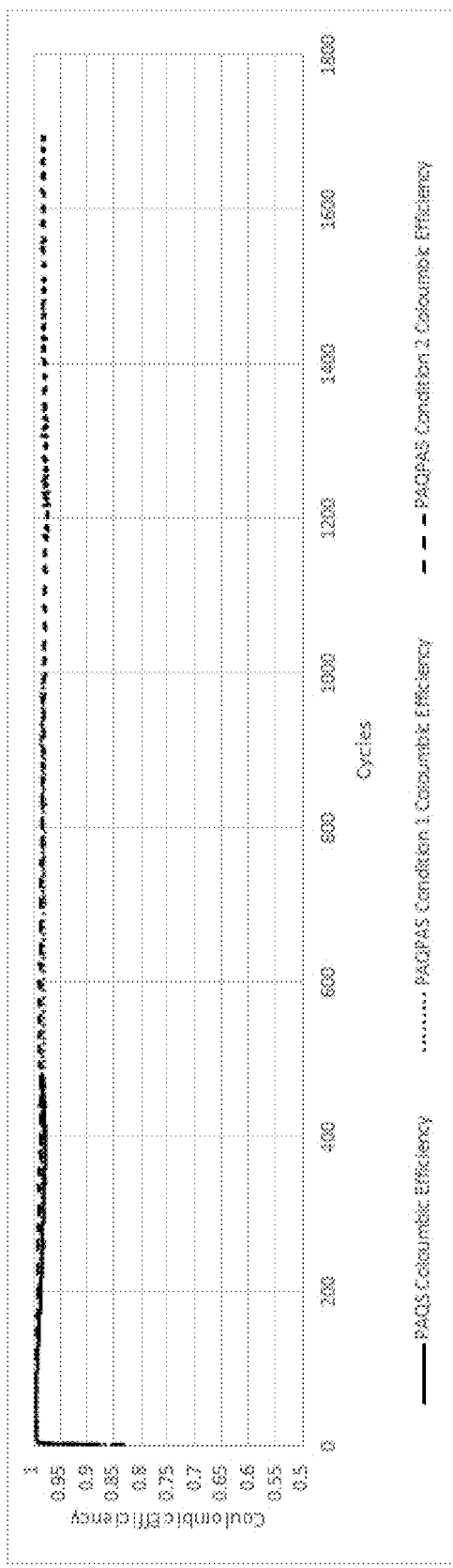

The coulombic efficiency and gravitational capacity of the crosslinked polymers and liner polymer PAQS were detected and are reported in FIG. 25A and FIG. 25B which shows the cycling advantages of PAQPAS network polymer materials compared to PAQS linear polymer. Coulombic efficiency of a battery as used herein is the ratio of discharge output to charge input which is the ratio of discharge capacity to charge capacity. The higher the efficiency, the less the loss of electrical energy to any processes other than battery charging and discharging.

In particular, the illustration of Figures FIGS. 25A and 25B show that PAQPAS which represents a polymer that has a tetradentate comonomer compared to the linear PAQS. PAQPAS-1 exhibited 97 mAh/g with coulombic efficiency over 99% for 1,000 cycles. Linear PAQS exhibited 96 mAh/g with coulombic efficiency over 99% for 538 cycles. PAQPAS-2 exhibited 75 mAh/g with a coulombic efficiency over 99% for 1,611 cycles. Thus the exemplified network polymer materials exhibited better cycle life compared to the linear counterpart. Though more sulfur was added for the synthesis of PAQPAS-2, less sulfur was observed in the elemental analysis of the material. The greater cycle life of PAQPAS-2 is attributed to lower utilization of the active material.

Accordingly the illustration of FIGS. 25A and 25B show that PAQPAS, while having the same degree of utilization, has hundreds of more cycles. With less utilization, PAQPAS cells are still cycling. All polymers exhibit a 99+% coulombic efficiency. Phthalic anhydride precursors also have the advantage of being 16 times cheaper than anthraquinone starting materials. Hence, the network polymers show improved cycling performance by over 250% and potentially decrease price by 90% compared to PAQS.

The illustration of FIGS. 25A and 25B also show that the amount of the material in the electrode has an effect, the performance as shown by the PAQPAS 2 better capacity with respect to PAQPAS and by the improved performance of the two PAQPAS with respect to PAQS.

Figure 26:
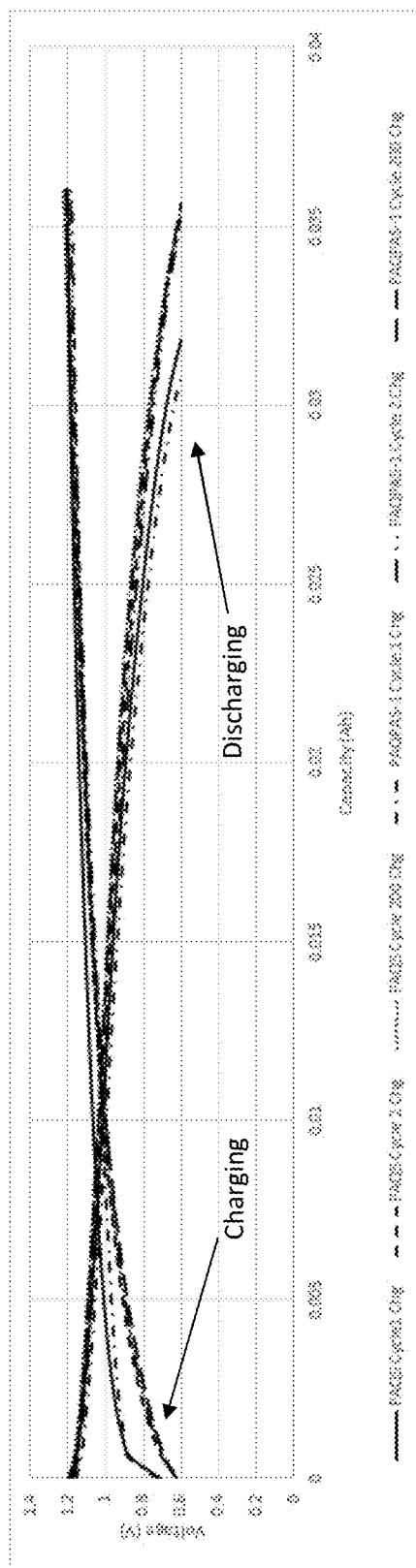
FIG. 26 shows a chart reporting the voltage profiles of exemplary crosslinked polymers PAQS, PAQPAS-1 and PAQPAS-2 herein described. The y-axis indicates the voltage of the cell. The x-axis reports the capacity (Ah) of the cell. The upper curves represent the charge step, while the lower curves that end at 0.6 V represent the discharge step of the cycle as indicated by arrows.

The voltage profile of the crosslinked polymers and liner polymer PAQS were detected and are reported in FIG. 26 which shows a comparison of PAQS and PAQPAS voltage profiles for the 1st, 2nd, and 200th cycles.

All voltage profiles in FIG. 26 show similar performance. In particular, the lower voltage during charging of the PAQPAS suggests a lower resistivity, which is likely due to wetting of the material by the electrolyte. Later cycles show comparable voltage profiles. This wetting advantage lends itself to greater rate capability as well as cycle life.

Example 21b: Electrochemical Cycling of Exemplary Thermally Treated PAQS Polymer Materials in Comparison with PAQS Materials Electrochemical cycling of electrode material comprising exemplary thermally treated polymers PAQS herein described, was tested in comparison with PAQS linear polymer.

The experimental setting is the same of Example 21.

In particular materials were treated at 350° C., 375° C., and 400° C. in the presence of oxygen with a procedure exemplified in Example 2 to 4. Another anode was prepared after heat treatment of PAQS at 400° C. under a nitrogen atmosphere. The anode treated at 400 C under nitrogen weighed 0.9807 g. Samples treated at 350° C., 375° C. and 400° C. in the presence of oxygen weighed 0.9822 g, 0.9713 g, and 1.0139 g, respectively.

Polymers were tested in a 3 cm×5 cm single layer pouch cell vehicle using an alkaline electrolyte with nickel hydroxide cathode and a separator. Electrodes were punched to 3 cm×4.5 cm dimensions. Linear PAQS and heat treated PAQS were charged and discharged at a rate of 108 mA. Charge cycles went for 20 minutes or until a 1.5 V was reached. All cells had a discharge cut off voltage of 0.6 V. Tests were ended when <70% capacity was obtained during the discharge cycle.

Linear PAQS was charged to 80 mAh/g and cycled 1049 times. Heat treated PAQS was charged to 81 mAh/g and cycled 1,421 times. Increasing denticity in this circumstance decreased solubility and increased overall cycle life.

Figure 27:
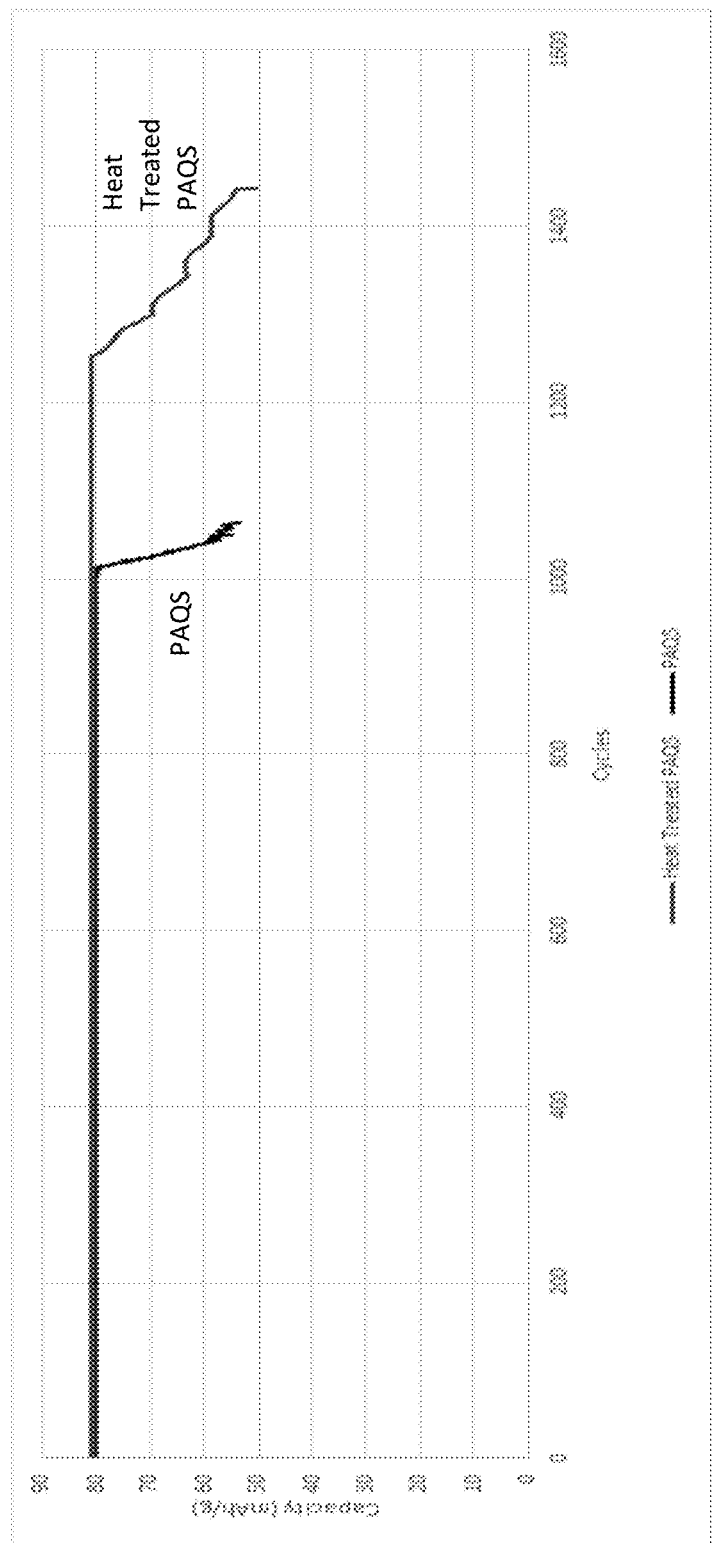
FIG. 27 shows a chart illustrating the electrochemical cycling performance of exemplary crosslinked polymers PAQS after thermally cross-linking at 350° C. under oxygen in comparison with linear PAQS. The y-axis indicates the gravimetric capacity (mAh/g) which is a measurement the current (mA) of the cell over time (h) until the cell reached a voltage of 0.6 V over the total weight of redox active polymer in the cell until the cell reached a voltage of 0.6 V. The x-axis shows the number of cycles, which includes both the charge and discharge step.

The results reported in FIG. 27 show a comparison of cycling performance of PAQS and PAQS materials after heat treatment showing the greater cycle life exhibited by the heat-treated, thermally cross-linked material.

Example 22: Synthesis and Electrochemical Cycling of Triarylamine-Quinone Network Polymer, PAQN A triarylamine-quinone network PAQN material was synthesized according to the following reaction scheme (10)

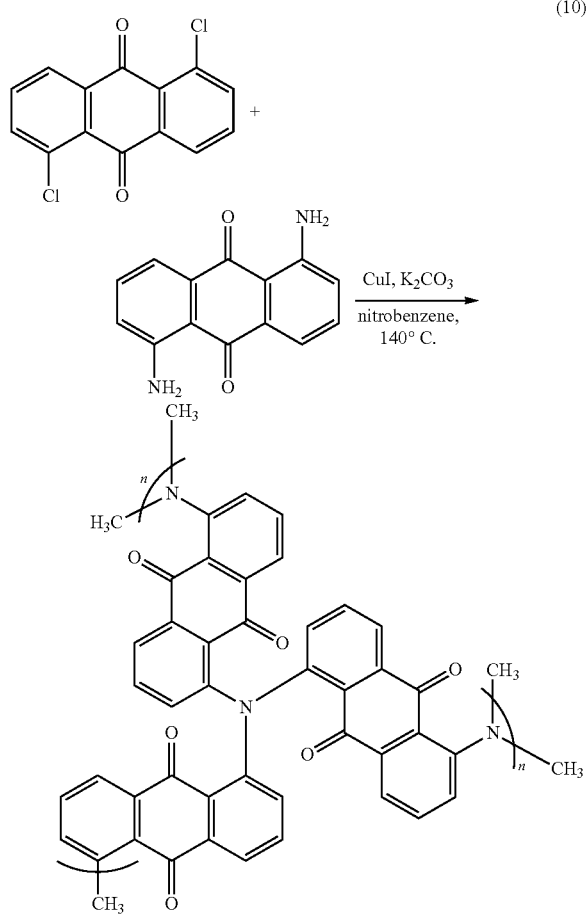

In particular, inside the glovebox, an oven dried 250 mL round bottom flask equipped with septa and a stir bar was added 1,5-dichloroanthraquinone (3.00 g, 10.8 mmol), 1,5-diaminoanthraquinone (2.71 g, 11.4 mmol), CuI (2.06 g, 10.8 mmol), potassium carbonate (1.50 g, 10.8 mmol) and nitrobenzene (29 mL). The reaction vial was sealed and removed from the glovebox. The reaction was stirred at 200° C. for 24 hours. The reaction mixture was cooled to room temperature and added to methanol. The PAQN precipitate was filtered, washed with water, methanol, and then dried under high vacuum at 120° C.

An electrode was made from a 7:2:1 ratio of PAQN:Super P-carbon:poly(tetrafluoroethylene) using 1:1 ratio of ethanol/water and mixed in a planetary mixer. The mixed materials were dried in the oven at 80° C. for 12 hours, extruded into a thin film with ethanol/water, followed by pressing the materials to 0.55 micron thickness onto stainless steel mesh. A 5×3.5 cm pouch cell was made using with NiOOH as cathode, Fiber Glass separator, PAQN as anode (318 mg active material), and 10 M KOH as electrolyte and the resulting cell was analyzed for electrochemical performance.

Cells were cycled using a Neware tester. PAQN were charged and discharged at a rate of 72 mA. Charge cycles went for 30 minutes or until a 1.4 V was reached. Cells were cycled at 5.3 mA/cm$^2$ with a 1.5 V cutoff or for 30 minutes—whichever came first. Cutoff voltage during discharge was 0.6 V Tests were ended when <70% capacity was obtained during the discharge cycle.

Figure 28:
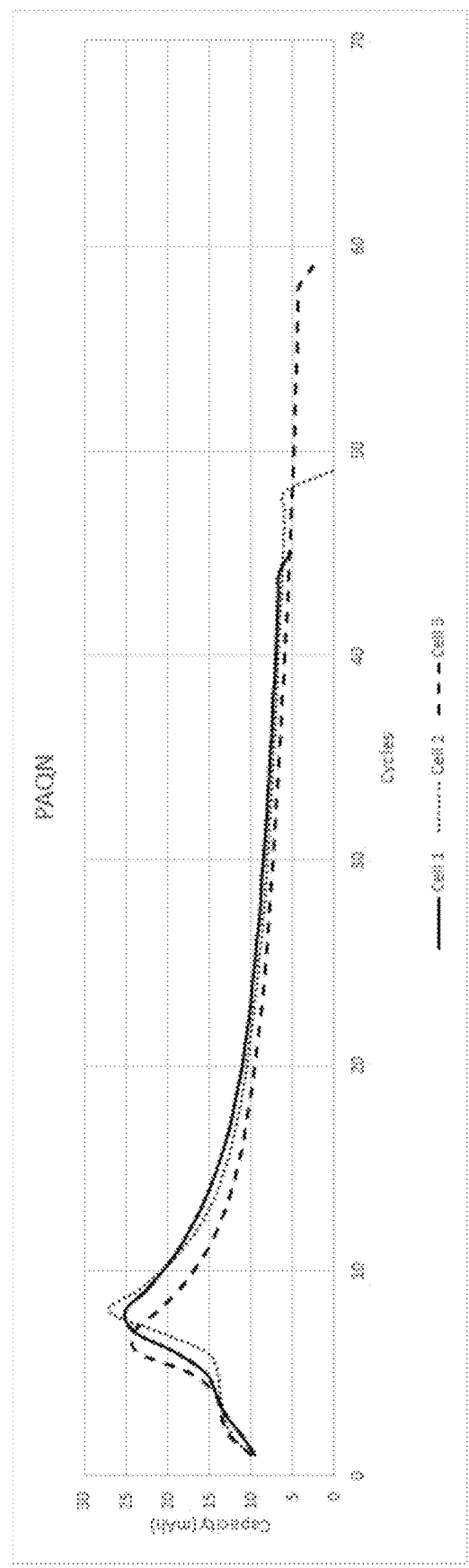
FIG. 28 shows a chart reporting the electrochemical cycling performance of three exemplary duplicate PolyAnthraQuinone-triaryl amine (PAQN) cells. The y-axis shows the detected capacity (mAh) which is a measurement the current (mA) of the cell over time (h) until the cell reached a voltage of 0.6 V. The x-axis shows the number of cycles, which includes both the charge and discharge step.

The results showing the electrochemical cycling performance of PolyAnthraQuinone-triaryl amine (PAQN) which includes charging cycle of three cells with active material being PAQN and a Ni(OH)2 cathode are illustrated in FIG. 28, shows that the network anode material provided up to 50 charge/discharge cycles (FIG. 28).

Example 23: Synthesis of PAQAN

Branch chains in polymers are expected to produce poorer packing efficiencies and thus lower densities compared to linear chain analogues, (see Example 26 below)

Decreasing accessible pore volume correlates with the decreasing surface area observed.

Branched chain active material PAQAN was prepared under ambient air. A solution of DMF (125 mL, >99%, Acros Organics), 2,6-diaminoanthraquinone (5.0 g, 97%, Sigma Aldrich), and a,a'-dibromo-p-xylene (0.475 g, >98%, TCI) was made and stirred at 80° C. for 1.5 hours. Sodium hydroxide (3.368 g, 97%, Sigma Aldrich) was then added to the solution and was heated to 155 C for 2 hours. The solution was filtered and washed with deionized water and acetone and the powder was collected and dried under vacuum at 100° C. overnight. Elemental Analysis: C=66.26%, H=3.80%, N=9.86%.

The molecular structure for network polymer PAQAN PolyAnthraQuinone Aryl Amine so obtained is reported below in which at least five (5) p-xylylene moiety (Z) and at least five (5) anthraquinone moiety are present in PAQAN.

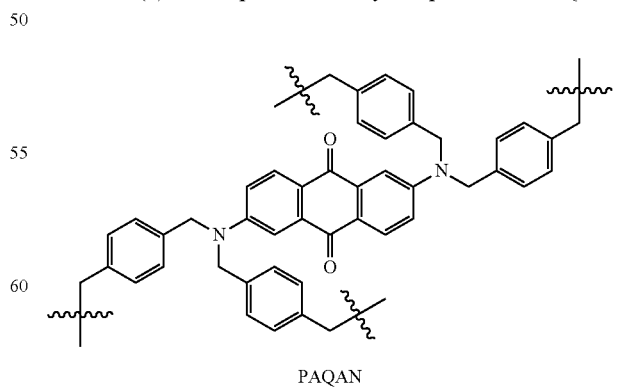

PAQAN

The elemental analysis of the PAQAN so obtained is illustrated in the Table 2.

TABLE 2

PAQAN elemental analysis data

| PAQAN | Measured Wt % |
|---|---|
| N | 9.86 |
| C | 62.66 |
| H | 3.8 |

Example 24: Voltages of Electrochemical Cells Using PAQAN and PAQS Polymers

Figure 29:
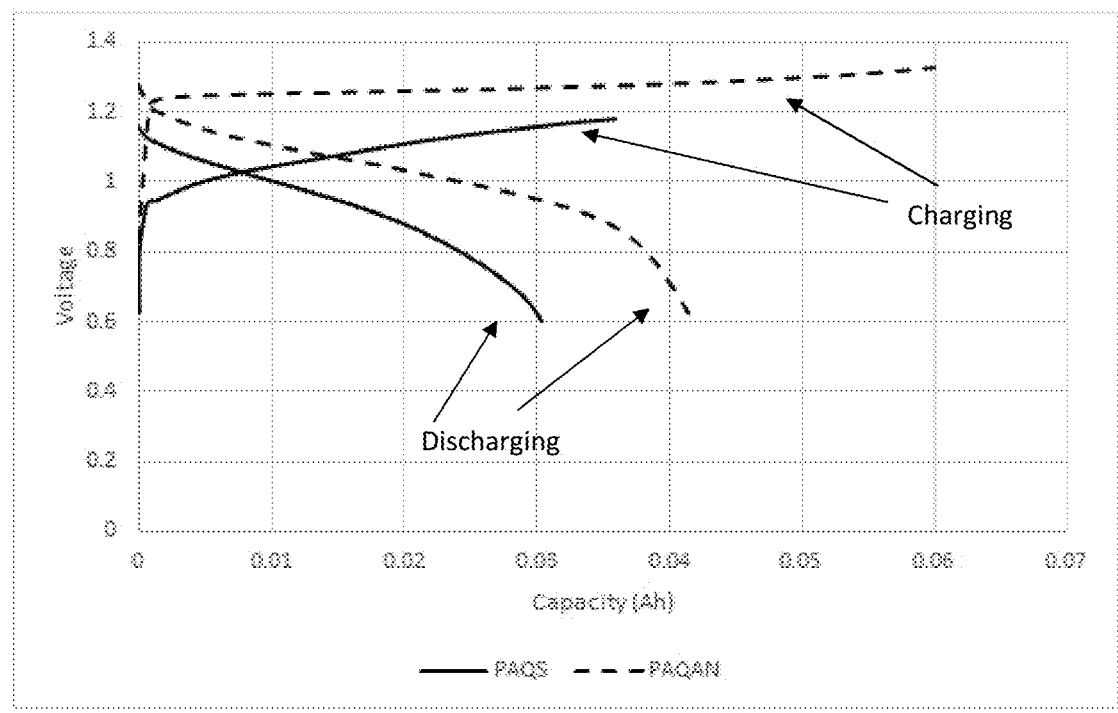
FIG. 29 shows a chart reporting voltages for electrochemical cells comprising exemplary crosslinked polymers PAQAN described herein compared with linear PAQS. The y-axis indicates the voltage of the cell. The x-axis reports the capacity (Ah) of the cell. The curves represents the charge step, and discharge step that end at 0.6 V as indicated by arrows.

FIG. 29 shows voltages for electrochemical cells using for network polymers PAQAN and PAQS as described herein. The y-axis consists of the voltage of the cell. The x-axis references the capacity (Ah) of the cell. The upper curves represent the charge step, while the lower curves that end at 0.6 V represent the discharge step of the cycle.

Polymers were tested in a 3 cm×5 cm single layer pouch cell vehicle using an alkaline electrolyte with nickel hydroxide cathode and a separator. Electrodes were punched to 3 cm×4.5 cm dimensions. Linear PAQS was charged and discharged at a rate of 72 mA.

Charge cycles went for 30 minutes or until a 1.5 V was reached. PAQAN was charged and discharged at a rate of 108 mA. Charge cycles went for 33 minutes and 30 seconds or until 1.5 V was reached. All cells had a discharge cut off voltage of 0.6 V. Tests were ended when <70% capacity was obtained during the discharge cycle.

PAQAN shows a higher voltage of one hundred millivolts compared to the PAQS analogue, which demonstrates the importance of linker type and position.

Example 25: Charges Capacity of Electrochemical Cells Using PAQAN and PAQS Polymers Changes of charge capacity of an electrochemical cell with electrodes comprising network polymers PAQAN described herein were tested in comparison with cells with electrodes having PAQS polymer using the experimental settings of Example 23.

Figure 30:
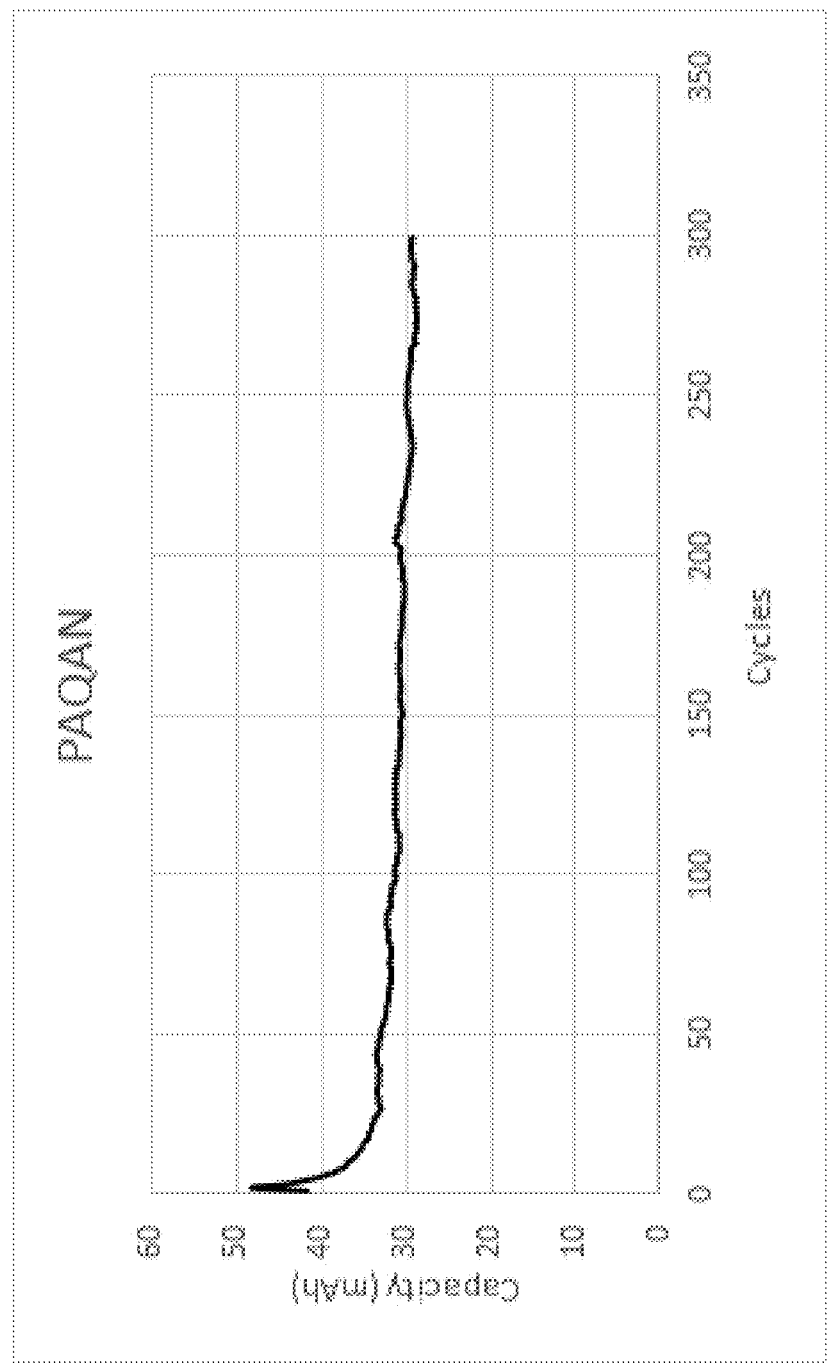
FIG. 30 shows a chart illustrating the capacity of an exemplary electrochemical cell comprising crosslinked polymer PAQAN herein described. The y-axis reports the detected capacity (Ah) of the cell, the x-axis reports the detected number of cycles.
Figure 31:
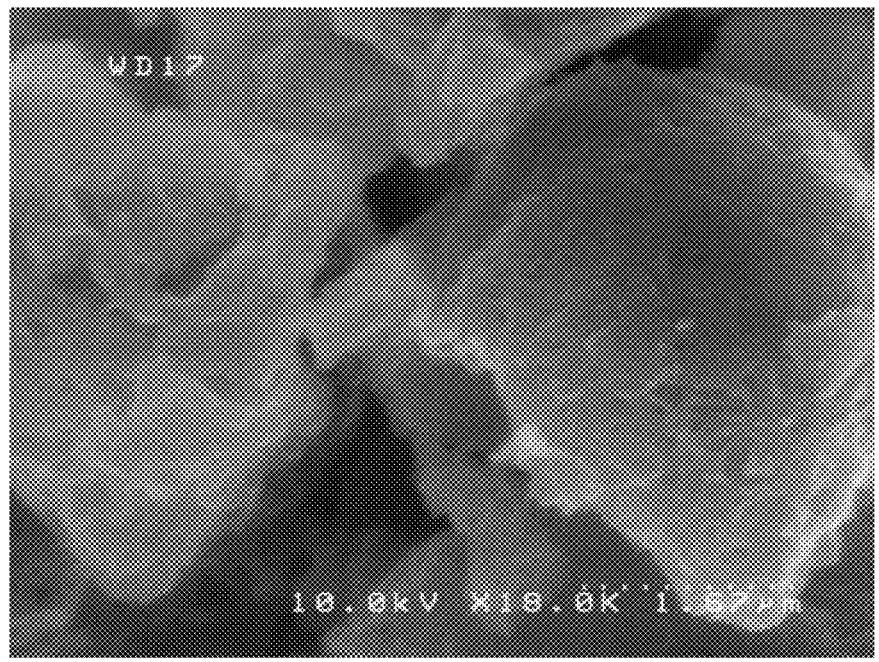
FIG. 31 shows an SEM image of an exemplary hot air balloon architecture of PAQCS with a 10.0 kV acceleration voltage.
Figure 32:
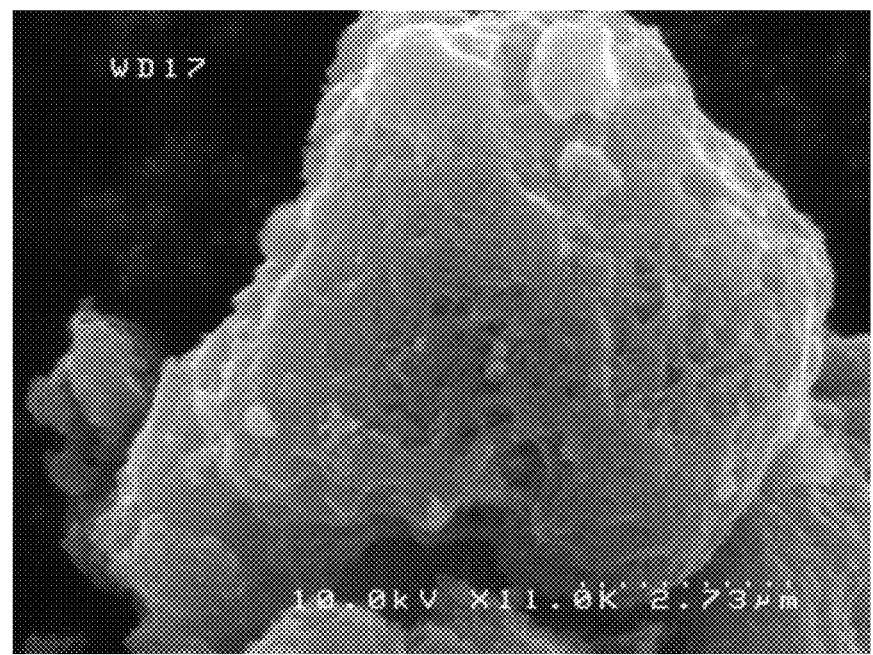
FIG. 32 shows an SEM image of an exemplary oblong spheroid architecture of PAQCS with a 10.0 kV acceleration voltage.
Figure 33:
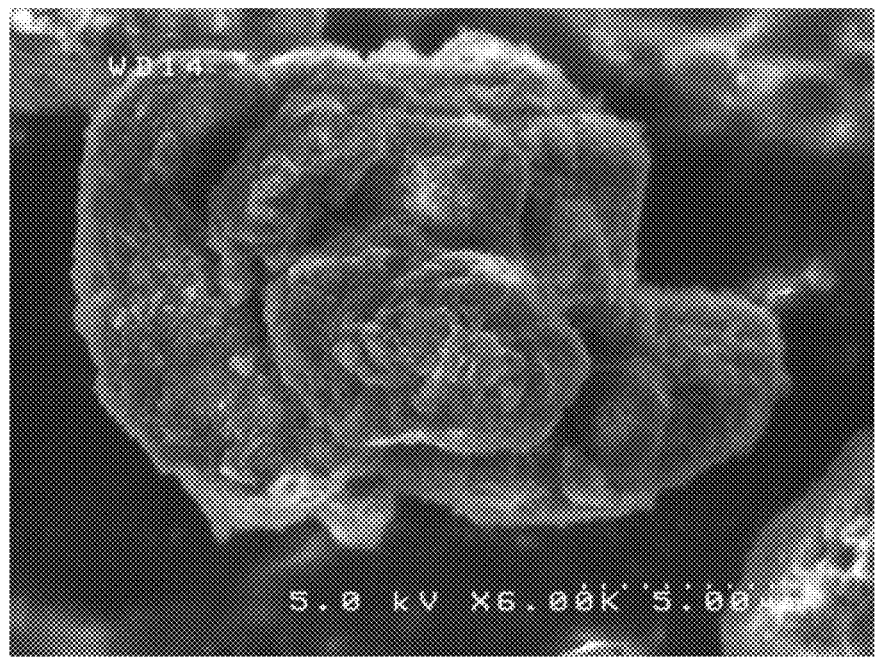
FIG. 33 shows an SEM image of architecture of PAQAS with a 5.0 kV acceleration voltage.

The results illustrated in FIG. 30 shows changes of charge capacity over 300 cycles for an electrochemical cell made of network polymers PAQAN described herein.

Example 26: Density and Porosity of Network Polymers—a Comparative Study

The densities, specific surface area, pore volume, pore size and micropore volume for PAQS, PAQAS and PAQN polymers described herein are were detected and illustrated in Table 3.

TABLE 3

Density and porosity measurements for PAQS, PAQAS and PAQAN

| | Density | Surface Area (m2/g) | Pore Volume (cm3/g) | Pore Size (A) | Micropore Volume (cm3/g) |
|---|---|---|---|---|---|
| PAQS | 3.7393 | 87.6696 | 0.195718 | 90.089 | 0.002604 |
| PAQAS | 2.2444 | 39.703 | 0.126749 | 128.845 | |
| PAQAN | 1.5176 | 4.6614 | 0.012375 | 183.129 | |

Example 27: Synthesis and Testing of PAQAS, PAQCS

PAQRS as described herein was synthesized with redox active monomer of 1,5-dichloroanthraquinone, comonomer of halogenated material, and NMP with heating to reflux (120-220° C.) in the presence of sodium sulfide 60% hydrate. The redox active monomer of 1,5-dichloroanthraquinone and comonomer of halogenated materials were mixed in molar ratios between 0.03 and 0.8 (comonomer of halogenated materials: 1,5-dichloroanthraquinone).

After synthesis, materials were washed over filter paper with water and acetone and dried in a 100° C. oven overnight under vacuum. Colors varied greatly of final products depending on the branching monomer used.

Materials were mixed with ratios of 70:20:10 by weight crosslinked redox active network polymer:Carbon Black:PTFE. The mixed materials were then formed into a dough and pasted onto stainless steel mesh.

Cells were built with a nickel hydroxide cathode in a pouch cell form factor and placed in a 45% KOH electrolyte. Cells were tested with an 8 mA/cm$^2$ current density using a Neware tester.

To simulate commercial testing conditions where anode to cathode (N/P) ratios would be anywhere between 1.2 to 1.8, charging was limited to between 50 and 150 mAh/g of active material in the anode.

Example 28: Electrochemical Cycling of Networks Polymer Materials

A redox active monomeric moiety having an aromatic ring, such as PAQS, PAQAS, PAQCS, PAQN, PAQAN can be substituted with any of the substituent groups on the leftmost column of the Hammett Sigma constants reported in Table 1.

To increase the redox potential of the redox active monomeric moiety having an aromatic ring, a substituent group with a large Hammett sigma constant can be selected, for example a CN or a CF$_3$ group (see the Hammett Sigma constants reported in Table 1)

Example 29: Production of Electrode Material with PAQS, PAOPAS and PAQN

Straight chain polymers of PAQS were placed in a tubal furnace. Samples were subjected to temperatures between 200-500° C. under argon, nitrogen, or air atmospheres. After undergoing this process, materials were observed to darken and were less dispersible/soluble in water/ethanol/acetone media compared to straight chain analogues. Materials were mixed with ratios by weight of 70:20:10 crosslinked polymer:Carbon Black:PTFE.

Materials were then formed into a dough and pasted onto stainless steel mesh. Cells were built with a nickel hydroxide cathode in a pouch cell form factor and placed in a 45% KOH electrolyte.

In particular PAQPAS, PAQN, and PAQS were tested with a 5.3 mA/cm$^2$ current density using a Neware tester. All other cells were tested with an 8 mA/cm$^2$ current density using a Neware tester.

To simulate commercial testing conditions where anode to cathode (N/P) ratios would be anywhere between 1.2 to 1.8, charging was limited to between 50 and 150 mAh/g of active material in the anode.

Example 30: Electrochemical Cell Construction and Testing

Electrochemical cell comprising PAQS, PAQCS, PAQAS and PAQPAS polymers were constructed. In particular 3.5×5 cm pouch cells were prepared to test electrochemical performance. Pasted NiOOH cathodes were punched into 4.5×3 cm coupons. Anodes were punched to the same sized coupon.

In the exemplary cells the PAQS anode weighed 0.9586 g, PAQCS weighed 0.873 g, and PAQAS weighed 1.075 g. Tabs with sealant were welded onto each electrode. A 11.0 um thick fiberglass separator from Freudenberg was punched into a 10.5×3.5 cm coupon. Electrodes and separator were stacked and placed into a polypropylene coated aluminum foil pouch. 1.2 g of 10 M KOH electrolyte was pipetted into the cell and put under vacuum. Cells then underwent a final vacuum seal over the side with the tabs.

PAQAS and PAQCS cells as described herein were charged and discharged at 108 mA rates using Neware testers. Cells were charged for 20 minutes or to 1.5 V—whichever condition was met first. Cells were discharged to 0.6 V. Cells had an (Open Circuit Voltage) OCV vs. lithium metal of between 2.8 and 3.1 V.

Figure 39:
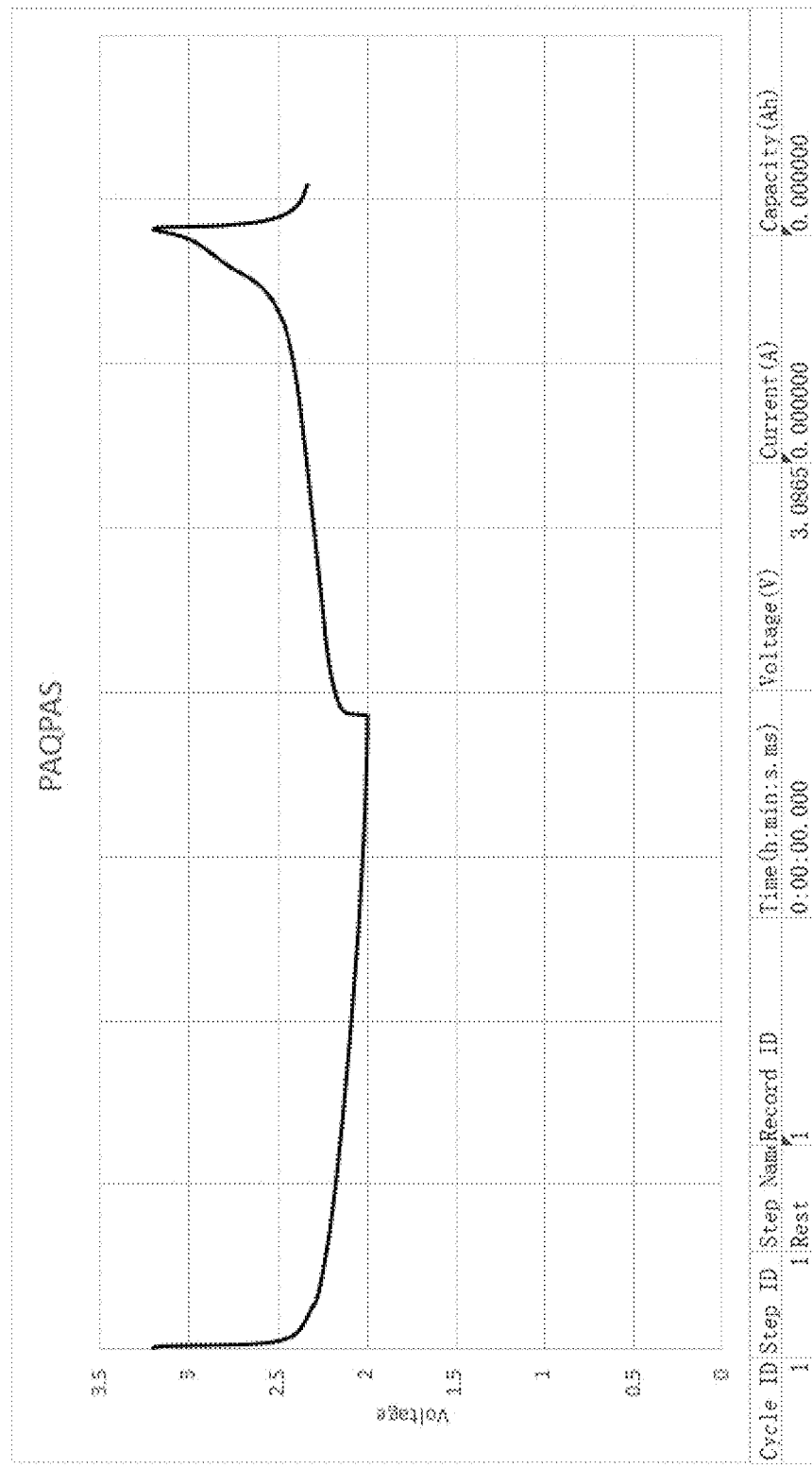
FIG. 39 shows experimental Open Circuit Voltage (OCV) and voltage profile data for the exemplary crosslinked polymer PAQPAS herein described in a lithium metal half cell for one cycle. The y-axis shows the voltage of the cell. The x-axis references the capacity (Ah) of the cell.
Figure 40:
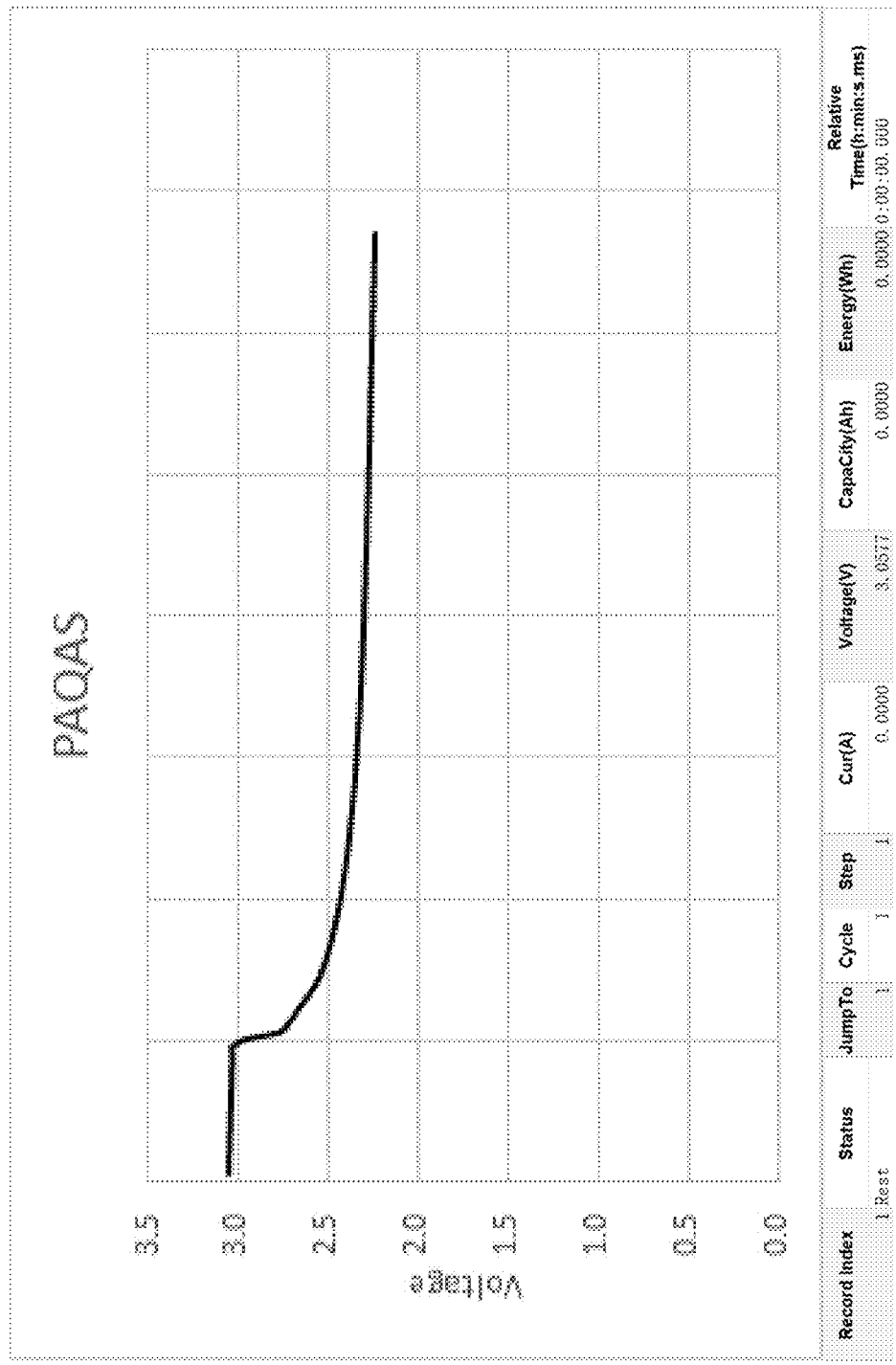
FIG. 40 shows experimental Open Circuit Voltage (OCV) and discharge data for the exemplary crosslinked polymer PAQAS herein described in a lithium metal half cell. The y-axis shows the voltage of the cell. The x-axis references the capacity (Ah) of the cell.

The performance of cells comprising PAQPAS and cells comprising PAQAS was tested and the results are shown in FIG. 39 (PAQPAS) and FIG. 40 (PAQAS)

In particular both the PAQPAS and PAWAS cells were constructed in a CR2016 coin cell with a LiPF6 electrolyte and polypropylene separator. The cell was tested with a current of 0.89 mA in Newer tested. Cells were tested between 3.2 and 2.0 V.

FIG. 39 shows the experimental Open Circuit Voltage (OCV) and voltage profile data for PAQPAS in a lithium metal half cell, for one cycle.

FIG. 40 shows experimental OCV and discharge data for PAQAS in a lithium metal half cell.

As will be appreciated from the above Examples, the features and performance of the crosslinked polymer material herein described support their use as organic electrode materials suitable for a wide range of primary or rechargeable applications, such as stationary batteries for emergency power, local energy storage, starter or ignition, remote relay stations, communication base stations, uninterruptible power supplies (UPS), spinning reserve, peak shaving, or load leveling, or other electric grid electric storage or optimization applications. Small format or miniature battery applications including watch batteries, implanted medical device batteries, or sensing and monitoring system batteries (including gas or electric metering) are contemplated, as are other portable applications such as flashlights, toys, power tools, portable radio and television, mobile phones, camcorders, lap-top, tablet or hand-held computers, portable instruments, cordless devices, wireless peripherals, or emergency beacons. Military or extreme environment applications, including use in satellites, munitions, robots, unmanned aerial vehicles, or for military emergency power or communications are also possible.

In summary, described herein are crosslinked polymers and related compositions and related compositions, electrochemical cells, batteries, methods and systems are described. The crosslinked polymers have at least one redox active monomeric moiety having a redox potential of 0.5 V to 3.0 V with reference to Li/Li$^+$ electrode potential under standard conditions or −2.54 V to −0.04 V vs. SHE and has a carbocyclic structure and at least one carbonyl group or a carboxyl group on the carbocyclic structure. The crosslinked polymers also include at least one comonomeric moiety with at least one of the at least one redox active monomeric moiety and/or the at least one comonomeric moiety has a denticity of three to six corresponding to a three to six connected network polymer, and provide stable, high capacity organic electrode materials.

The examples set forth above are provided to give those of ordinary skill in the art a complete disclosure and description of how to make and use the embodiments of crosslinked polymers and related compositions and related compositions, electrochemical cells, batteries, methods and systems of the disclosure, and are not intended to limit the scope of what the Applicants regard as their disclosure. Modifications of the above-described modes for carrying out the disclosure can be used by persons of skill in the art and are intended to be within the scope of the following claims.

The entire disclosure of each document cited (including patents, patent applications, journal articles including related supplemental and/or supporting information sections, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed. Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The term "alkyl" as used herein refers to a linear, branched, or cyclic saturated hydrocarbon group typically although not necessarily containing 1 to about 15 carbon atoms, or 1 to about 6 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 15 carbon atoms. The term "cycloalkyl" intends a cyclic alkyl group, typically having 4 to 8, or 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "heteroatom-containing" as in a "heteroatom-containing alky group" refers to an alkyl group in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Aryl groups can contain 5 to 24 carbon atoms, or aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The terms "cyclic", "cyclo-", and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The terms "halo", "halogen", and "halide" are used in the conventional sense to refer to a chloro, bromo, fluoro or iodo substituent or ligand.

The term alkylene as used herein refers to an alkanediyl group which is a divalent saturated aliphatic group, with two carbon atoms as points of attachment, a linear or branched, cyclo, cyclic or acyclic structure. Exemplary alkylene includes propane-1,2-diyl group (—CH(CH3)CH2-) or propane-1,3-diyl group (—CH2CH2CH2-).

The term alkenylene refers to alkenediyl group which is a divalent unsaturated aliphatic group, with two carbon atoms as points of attachment, a linear or branched, cyclo, cyclic or acyclic structure, at least one nonaromatic carbon-carbon double bond. Exemplary alkylene includes 2-butene-1,4-diyl group (—CH2CH=CHCH2-).

The term alkynylene refers to alkynediyl group which is a divalent unsaturated aliphatic group, with two carbon atoms as points of attachment, a linear or branched, cyclo, cyclic or acyclic structure, at least one nonaromatic carbon-carbon triple bond. Exemplary alkylene includes 2-butyne-1,4-diyl group (—CH2C≡CCH2-).

The term "substituted" as in "substituted alkyl," "substituted aryl," and the like, is meant that in the, alkyl, aryl, or other moiety, at least one hydrogen atom bound to a carbon (or other) atom is replaced with one or more non-hydrogen substituents.

Examples of such substituents include, without limitation: functional groups such as halo, hydroxyl, sulfhydryl, C1-C24 alkoxy, C2-C24 alkenyloxy, C2-C24 alkynyloxy, C5-C24 aryloxy, C6-C24 aralkyloxy, C6-C24 alkaryloxy, acyl (including C2-C24 alkylcarbonyl (—CO-alkyl) and C6-C24 arylcarbonyl (—CO-aryl)), acyloxy (—O-acyl, including C2-C24 alkylcarbonyloxy (—O—CO-alkyl) and C6-C24 arylcarbonyloxy (—O—CO-aryl)), C2-C24 alkoxycarbonyl (—(CO)—O-alkyl), C6-C24 aryloxycarbonyl (—(CO)—O-aryl), halocarbonyl (—CO)—X where X is halo), C2-C24 alkylcarbonato (—O—(CO)—O-alkyl), C6-C24 arylcarbonato (—O—(CO)—O-aryl), carboxy (—COOH), carboxylato (COO—), carbamoyl (—(CO)—NH2), mono-(C1-C24 alkyl)-substituted carbamoyl (—(CO)—NH(C1-C24 alkyl)), di-(C1-C24 alkyl)-substituted carbamoyl (—(CO)—N(C1-C24 alkyl)2), mono-(C5-C24 aryl)-substituted carbamoyl (—(CO)—NH-aryl), di-(C5-C24 aryl)-substituted carbamoyl (—(CO)—N(C5-C24 aryl)2), di-N—(C1-C24 alkyl), N—(C5-C24 aryl)-substituted carbamoyl, thiocarbamoyl (—(CS)—NH2), mono-(C1-C24 alkyl)-substituted thiocarbamoyl (—(CO)—NH (C1-C24 alkyl)), di-(C1-C24 alkyl)-substituted thiocarbamoyl (—(CO)—N(Cl—C24 alkyl)2), mono-(C5-C24 aryl)-substituted thiocarbamoyl (—(CO)—NH-aryl), di-(C5-C24 aryl)-substituted thiocarbamoyl (—(CO)—N (C5-C24 aryl)2), di-N—(C1-C24 alkyl), N—(C5-C24 aryl)-substituted thiocarbamoyl, carbamido (—NH—(CO)—NH2), cyano(—C≡N), cyanato (—O—C≡N), thiocyanato (—S—C≡N), formyl (—(CO)—H), thioformyl ((CS)—H), amino (—NH2), mono-(C1-C24 alkyl)-substituted amino, di-(C1-C24 alkyl)-substituted amino, mono-(C5-C24 aryl)-substituted amino, di-(C5-C24 aryl)-substituted amino, C2-C24 alkylamido (—NH—(CO)-alkyl), C6-C24 arylamido (—NH—(CO)-aryl), imino (—CR=NH where R=hydrogen, C1-C24 alkyl, C5-C24 aryl, C6-C24 alkaryl, C6-C24 aralkyl, etc.), C2-C20 alkylimino (CR=N(alkyl), where R=hydrogen, C1-C24 alkyl, C5-C24 aryl, C6-C24 alkaryl, C6-C24 aralkyl, etc.), arylimino (—CR=N(aryl), where R=hydrogen, Cl—C20 alkyl, C5-C24 aryl, C6-C24 alkaryl, C6-C24 aralkyl, etc.), nitro (—NO2), nitroso (—NO), sulfo (—SO2-OH), sulfonato (—SO2-O⁻), C1-C24 alkylsulfanyl (—S-alkyl; also termed "alkylthio"), C5-C24 arylsulfanyl (—S-aryl; also termed "arylthio"), C1-C24 alkylsulfinyl (—(SO)-alkyl), C5-C24 arylsulfinyl (—(SO)-aryl), C1-C24 alkylsulfonyl (—SO2-alkyl), C5-C24 arylsulfonyl (—SO2-aryl), boryl (—BH2), borono (—B (OH)2), boronato (—B(OR)2 where R is alkyl or other hydrocarbyl), phosphono (—P(O)(OH)2), phosphonato (—P(O)(O⁻)2), phosphinato (—P(O)(O⁻)), phospho (—PO2), phosphino (—PH2), silyl (—SiR3 wherein R is hydrogen or hydrocarbyl), and silyloxy (—O-silyl); and the hydrocarbyl moieties C1-C24 alkyl (e.g. C1-C12 alkyl and C1-C6 alkyl), C2-C24 alkenyl (e.g. C2-C12 alkenyl and C2-C6 alkenyl), C2-C24 alkynyl (e.g. C2-C12 alkynyl and C2-C6 alkynyl), C5-C24 aryl (e.g. C5-C14 aryl), C6-C24 alkaryl (e.g. C6-C16 alkaryl), and C6-C24 aralkyl (e.g. C6-C16 aralkyl).

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined above.

The term "alkaryl" refers to an aryl group with an alkyl substituent, and the term "aralkyl" refers to an alkyl group with an aryl substituent, wherein "aryl" and "alkyl" are as defined above. In some embodiments, alkaryl and aralkyl groups contain 6 to 24 carbon atoms, and particularly alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "Periodic Table" refers to the version of IUPAC Periodic Table of the Elements dated Nov. 28, 2016, which is accessible at iupac.org/wp-content/uploads/2015/07/IUPAC_Periodic_Table-28Nov16.pdf.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations, which is not specifically disclosed herein.

"Optional" or "optionally" means that the subsequently described circumstance may or may not occur, so that the description includes instances where the circumstance occurs and instances where it does not according to the guidance provided in the present disclosure. For example, the phrase "optionally substituted" means that a non-hydrogen substituent may or may not be present on a given atom, and, thus, the description includes structures wherein a non-hydrogen substituent is present and structures wherein a non-hydrogen substituent is not present. It will be appreciated that the phrase "optionally substituted" is used interchangeably with the phrase "substituted or unsubstituted."

Unless otherwise indicated, an optionally substituted group may have a substituent at each substitutable position of the group, and when more than one position in any given structure may be substituted with more than one substituent selected from a specified group, the substituent may be either the same or different at every position. Combinations of substituents envisioned can be identified in view of the desired features of the compound in view of the present disclosure, and in view of the features that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In summary, in several embodiments, described herein are organosilicon compound, related complex that allow performance of fluorocarbon compound or olefin-based reactions and in particular polymerization of olefins to produce polyolefin polymers, and related methods and systems are described.

In particular, it will be understood that various modifications may be made without departing from the spirit and scope of the present disclosure. Accordingly, other embodiments are within the scope of the following claims.

REFERENCES (1) U.S. Pat. No. 6,248,474 B1.
(2) U.S. Pat. No. 10,033,039.
(3) U.S. patent application publication No. US 2013/0004836 A1.
(4) JP Patent No. JP 3039484B2.
(5) U.S. patent application publication No. US 2013/0004836 A1.
(6) JP Patent No. JP3045750.
(7) U.S. patent application publication No. US 2013/0122367 A1.
(8) Morita Yasushi et al., "Organic tailored batteries materials using stable open-shell molecules with degenerate frontier orbitals," *Nature Materials*, Vol. 10, pp. 947-951 (2011).
(9) Hao Xu et al., "A new fluorine-containing star-branched polymer as electrolyte for all-solid-state lithium-ion batteries," *Polymer*, Vol. 146, pp. 249-255 (2018).
(10) Yanliang Liang et al., "Universal quinone electrodes for long cycle life aqueous rechargeable batteries," *Nature Materials*, Vol. 16, pp. 841-848 (2017), PUBLISHED ONLINE: 19 Jun. 2017.
(11) Takaaki Tomai et al., "Analysis of Degradation Mechanisms in Quinone-Based Electrodes for Aqueous Electrolyte System via In Situ XRD Measurements," *J. Phys. Chem. C* 2018, 122, 2461-2466.
(12) Casper Clausen et al. "Anthraquinone Oligomers as Anode-Active Material in Rechargeable Nickel/Oligomer Batteries with Aqueous Electrolyte," January 2018, 18 pages, accessible on Sep. 30, 2019 from researchgate.net/ publication/322407108_Anthraquinone_Oligomers_a-s_Anode-Active_Material_in_Rechargeable_NickelOligomer_Batteries_with_Aqueous Electrolyt e.

(13) Mingqiang Sun et al. "Rational synthesis of novel π-conjugated poly(1,5-diaminoanthraquinone) for high-performance supercapacitors," *RSC Advance*, Vol. 4, No. 15, 2014, 7774-7779.

(14) Manik E. Bhosale et al. "Organic small molecules and polymers as an electrode material for rechargeable lithium ion batteries," *J. Mater. Chem. A*, 2018, Vol. 6, No. 41, pp. 19885-19911.

(15) Bernhard Haupler et al. "Carbonyls: Powerful Organic Materials for Secondary Batteries," *Adv. Energy Mater.* 2015, 5, 1402034 (34 pages).

(16) Sungho Lee et al. "Effect of Curing Poly(p-Phenylene Sulfide) on Thermal Properties and Crystalline Morphologies," *Advances in Chemical Engineering and Science*, 2013, 3, 145-149.

The invention claimed is:

1. A network polymer, the network polymer is represented by Formula (I)

    Formula (I)

in which

Q is a redox active a bidentate, tridentate, tetradentate, pentadentate or a hexadentate monomeric organic moiety comprising a carbocyclic structure and at least one carbonyl group or a carboxyl group presented on the carbocyclic structure, Q having a redox potential of 0.5 V to 3.0 V with reference to Li/Li+ electrode potential under standard conditions or −2.54 V to −0.04 V with reference to SHE, Z is a co-monomeric moiety selected from a bidentate, tridentate, tetradentate, pentadentate and a hexadentate chemical moiety, x indicates the molar ratio of Z:Q and ranges from 0.2 to 3, and m ranges from 5 to 1,000 wherein at least one of Q and Z of each monomer of the network polymer is a tridentate, tetradentate, pentadentate or a hexadentate organic moiety linked to at least one of Q and Z of another monomer of the network polymer; and wherein the network polymer has a weight average molecular weight of at least 1500 Dalton and a solubility in water of equal or less than 1.0 microgram per mL at room temperature, wherein the carbocyclic structure Q is represented by Formula (III):

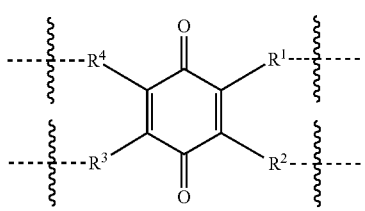

Formula (III)

wherein $R^1$, $R^2$, $R^3$, and $R^4$ are each independently null, H, OH, $NR^{10}$, SH wherein $R^{10}$ is a H, linear or branched, substituted or unsubstituted C1-C4 aliphatic group, linear or branched, substituted or unsubstituted C1-C4 aliphatic group, $R^1$ and $R^2$ together and/or $R^3$, and $R^4$ together are part of an aromatic or aliphatic cyclic structure, wherein the dashed line — represents a hydrogen or a single bond, with the proviso that at least two of the dashed lines in Formula (III) represent a single bond.

2. The network polymer of claim 1, wherein the at least one co-monomeric moiety Z is selected from the group consisting of

    (IVa)

    (IVb)

    (IVb1)

    (IVc)

    (IVd)

    (IVe)

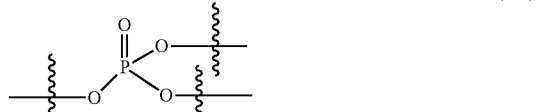    (IVf)

    (IVf1)

    (IVf2)

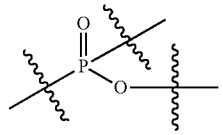    (IVf3)

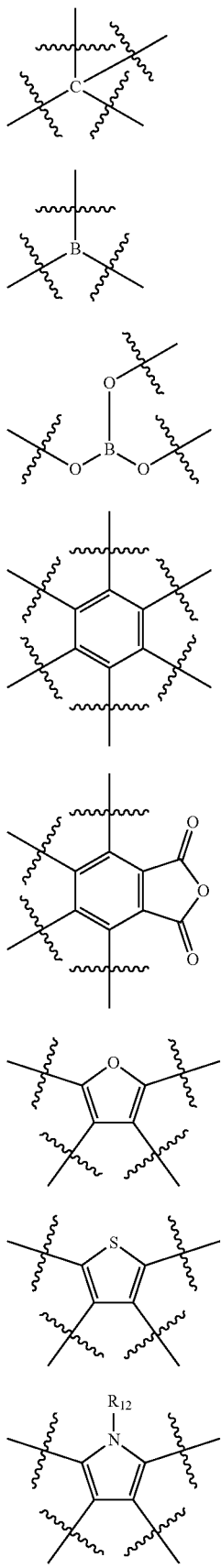
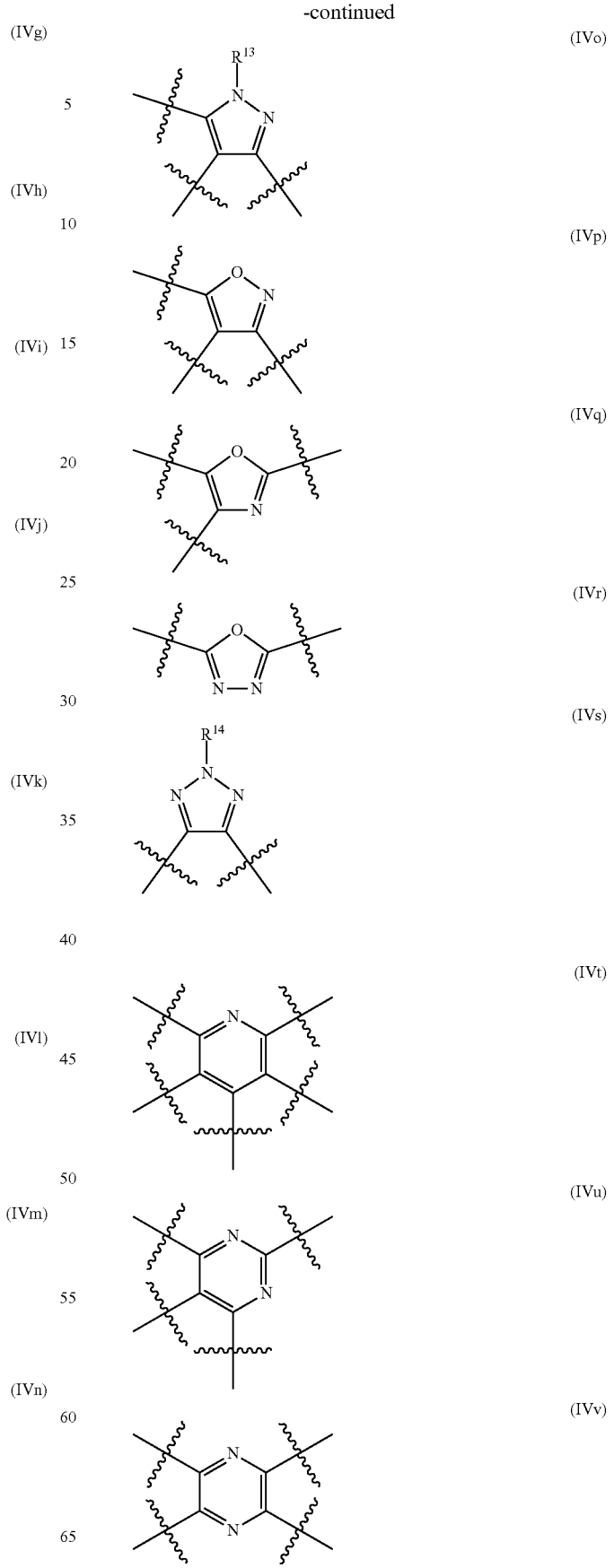

-continued

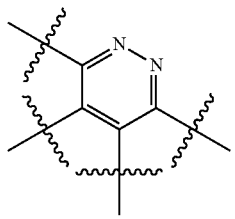
(IVw)

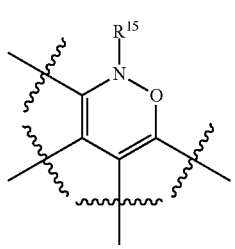
(IVx)

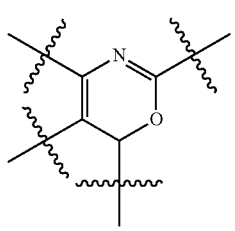
(IVy)

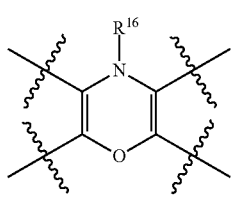
(IVz)

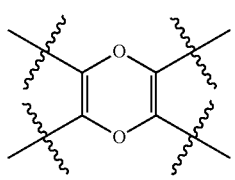
(IVa1)

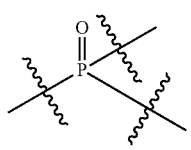
(IVb1)

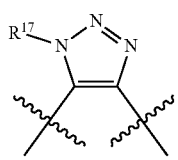
(IVc1)

wherein $R^{11}$, $R^{12}$, $R^{13}$ $R^{14}$, $R^{15}$, $R^{16}$, and $R^{17}$ are independently an H, linear or branched, substituted or unsubstituted C1-C4 aliphatic group.

3. A method for making a network polymer of claim 1, the method comprising
providing a redox active monomer comprising a redox active monomeric moiety Q comprising a carbocyclic structure and at least one carbonyl group or a carboxyl group presented on the carbocyclic structure optionally substituted with three to five functional groups, the redox active monomeric moiety Q having a redox potential of 0.5 V to 3.0 V with reference to Li/Li$^+$ electrode potential under standard conditions or −2.54 V to −0.04 V with reference to SHE;
providing a comonomer comprising a co-monomeric chemical moiety Z substituted with two to six functional groups and capable of reacting with the redox active monomer to form a polymer,
contacting the redox active monomer and the comonomer for a time and under conditions to allow reaction of the redox active moiety Q with the co-monomeric moiety Z to provide the network polymer.

4. An electrode composition comprising
a network polymer according to claim 1 together with a binder, and a conductive additive.

5. The electrode composition of claim 4, wherein
the binder is selected from one of polytetrafluoroethylene (PTFE), styrene-butadiene or styrene-butadiene rubber (SBR), poly(vinylidene-fluoride) (PVDF), poly(tetrafluoroethylene), sodium carboxymethylcellulose (CMC), styrene-butadiene rubber, polyacrylic acid (PAA), polyvinyl alcohol (PVA), polyethylene glycol (PEG or PEO), polyamide imide (PAI), polyacrylonitrile (PAN) Xanthan Gum, Gum Arabic, and Agar any combination thereof.

6. The electrode composition of claim 4, wherein
the conductive additive is selected from one of Carbon Black (Acetylene Black, Super P Li, C-nergy, Ketjen Black-300, Ketjen Black-600), Imerys (Super P, C-Nergy), carbon nanotubes (C-Nano, Tuball), graphene (xGnP Grade R, xGnP Grade H, xGnP Grade C, xGnP Grade M) and Graphite (KS-4, KS-8, KC-4, KC-8), and nickel powder or any combination thereof.

7. The electrode composition of claim 4, wherein
the binder is present in 1 to 20% by weight of the total electrode composition, and
the conductive additive is present in 5 to 70% by weight of the total electrode composition.

8. An electrochemical cell, the electrochemical cell comprising an anode, a cathode and an aqueous electrolyte, wherein the anode electrode and/or the cathode electrode comprise the network polymer according to claim 1.

9. The electrochemical cell of claim 8, wherein the anode electrode and/or the cathode electrode comprises one of nickel hydroxide (Ni(OH)$_2$), lead sulfate (PbSO$_4$), lithium cobalt oxide (LiCoO$_2$), zinc-carbon, zinc-air, nickel-zinc, silver-zinc, lithium nickel-manganese-cobalt oxide (LiNi$_x$Mn$_y$Co$_z$O$_2$ wherein x+y+z=1), lithium nickel-cobalt-aluminum oxide (LiNi$_x$Co$_y$Al$_z$O$_2$ wherein x+y+z=1), lithium manganese oxide (LiMn$_2$O$_4$), lithium nickel oxide (LiNiO), lithium vanadium oxide (LiV$_2$O$_5$) and lithium iron phosphate (LiFePO$_4$).

10. The electrochemical cell of claim 8, wherein
the aqueous electrolyte has a pH value from 0 to 14 at room temperature,
the aqueous electrolyte comprises at least one salt, and
the salt comprises at least one cation selected from lithium, sodium and potassium or any combination thereof, and at least one anion selected from sulfate, sulfonate, phosphate, phosphonate, carboxylate, acetate, hydroxide, perchlorate, trifluoroacetate, halide, fluoride, chloride, bromide, iodide, trifluoromethanesulfonate, bis(trifluoromethylsulfonyl)imide or any combination thereof.

11. The electrochemical cell of claim 8, wherein the at least one salt has a concentration ranging from 0.01 M to 10 M.

12. A battery comprising one or more electrochemical cells of claim 8.

13. A network polymer, the network polymer is represented by Formula (I)

[Q-co-Z$_x$]$_m$     Formula (I)

in which
- Q is a redox active a bidentate, tridentate, tetradentate, pentadentate or a hexadentate monomeric organic moiety comprising a carbocyclic structure and at least one carbonyl group or a carboxyl group presented on the carbocyclic structure, Q having a redox potential of 0.5 V to 3.0 V with reference to Li/Li+ electrode potential under standard conditions or −2.54 V to −0.04 V with reference to SHE,
- Z is a co-monomeric moiety selected from a bidentate, tridentate, tetradentate, pentadentate and a hexadentate chemical moiety,
- x indicates the molar ratio of Z:Q and ranges from 0.2 to 3, and
- m ranges from 5 to 1,000
- wherein at least one of Q and Z of each monomer of the network polymer is a tridentate, tetradentate, pentadentate or a hexadentate organic moiety linked to at least one of Q and Z of another monomer of the network polymer; and wherein the network polymer has a weight average molecular weight of at least 1500 Dalton and a solubility in water of equal or less than 1.0 microgram per mL at room temperature, wherein the at least one redox active monomeric moiety Q is selected from the group consisting of

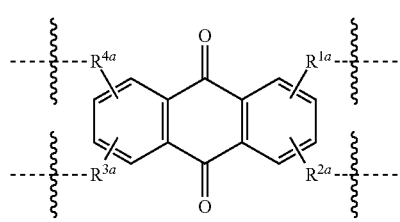
(IIIa)

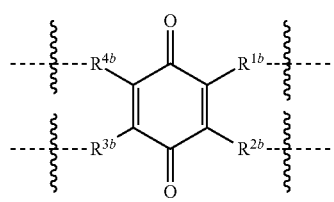
(IIIb)

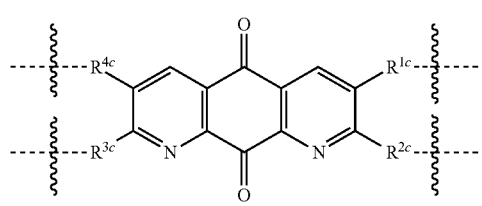
(IIIc)

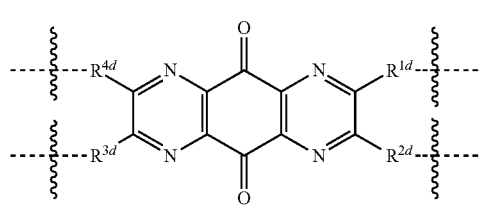
(IIId)

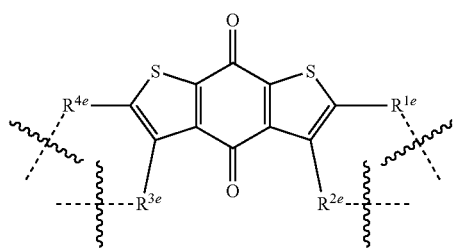
(IIIe)

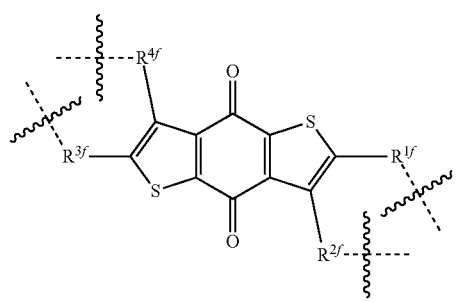
(IIIf)

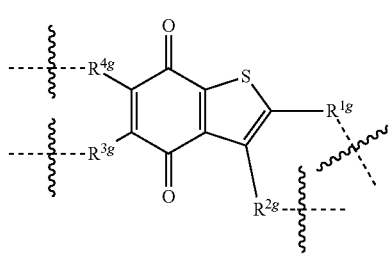
(IIIg)

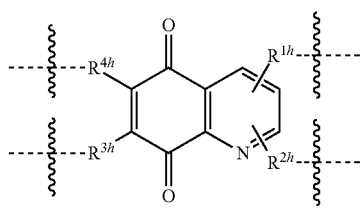
(IIIh)

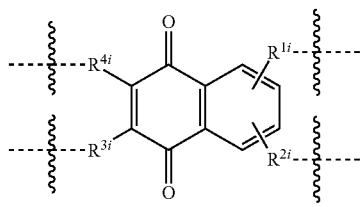
(IIIi)

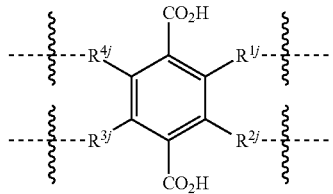
(IIIj)

wherein the dashed line — represents a hydrogen or a single bond, with the proviso that at least two of the dashed lines in each formula represents a single bond, wherein R$^{1a-j}$, R$^{2a-j}$, R$^{3a-j}$, and R$^{4a-j}$ each independently represents null, H, OH, NR$^{10}$, SH, wherein R$^{10}$ is a H, linear or branched, substituted or unsubstituted C1-C4 aliphatic group, linear or branched, substituted or unsubstituted C1-C4 aliphatic group, wherein the dashed line — represents a hydrogen or a single bond, with the proviso that at least two of the dashed lines in each of Formulas (IIIa-j) represents a single bond.

14. The network polymer of claim 13, wherein one or two of $R^{1b}$, $R^{2b}$, $R^{3b}$, and $R^{4b}$ are an OH group.

15. The network polymer of claim 13, wherein the at least one comonomeric moiety Z is selected from the group consisting of

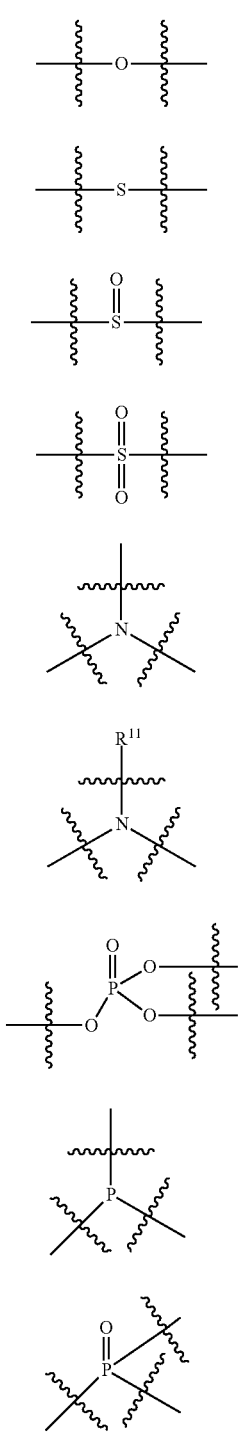

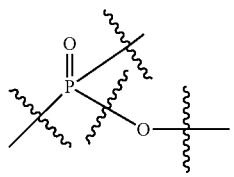

(IVf3)

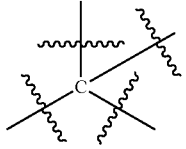

(IVg)

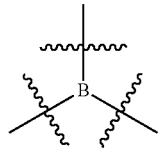

(IVh)

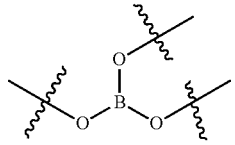

(IVi)

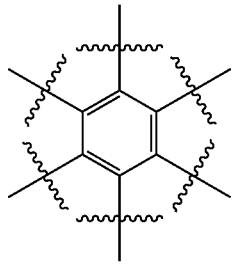

(IVj)

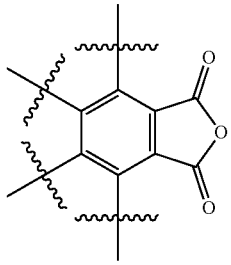

(IVk)

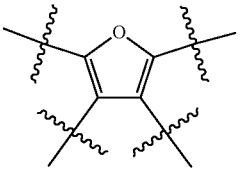

(IVl)

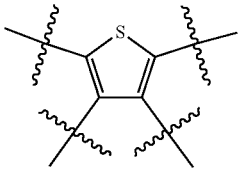

(IVm)

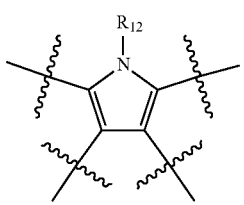 (IVn)
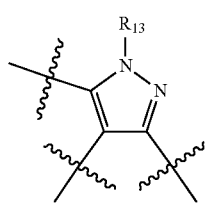 (IVo)
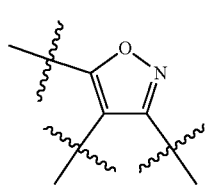 (IVp)
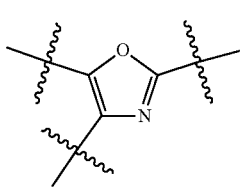 (IVq)
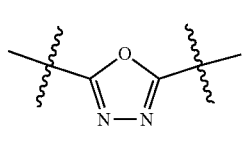 (IVr)
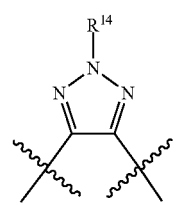 (IVs)
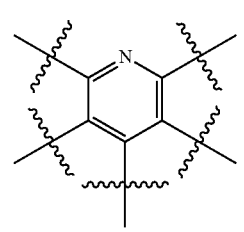 (IVt)
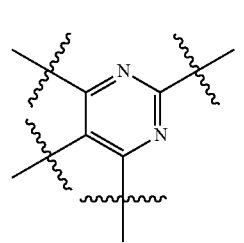 (IVu)
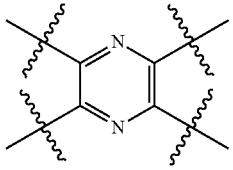 (IVv)
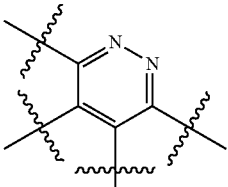 (IVw)
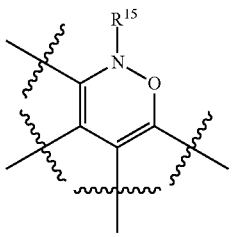 (IVx)
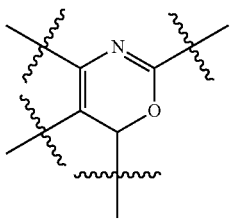 (IVy)
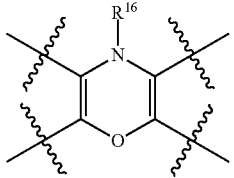 (IVz)
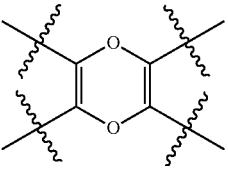 (IVa1)
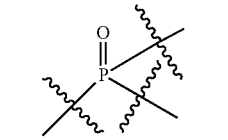 (IVb1)
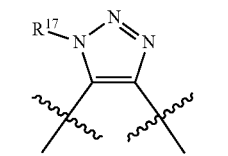 (IVc1)

wherein $R^{11}$, $R^{12}$, $R^{13}$ $R^{14}$, $R^{15}$, $R^{16}$, and $R^{17}$ are independently a H, linear or branched, substituted or unsubstituted C1-C4 aliphatic group.

16. The network polymer of claim 15, wherein one or two of $R^{1b}$, $R^{2b}$, $R^{3b}$, and $R^{4b}$ are a OH group.

17. A method for making a network polymer of claim 13, the method comprising
providing a redox active monomer comprising a redox active monomeric moiety Q comprising a carbocyclic structure and at least one carbonyl group or a carboxyl group presented on the carbocyclic structure optionally substituted with three to five functional groups, the redox active monomeric moiety Q having a redox potential of 0.5 V to 3.0 V with reference to Li/Li$^+$ electrode potential under standard conditions or −2.54 V to −0.04 V with reference to SHE;
providing a comonomer comprising a co-monomeric chemical moiety Z substituted with two to six functional groups and capable of reacting with the redox active monomer to form a polymer,
contacting the redox active monomer and the comonomer for a time and under conditions to allow reaction of the redox active moiety Q with the co-monomeric moiety Z to provide the network polymer.

18. An electrode composition comprising
a network polymer according to claim 13 together with a binder, and a conductive additive.

19. The electrode composition of claim 18, wherein
the binder is selected from one of polytetrafluoroethylene (PTFE), styrene-butadiene or styrene-butadiene rubber (SBR), poly(vinylidene-fluoride) (PVDF), poly(tetrafluoroethylene), sodium carboxymethylcellulose (CMC), styrene-butadiene rubber, polyacrylic acid (PAA), polyvinyl alcohol (PVA), polyethylene glycol (PEG or PEO), polyamide imide (PAI), polyacrylonitrile (PAN) Xanthan Gum, Gum Arabic, and Agar any combination thereof.

20. The electrode composition of claim 19, wherein
the binder is present in 1 to 20% by weight of the total electrode composition, and
the conductive additive is present in 5 to 70% by weight of the total electrode composition.

21. The electrode composition of claim 18, wherein
the conductive additive is selected from one of Carbon Black (Acetylene Black, Super P Li, C-nergy, Ketjen Black-300, Ketjen Black-600), Imerys (Super P, C-Nergy), carbon nanotubes (C-Nano, Tuball), graphene (xGnP Grade R, xGnP Grade H, xGnP Grade C, xGnP Grade M) and Graphite (KS-4, KS-8, KC-4, KC-8), and nickel powder or any combination thereof.

22. An electrochemical cell, the electrochemical cell comprising an anode, a cathode and an aqueous electrolyte, wherein the anode electrode and/or the cathode electrode comprise the network polymer according to claim 13.

23. The electrochemical cell of claim 22, wherein the anode electrode and/or the cathode electrode comprises one of nickel hydroxide (Ni(OH)$_2$), lead sulfate (PbSO$_4$), lithium cobalt oxide (LiCoO$_2$), zinc-carbon, zinc-air, nickel-zinc, silver-zinc, lithium nickel-manganese-cobalt oxide (LiNi$_x$Mn$_y$Co$_z$O$_2$ wherein x+y+z=1), lithium nickel-cobalt-aluminum oxide (LiNi$_x$Co$_y$Al$_z$O$_2$ wherein x+y+z=1), lithium manganese oxide (LiMn$_2$O$_4$), lithium nickel oxide (LiNiO), lithium vanadium oxide (LiV$_2$O$_5$) and lithium iron phosphate (LiFePO$_4$).

24. The electrochemical cell of claim 22, wherein
the aqueous electrolyte has a pH value from 0 to 14 at room temperature,
the aqueous electrolyte comprises at least one salt, and
the salt comprises at least one cation selected from lithium, sodium and potassium or any combination thereof, and at least one anion selected from sulfate, sulfonate, phosphate, phosphonate, carboxylate, acetate, hydroxide, perchlorate, trifluoroacetate, halide, fluoride, chloride, bromide, iodide, trifluoromethanesulfonate, bis(trifluoromethylsulfonyl)imide or any combination thereof.

25. The electrochemical cell of claim 22, wherein the at least one salt has a concentration ranging from 0.01 M to 10 M.

26. A battery comprising one or more electrochemical cells of claim 22.

27. A network polymer, the network polymer is represented by Formula (I)

[Q-co-Z$_x$]$_m$  Formula (I)

in which
Q is a redox active bidentate, tridentate, tetradentate, pentadentate or hexadentate monomeric organic moiety comprising a carbocyclic structure and at least one carbonyl group or a carboxyl group presented on the carbocyclic structure, Q having a redox potential of 0.5 V to 3.0 V with reference to Li/Li+ electrode potential under standard conditions or −2.54 V to −0.04 V with reference to SHE,
Z is a co-monomeric moiety selected from a bidentate, tridentate, tetradentate, pentadentate and a hexadentate chemical moiety,
x indicates the molar ratio of Z:Q and ranges from 0.2 to 3, and
m ranges from 5 to 1,000
wherein at least one of Q and Z of each monomer of the network polymer is a tridentate, tetradentate, pentadentate or hexadentate organic moiety linked to at least one of Q and Z of another monomer of the network polymer; and
wherein the network polymer has a weight average molecular weight of at least 1500 Dalton and a solubility in water of equal or less than 1.0 microgram per mL at room temperature, wherein the network polymer is selected from the group consisting of

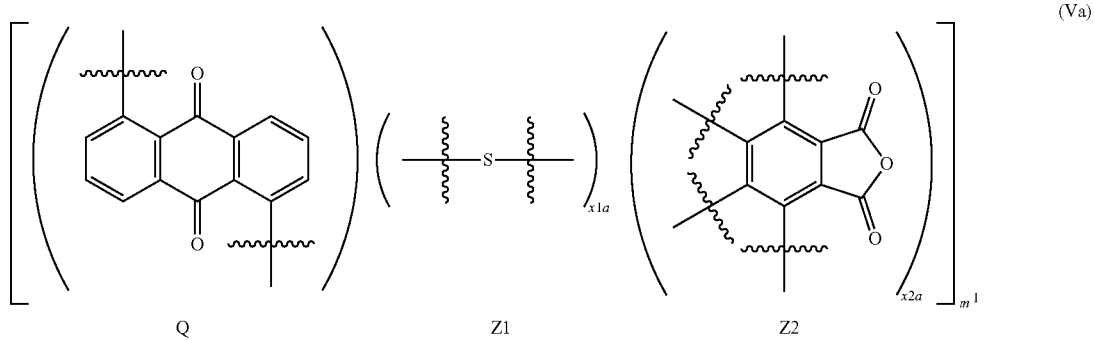

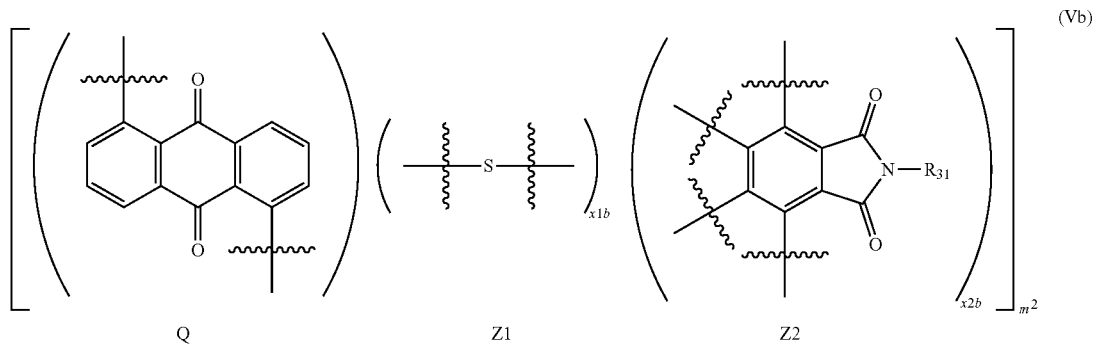
(Vb)
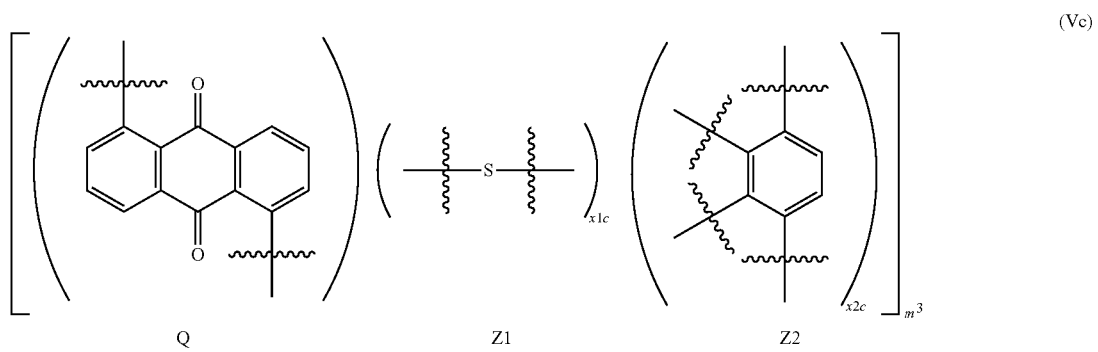
(Vc)
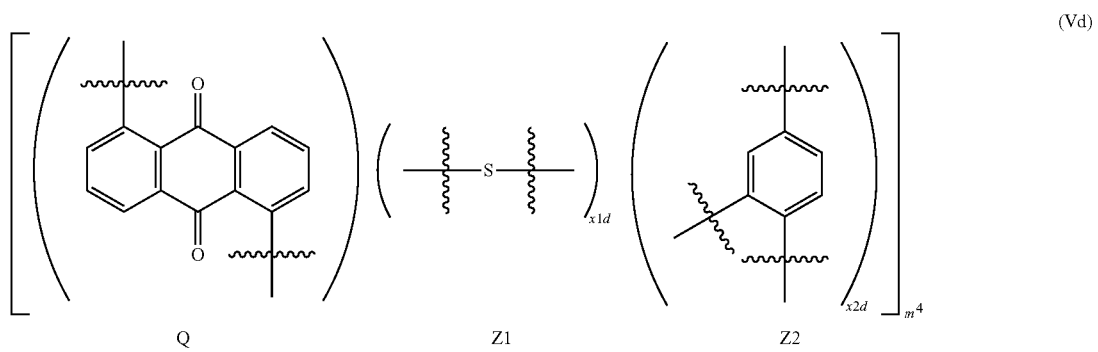
(Vd)
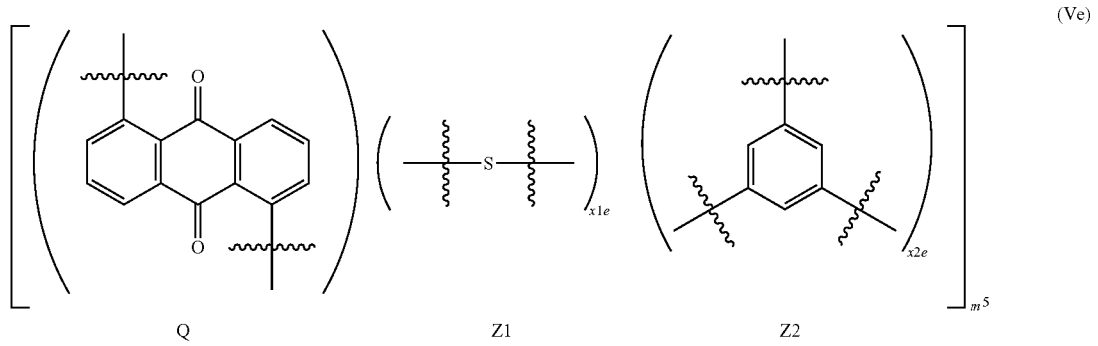
(Ve)

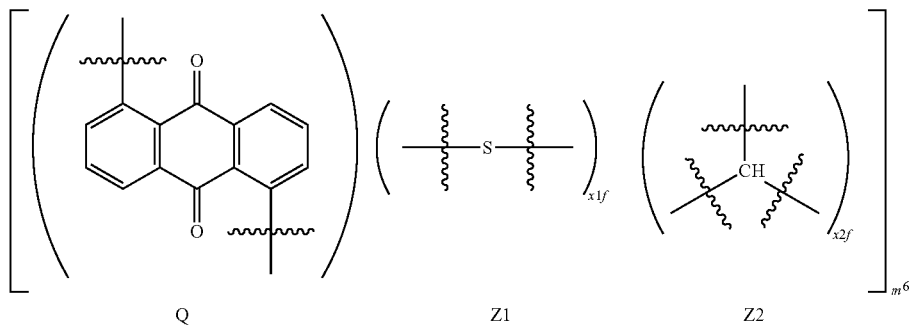

wherein $x1a = 1 + 2 \times (x2a)$, $x1b = 1 + 2 \times (x2b)$, $x1c = 1 + 2 \times (x2c)$, $x1d = 1 + 1.5 \times (x2d)$, $x1e = 1 + 1.5 \times (x2e)$, $x1f = 1 + 1.5 \times (x2f)$, $m^1$, $m^2$, $m^3$, $m^4$, $m^5$ and $m^6$ each independently range from 5 to 1,000, and $R^{31}$ is a H, linear or branched, substituted or unsubstituted C1-C4 aliphatic group.

28. The network polymer of claim 27, wherein
x2a ranges from 0.01 to 0.1, and
$m^1$ ranges from 500 to 1,000.

29. A method for making the network polymer of claim 27, the method comprising
providing a redox active monomer comprising a redox active monomeric moiety Q comprising a carbocyclic structure and at least one carbonyl group or a carboxyl group presented on the carbocyclic structure optionally substituted with three to five functional groups, the redox active monomeric moiety Q having a redox potential of 0.5 V to 3.0 V with reference to Li/Li⁺ electrode potential under standard conditions or −2.54 V to −0.04 V with reference to SHE;
providing a co-monomer comprising a co-monomeric chemical moiety Z substituted with two to six functional groups and capable of reacting with the redox active monomer to form a polymer,
contacting the redox active monomer and the co-monomer for a time and under conditions to allow reaction of the redox active moiety Q with the co-monomeric moiety Z to provide the network polymer.

30. An electrode composition comprising
the network polymer according to claim 27 together with a binder, and a conductive additive.

31. The electrode composition of claim 30, wherein
the binder is selected from one of polytetrafluoroethylene (PTFE), styrene-butadiene or styrene-butadiene rubber (SBR), poly(vinylidene-fluoride) (PVDF), poly(tetrafluoroethylene), sodium carboxymethylcellulose (CMC), styrene-butadiene rubber, polyacrylic acid (PAA), polyvinyl alcohol (PVA), polyethylene glycol (PEG or PEO), polyamide imide (PAI), polyacrylonitrile (PAN) Xanthan Gum, Gum Arabic, and Agar any combination thereof.

32. The electrode composition of claim 30, wherein
the conductive additive is selected from one of Carbon Black (Acetylene Black, Super P Li, C-nergy, Ketjen Black-300, Ketjen Black-600), Imerys (Super P, C-Nergy), carbon nanotubes (C-Nano, Tuball), graphene (xGnP Grade R, xGnP Grade H, xGnP Grade C, xGnP Grade M) and Graphite (KS-4, KS-8, KC-4, KC-8), and nickel powder or any combination thereof.

33. The electrode composition of claim 30, wherein
the binder is present in 1 to 20% by weight of the total electrode composition, and
the conductive additive is present in 5 to 70% by weight of the total electrode composition.

34. An electrochemical cell, the electrochemical cell comprising an anode, a cathode and an aqueous electrolyte, wherein the anode electrode and/or the cathode electrode comprise the network polymer according to claim 27.

35. The electrochemical cell of claim 34, wherein the anode electrode and/or the cathode electrode comprises one of nickel hydroxide (Ni(OH)$_2$), lead sulfate (PbSO$_4$), lithium cobalt oxide (LiCoO$_2$), zinc-carbon, zinc-air, nickel-zinc, silver-zinc, lithium nickel-manganese-cobalt oxide (LiNi$_x$Mn$_y$Co$_z$O$_2$ wherein x+y+z=1), lithium nickel-cobalt-aluminum oxide (LiNi$_x$Co$_y$Al$_z$O$_2$ wherein x+y+z=1), lithium manganese oxide (LiMn$_2$O$_4$), lithium nickel oxide (LiNiO), lithium vanadium oxide (LiV$_2$O$_5$) and lithium iron phosphate (LiFePO$_4$).

36. The electrochemical cell of claim 34, wherein
the aqueous electrolyte has a pH value from 0 to 14 at room temperature,
the aqueous electrolyte comprises at least one salt, and
the salt comprises at least one cation selected from lithium, sodium and potassium or any combination thereof, and at least one anion selected from sulfate, sulfonate, phosphate, phosphonate, carboxylate, acetate, hydroxide, perchlorate, trifluoroacetate, halide, fluoride, chloride, bromide, iodide, trifluoromethanesulfonate, bis(trifluoromethylsulfonyl)imide or any combination thereof.

37. The electrochemical cell of claim 34, wherein the at least one salt has a concentration ranging from 0.01 M to 10 M.

38. A battery comprising one or more electrochemical cells of claim 34.

* * * * *